US008793566B2

(12) United States Patent
Brletic

(10) Patent No.: US 8,793,566 B2
(45) Date of Patent: Jul. 29, 2014

(54) SYSTEM AND METHOD FOR ALLOCATING, SCHEDULING, TRACKING AND REPORTING USAGE OF TRAINING ASSETS AND FACILITIES

(75) Inventor: Carole M. Brletic, Pittsburgh, PA (US)

(73) Assignee: Duquesne University of the Holy Spirit, Pittsburgh, PA (US)

( * ) Notice: Subject to any disclaimer, the term of this patent is extended or adjusted under 35 U.S.C. 154(b) by 0 days.

(21) Appl. No.: 13/292,475

(22) Filed: Nov. 9, 2011

(65) Prior Publication Data

US 2012/0124460 A1 May 17, 2012

Related U.S. Application Data

(60) Provisional application No. 61/456,688, filed on Nov. 10, 2010.

(51) Int. Cl.
    *G06F 17/24* (2006.01)
    *G06F 17/25* (2006.01)

(52) U.S. Cl.
    USPC .......................................... 715/212; 715/219

(58) Field of Classification Search
    USPC ............................................................ 715/212
    See application file for complete search history.

(56) References Cited

U.S. PATENT DOCUMENTS

| 5,247,611 | A | * | 9/1993 | Norden-Paul et al. | ........ 715/217 |
| 7,385,720 | B2 | | 6/2008 | Bhatti | |
| 7,523,048 | B1 | | 4/2009 | Dvorak | |
| 7,711,717 | B2 | | 5/2010 | Gupta et al. | |
| 7,774,363 | B2 | | 8/2010 | Lim | |
| 8,032,821 | B2 | | 10/2011 | Duzak et al. | |
| 2001/0007988 | A1 | * | 7/2001 | Bauchot et al. | ............... 707/100 |
| 2006/0161844 | A1 | * | 7/2006 | Simkhay et al. | ............... 715/538 |
| 2007/0006139 | A1 | * | 1/2007 | Rubin et al. | ................... 717/106 |

OTHER PUBLICATIONS

Rayside et al., "A Spreadsheet-like User Inerface for Combinatorial Multi-Objective Optimization", 2009, ACM, pp. 58-69.*

* cited by examiner

*Primary Examiner* — James J Debrow
(74) *Attorney, Agent, or Firm* — Barbara E. Johnson, Esq.

(57) ABSTRACT

A system and method for scheduling, managing and reporting usage of two or more training facilities by two or more grade levels xl of instruction with two or more classifications of instruction defining typical student experience and hours including user defined multi-criteria queries, using a computer and a spreadsheet with single cell data entry and specified formulas to generate particular scheduling, tracking and reporting of facilities scheduled and educational hours' completed with infinite levels of classification.

2 Claims, 17 Drawing Sheets

| G11 | HR4.0-sd-4.0-N244 Lab | | | | | | | | | |
|---|---|---|---|---|---|---|---|---|---|---|
| Basic Instructions | Coding: Hours Room utilized (HR ##); Dash(-); Level (fr,so,jr,sr,sd); Dash (-); Hours (##);Dash (-); If simulation (SIM); If represents typical student experience (Stdnt); Ex: HR3.0-sr-3.0-Course# SIM Stdnt | | | | | | | | | |
| | Click on color cell; click on color coded cell you want to have color coded; white paint to fix | | | | | | | | | |
| Student Level Term: FA | freshman-fr | soph/nors-so | junior-jr | senior-sr | second degree-sd | graduate level-gr | other-ot | Before saving: [controll]+[home] | | |
| | | | | | | | | Totals | | |
| Tot | 5.5 | 247.5 | 498 | 34 | 604 | 416.5 | 288 | 2093.5 | | |
| SIM | | 72 | 281 | 28 | 72 | 0 | 0 | 457 | | |
| Stdnt | | 0 | 4 | 0 | 0 | 0 | 0 | 8 | | |
| Stdnt SIM | | 0 | 1 | 0 | 0 | 0 | 0 | 5 | | |
| Multi-Criteria Filter Type: 1 txt or # string in each cell, tally hrs or ct | Filter String 1 | Filter String 2 | Filter String 3 | Filter String 4 | Filter String 5 | Filter String 6 | Total Hours | Count Occurances | | |
| | HR | sd | | | | | 604 | 151 | | |
| Rosanna Henry Lab Schedules | 502 Library Hrs: 220.5 | 502 Computer Lab Hrs: 13.5 | 539 Conf Rm Hrs: 76.5 | 541 Conf Rm Hrs: 76.5 | 550 Skills Lab Front Hrs: 414.5 | 550 Skills Lab Back Hrs: 414.5 | 550 Skills Lab Sympodium Hrs: 414.5 | 551 Simulation Lab Hrs: 375 | 553 Simulation Lab Hrs: 100 |
| Mon, Aug 23 am | HR4.0-sd-4.0-N244 SIM Stdnt | | | | HR4.0-sd-4.0- N244 Lab | HR4.0-sd-4.0- N244 Lab | HR4.0-sd-4.0- N244 Lab | HR4.0-sd-4.0- N242/N244 | HR4.0-sd-4.0- N244 Lab |
| Mon, Aug 23 pm | HR4.0-sd-4.0- N244 Lab | | | | HR4.0-sd-4.0- N244 Lab | HR4.0-sd-4.0- N244 Lab | HR4.0-sd-4.0- N244 Lab | HR4.0-sd-4.0- N242/N244 | HR4.0-sd-4.0- N244 Lab |
| Tue, Aug 24 am | HR4.0-sd-4.0 N244 | | | | HR4.0-sd-4.0- N244 Lab | HR4.0-sd-4.0- N244 Lab | HR4.0-sd-4.0- N244 Lab | HR4.0-sd-4.5- N243 Chairman | HR4.0-sd-4.0- N244 |
| Tue, Aug 24 pm | HR4.0-sd-4.0- N244 | | | | HR4.0-sd-4.0- N244 Lab | HR4.0-sd-4.0- N244 Lab | HR4.0-sd-4.0- N244 Lab | HR4.0-sd-4.5- N243 Chairman | HR4.0-sd-4.0- N244 Lab |
| Wed, Aug 25 am | HR4.0-sd-4.0- N244/N242 Lab | | | | HR4.0-sd-4.0- N244/N242 Lab | HR4.0-sd-4.0- N244/N242 Lab | HR4.0-sd-4.0- N244/N242 Lab | HR4.0-sd-4.5- N243 Chairman | HR4.0-sd-4.0- N244 Lab |
| Wed, Aug 25 pm | HR4.0-sd-4.0- N244 | | | | HR4.0-sd-4.0- N244 | HR4.0-sd-4.0- N244 | HR4.0-sd-4.0- N244 | HR4.0-sd-4.5- | HR4.0-sd-4.0- N244 |
| Thu, Aug 26 am | HR4.0-sd-4.0- N244 Chairman | | | | HR4.0-sd-4.5- N244 Chairman | HR4.0-sd-4.5- N244 Chairman | HR4.0-sd-4.5- N244 Chairman | HR4.0-sd-4.5- N244 Chairman | |
| Thu, Aug 26 pm | | | | | | | | | |
| Fri, Aug 27 am | | | | | | | | | |
| Fri, Aug 27 pm | | | | | | | | | |
| Mon, Aug 30 am | HR4.0-sd-4.0- N242/N244 | | | | HR4.0-sd-4.0- N242/N244 | HR4.0-sd-4.0- N242/N244 | HR4.0-sd-4.0- N242/N244 | HR4.0-sd-4.0- N242/N244 | HR4.0-sd-4.0- N242/N244 |
| Mon, Aug 30 pm | HR4.0-sd-4.0- N244 | | | | HR4.0-sd-4.0- N244 | HR4.0-sd-4.0- N244 | HR4.0-sd-4.0- N244 | HR4.0-sd-4.0- N244 | HR4.0-sd-4.0- N244 |
| Tue, Aug 31 am | HR4.0-sd-4.0- N243 SIM | | | | HR4.0-sd-4.0- SIM | | | | |

| A1 | Print specific lines 1-click/drag down on row numbers on far left (arrow appears ā ); 2-click menu circle (office button); 3-select PRINT; 4-Under "Print What" click "selection"; 5-Click "OK" |
|---|---|

Print specific lines 1-click/drag down on row numbers on far left (arrow appears ➔); 2-click menu circle (office button); 3-select PRINT; 4-Under "Print What" click "selection"; 5-Click "OK"

| Term: FA | freshman-fr | sophomore-so | junior-jr | senior-sr | second degree-sd | graduate level-gr | other-ot | Totals | | |
|---|---|---|---|---|---|---|---|---|---|---|
| Tot SIM | | | 47.5 | | | 604 | 416.5 | 288 | 2093.5 | |
| Stdnt | | 4 | 72 | 28 | | 0 | 0 | 0 | 457 | |
| Stdnt SIM | | | 0 | 4 | | 0 | 0 | 0 | 8 | |
| | | | 0 | 0 | | 0 | 0 | 0 | 5 | |

| Rosanna Henry Lab Schedules | 502 Library | 502 Computer Lab | 539 Conf Rm | 541 Conf Rm | 550 Skills Lab Front | 550 Skills Lab Back | 550 Skills Lab Sympodium | 551 Simulation Lab | 553 Simulation Lab |
|---|---|---|---|---|---|---|---|---|---|
| Thu Aug 26 am | HR4.5-so-4.5-N203 Orientation | | | | HR4.5-so-4.5-N203 Orientation | HR4.5-so-4.5-N203 Orientation | HR4.5-so-4.5-N203 Orientation | HR4.5-so-4.5-N203 Orientation | |
| Fri Aug 27 am | | | | | | | | | |
| Fri Aug 30 am | | | | | | | | | |
| Mon Aug 30 pm | | | | | | | | | |
| Tue Sep 01 am | | | | | | | | | |
| Tue Sep 01 pm | | | | | | | | | |
| Wed Sep 02 am | | | | | | | | | |
| Wed Sep 02 pm | | | | | | | | | |
| Thu Sep 02 am | | | | | | | | | |
| Thu Sep 02 pm | | | | | | | | | |
| Fri Sep 03 am | | | | | | | | | |
| Fri Sep 03 pm | | | | | | | | | |
| Mon Sep 06 am | | | | | | | | | |
| Mon Sep 06 pm | | | | | | | | | |
| Tue Sep 07 am | | | | | HR4.5-so-4.5-N203 | HR4.5-so-4.5-N203 | HR4.5-so-4.5-N203 | HR4.5-so-4.5-N203 | |
| Tue Sep 07 pm | HR4.5-so-4.5-N203 | | | | | | | | |
| Wed Sep 08 am | | | | | | | | | |
| Wed Sep 08 pm | | | | | | | | | |
| Thu Sep 09 am | | | | | HR4.5-so-4.5-N203 | HR4.5-so-4.5-N203 | HR4.5-so-4.5-N203 | HR4.5-so-4.5-N203 | |
| Thu Sep 09 pm | HR4.5-so-4.5-N203 | | | | | | | | |
| Fri Sep 10 am | | | | | | | | | |
| Fri Sep 10 pm | | | | | | | | | |
| Mon Sep 13 am | | | | | | | | | |

FIG. 4

| C10 | =IF(ISNUMBER(FIND("sd-",Summary!$C12,"") | | | | | | | | |
|---|---|---|---|---|---|---|---|---|---|
| Print specific lines 1-click/drag down on row numbers on far left (arrow appears)→ 2-click menu circle (office button); 3-select PRINT; 4-Under "Print What" click "selection"; 5-Click "OK" | | | | | | | | | |
| Term: FA | freshman | soph-more-sr | jun-sr | senior-sr | second degree-sd | graduate level-gr | other-ot | Totals | | |
| Tot SIM | | 247.5 | 198 | | 34 | 604 | 416.5 | 288 | 2093.5 | |
| Stdnt | | 72 | 281 | | 28 | 72 | 0 | 0 | 457 | |
| Stdnt | | 0 | 4 | | 0 | 0 | 0 | 0 | 8 | |
| SIM | | 0 | 1 | | 0 | 0 | 0 | 0 | 5 | |
| Rosanna Henry Lab Schedules | 502 Library | 502 Computer Lab | 539 Conf Rm | 541 Conf Rm | 550 Skills Lab Front | 550 Skills Lab Back | 550 Skills Lab Sympodium | 551 Simulation Lab | 553 Simulation Lab |
| Mon, Aug 23 am | | | | | | | | | HR4.0-sd-4.0-N244 Lab |
| Mon, Aug 23 pm | HR4.0-sd-4.0-N244 Lab | | | | | HR4.0-sd-4.0-N244 Lab | HR4.0-sd-4.0-N244 Lab | HR4.0-sd-4.0-N244 Lab | HR4.0-sd-4.0-N244 Lab |
| Tue, Aug 24 am | | | | | | HR4.0-sd-4.0-N244 Lab | HR4.0-sd-4.0-N244 Lab | HR4.0-sd-4.0-N244 Lab | HR4.0-sd-4.0-N244 Lab |
| Tue, Aug 24 pm | HR4.0-sd-4.0-N244 Lab | | | | HR4.0-sd-4.0-N244 Lab | HR4.0-sd-4.0-N244 Lab | HR4.0-sd-4.0-N244 Lab | HR4.0-sd-4.0-N244 Lab | HR4.0-sd-4.0-N244 Lab |
| Wed, Aug 25 am | HR4.0-sd-4.0-N244&N242 Lab | | | | HR4.0-sd-4.0-N244&N242 Lab | HR4.0-sd-4.0-N244&N242 Lab | HR4.0-sd-4.0-N244&N242 Lab | HR4.0-sd-4.0-N244&N242 Lab | HR4.0-sd-4.0-N244&N242 Lab |
| Wed, Aug 25 pm | HR4.0-sd-4.0-N244 | | | | HR4.0-sd-4.0-N244 | HR4.0-sd-4.0-N244 | HR4.0-sd-4.0-N244 | HR4.0-sd-4.0-N244 | HR4.0-sd-4.0-N244 |
| Thu, Aug 26 am | | | | | | | | | |
| Thu, Aug 26 pm | | | | | | | | | |
| Fri, Aug 27 am | | | | | | | | | |
| Fri, Aug 27 pm | | | | | | | | | |
| Mon, Aug 30 am | | | | | HR4.0-sd-4.0-N242&N244 | HR4.0-sd-4.0-N244&N242 | HR4.0-sd-4.0-N242&N244 | HR4.0-sd-4.0-N242&N244 | HR4.0-sd-4.0-N242&N244 |
| Mon, Aug 30 pm | HR4.0-sd-4.0-N244 | | | | HR4.0-sd-4.0-N244 | HR4.0-sd-4.0-N244 | HR4.0-sd-4.0-N244 | HR4.0-sd-4.0-N244 | HR4.0-sd-4.0-N244 |
| Tue, Aug 31 am | | | | | | | | | |
| Tue, Aug 31 pm | | | | | | | | | |
| Wed, Sep 01 am | HR4.0-sd-4.0-N244 | | | | HR4.0-sd-4.0-N244&N242 | HR4.0-sd-4.0-N244&N242 | HR4.0-sd-4.0-N244&N242 | HR4.0-sd-4.0-N244&N242 | HR4.0-sd-4.0-N244 |
| Wed, Sep 01 pm | | | | | | | | | |
| Thu, Sep 02 am | | | | | | | | | |
| Thu, Sep 02 pm | | | | | | | | | |
| Fri, Sep 03 am | | | | | | | | | |
| Fri, Sep 03 pm | | | | | | | | | |

FIG. 5

=IF(ISNUMBER(FIND("sd-",Summary!$C$9,Summary!$C12))*(FIND(Summary!$D$9,Summary!$C12))*(FIND(Summary!$F$9,Summary!$C12))*(FIND(Summary!$F$9,Summary!$C12))*(11

Print specific lines 1-click/drag down on row numbers on far left (arrow appears ➤); 2-click menu circle (office button). 3-select PRINT; 4-Under "Print What" click "selection"; 5-Click "OK"

| Term: FA | freshman-fr | sophomore-so | junior-jr | senior-sr | second degree-sd | graduate level-gr | other-ot | Totals | |
|---|---|---|---|---|---|---|---|---|---|
| Tot SIM | 565 | 247.5 | 498 | | 34 | 416.5 | | 2093.5 | |
| Stdnt | 41 | 72 | 261 | | 29 | 0 | | 457 | |
| Stdnt SIM | 8 | 0 | 0 | | 0 | 0 | | 8 | |
| | 4 | 0 | 1 | | 0 | 0 | | 5 | |

| Multi Criteria Filter Type 1 txt or # string - each cell-tally hrs or # | Filter String 1 | Filter String 2 | Filter String 3 | Filter String 4 | Filter String 5 | Filter String 6 | Total Hours | Count Occurrences | Change criteria on Summary Sheet ONLY! |
|---|---|---|---|---|---|---|---|---|---|
| | HR | sd | | | | | 604 | 151 | |
| Rosanna Henry Lab Schedules | 502 Library | 502 Computer Lab | 539 Conf Rm | 541 Conf Rm | 550 Skills Lab Front | 550 Skills Lab Back | 550 Skills Lab Sympodium | 551 Simulation Lab | 553 Simulation Lab |
| Mon, Aug 23 am | | | | | | | | | |
| Mon, Aug 23 pm | HR4.0-sd-4.0-N244 Lab | | | | | | | | |
| Tue, Aug 24 am | | | | | | | | | |
| Tue, Aug 24 pm | HR4.0-sd-4.0-N244 Lab | | | | HR4.0-sd-4.0-N244 Lab | HR4.0-sd-4.0-N244 Lab | HR4.0-sd-4.0-N244 Lab | HR4.0-sd-4.0-N244 Lab | HR4.0-sd-4.0-N244 Lab |
| Wed, Aug 25 am | HR4.0-sd-4.0-N244&N242 Lab | | | | HR4.0-sd-4.0-N244&N242 Lab | HR4.0-sd-4.0-N244&N242 Lab | HR4.0-sd-4.0-N244&N242 Lab | HR4.0-sd-4.0-N244&N242 Lab | HR4.0-sd-4.0-N244&N242 Lab |
| Wed, Aug 25 pm | HR4.0-sd-4.0-N244 | | | | HR4.0-sd-4.0-N244 | HR4.0-sd-4.0-N244 | HR4.0-sd-4.0-N244 | HR4.0-sd-4.0-N244 | HR4.0-sd-4.0-N244 |
| Thu, Aug 26 am | | | | | | | | | |
| Thu, Aug 26 pm | | | | | | | | | |
| Fri, Aug 27 am | | | | | | | | | |
| Fri, Aug 27 pm | | | | | | | | | |
| Mon, Aug 30 am | HR4.0-sd-4.0-N242&N244 | | | | HR4.0-sd-4.0-N242&N244 | HR4.0-sd-4.0-N242&N244 | HR4.0-sd-4.0-N242&N244 | HR4.0-sd-4.0-N242&N244 | HR4.0-sd-4.0-N244 |
| Mon, Aug 30 pm | | | | | HR4.0-sd-4.0-N244 | HR4.0-sd-4.0-N244 | HR4.0-sd-4.0-N244 | HR4.0-sd-4.0-N244 | HR4.0-sd-4.0-N244 |
| Tue, Aug 31 am | | | | | | | | | |
| Tue, Aug 31 pm | | | | | | | | | |
| Wed, Sep 01 am | HR4.0-sd-4.0-N244&N242 | | | | HR4.0-sd-4.0-N244&N242 | HR4.0-sd-4.0-N244&N242 | HR4.0-sd-4.0-N244&N242 | HR4.0-sd-4.0-N244&N242 | HR4.0-sd-4.0-N244 |
| Wed, Sep 01 pm | | | | | | | | | |

| C11 | =IF(ISNUMBER(FIND("fr-",Summary!C11)),Summary!C11,"") | | | | | | | | |
|---|---|---|---|---|---|---|---|---|---|
| Print specific lines 1-click/drag down on row numbers on far left (arrow appears→); 2-click menu circle (office button); 3-select PRINT; 4-Under "Print What" click "selection"; 5-Click "OK" | | | | | | | | | |
| Student Level | freshman | sophomore-so | junior-jr | senior-sr | second degree-sd | graduate level-gr | other-ot | Totals | | |
| Total for Level | 140 | | 272 | 63 | 444 | 300 | 16.5 | 1239.5 | | |
| SIMulation | 54 | 70 | 108 | 60 | 48 | 0 | 0 | 294 | | |
| Student Exper | 9 | 3 | 23 | 7 | 7 | 64 | 64 | 8 | | |
| Student SIM Exper | | | 9.5 | 4 | 12 | 0 | 0 | 29.5 | | |
| Lab Schedules | 502 Library | 502 Comp Lab | 539 Conf Rm | 541 Conf Rm | 550 Skills Lab Fr | 550 Skills Lab Bk | 550 Skills Sym | 551 Sim Lab | 553 Sim Lab |
| Wed, Sep 14 am | | | | | | | | | |
| Wed, Sep 14 pm | | | | | | | | | |
| Thu, Sep 15 am | | | | | | | | | |
| Thu, Sep 15 pm | | | | | | | | | |
| Fri, Sep 16 am | | | | | | | | | |
| Fri, Sep 16 pm | | | | | | | | | |
| Sat, Sep 17 am | | | | | | | | | |
| Sat, Sep 17 pm | | | | | | | | | |
| Sun, Sep 18 am | | | | | | | | | |
| Sun, Sep 18 pm | | | | | | | | | |
| Mon, Sep 19 am | | HR3.0-fr-0.0-Clearances | | | | | | | |
| Mon, Sep 19 pm | | HR3.0-fr-0.0-Clearances | | | | | | | |
| Tue, Sep 20 am | | | | | | | | | |
| Tue, Sep 20 pm | | | | | | | | | |
| Wed, Sep 21 am | | | | | | | | | |
| Wed, Sep 21 pm | | | | | | | | | |
| Thu, Sep 22 am | | | | | | | | | |
| Thu, Sep 22 pm | | | | | | | | | |
| Fri, Sep 23 am | | | | | | | | | |
| Fri, Sep 23 pm | | | | | | | | | |
| Sat, Sep 24 am | | | | | | | | | |
| Sat, Sep 24 pm | | | | | | | | | |
| Sun, Sep 25 am | | | | | | | | | |
| Sun, Sep 25 pm | | | | | | | | | |
| Mon, Sep 26 am | | | | | | | | | |
| Mon, Sep 26 pm | | | | | | | | | |
| Tue, Sep 27 am | | | | | | | | | |
| Tue, Sep 27 pm | | | | | | | | | |
| Wed, Sep 28 am | | | | | | | | | |
| Wed, Sep 28 pm | | | | | | | | | |
| Thu, Sep 29 am | | | | | | | | | |

Skills Lab and Simulation Lab Clinical Schedule
(Totals by Student Level & Lab)

| H12 | | | | | | | |
|---|---|---|---|---|---|---|---|
| Total Fall 2010: 524 Hrs | fr-freshman | so-sophomore | jr-junior | sr-senior | sd-second degree | gr-graduate level | |
| | | | 74 | 60 | 192 | 10 | |
| | 550 Skills Lab Fr Hrs: 239 | 550 Skills Lab Bk Hrs: 247 | 550 Skills Sym Hrs: 253 | 551 Sim Lab Hrs: 264 | | | |
| Sun, Aug 21 am | | | | | | | |
| Sun, Aug 21 pm | | | | | | | |
| Mon, Aug 22 am | | | | | | | |
| Mon, Aug 22 pm | HR4.0-sd-0.0-N244 Lab | HR4.0-sd-0.0-N244 Lab | HR4.0-sd-0.0-N244 Lab | HR4.0-sd-0.0-N244 Lab | | | |
| Tue, Aug 23 am | | | | | | | |
| Tue, Aug 23 pm | | | | | | | |
| Wed, Aug 24 am | HR4.0-sd-0.0-N244 Lab | HR4.0-sd-0.0-N244 Lab | HR4.0-sd-0.0-N244 Lab | HR4.0-sd-0.0-N244 Lab | | | |
| Wed, Aug 24 pm | HR4.0-sd-0.0-N244 Lab | HR4.0-sd-0.0-N244 Lab | HR4.0-sd-0.0-N244 Lab | HR4.0-sd-0.0-N244 Lab | | | |
| Thu, Aug 25 am | | | | | | | |
| Thu, Aug 25 pm | | | | | | | |
| Fri, Aug 26 am | | | | | | | |
| Fri, Aug 26 pm | | | | | | | |
| Sat, Aug 27 am | | | | | | | |
| Sat, Aug 27 pm | | | | | | | |
| Sun, Aug 28 am | | | | | | | |
| Sun, Aug 28 pm | HR4.0-sd-0.0-N244 Lab | HR4.0-sd-0.0-N244 Lab | HR4.0-sd-0.0-N244 Lab | HR4.0-sd-0.0-N244 Lab | | | |
| Mon, Aug 29 am | HR4.0-sd-0.0-N244 Lab | HR4.0-sd-0.0-N244 Lab | HR4.0-sd-0.0-N244 Lab | HR4.0-sd-0.0-N244 Lab | | | |
| Mon, Aug 29 pm | | | | | | | |
| Tue, Aug 30 am | HR4.0-jr-2.5-N303 Lab:Stdnt | HR4.0-jr-2.5-N303 Lab:Stdnt | HR4.0-jr-2.5-N303 Lab:Stdnt | HR4.0-jr-2.5-N303 Lab:Stdnt | | | |
| Tue, Aug 30 pm | HR4.0-sr-4.0-N308 Lab:Stdnt | HR4.0-sr-4.0-N308 Lab:Stdnt | HR4.0-sr-4.0-N308 Lab:Stdnt | HR4.0-sr-4.0-N308 Lab:Stdnt | | | |
| Wed, Aug 31 am | HR4.0-sd-4.0-N244 Lab:Stdnt | HR4.0-sd-4.0-N244 Lab:Stdnt | HR4.0-sd-4.0-N244 Lab:Stdnt | HR4.0-sd-4.0-N244 Lab:Stdnt | | | |
| Wed, Aug 31 pm | HR4.0-jr-4.0-N303 Lab:Stdnt | HR4.0-jr-4.0-N303 Lab:Stdnt | HR4.0-jr-4.0-N303 Lab:Stdnt | HR4.0-jr-4.0-N303 Lab:Stdnt | | | |

| D13 | =IF(ISNUMBER(FIND(Summary!$C$9,Summary!$d13))*(FIND!$D$9,Summary!$D13))*(FIND!$F$9,Summary!$D13))*($G$9Summary!$D13))*(FIND($H$9,Summary! | | | | | | | | |
|---|---|---|---|---|---|---|---|---|---|
| Totals SELECTED Period & CRITERIA | Define Date Range (Example: 10/1/11) | Beginning Date Selected Period | 08/21/11 | Ending Date Selected Period | 10/31/11 | | | | |
| Student Level | freshman-fr | sophomore-so | junior-jr | senior-sr | second degree-sd | graduate level-gr | other-ot | Totals | |
| Total for Level | 0 | 0 | 0 | 0 | 0 | 0 | 0 | 160 | |
| SIMulation | 0 | 0 | 0 | 0 | 0 | 0 | 0 | 20 | |
| Student Exper | 0 | 0 | 0 | 0 | 0 | 0 | 0 | 12 | |
| Student SIM Exper | 0 | 0 | 0 | 0 | 0 | 0 | 0 | 1.5 | |
| Multi-Criteria Filter 1 txt: string per cell (No: filter "HR") | Filter String 1 | Filter String 2 | Filter String 3 | Filter String 4 | Filter String 5 | Filter String 6 | Total Hours | Count | |
| | HR | N308 | | | | | 160 | 40 | |
| Lab Schedules | 502 Library Hrs: 16 | 502 Comp Lab Hrs: 0 | 539 Conf Rm Hrs: 0 | 541 Conf Rm Hrs: 8 | 550 Skills Lab Fr Hrs: 36 | 550 Skills Lab Bk Hrs: 36 | 550 Skills Sym Hrs: 36 | 551 Sim Lab Hrs: 28 | 553 Sim Lab Hrs: 0 |
| Sun, Aug 21 am | | | | | | | | | |
| Sun, Aug 21 pm | | | | | | | | | |
| Mon, Aug 22 am | | | | | | | | | |
| Mon, Aug 22 pm | | | | | | | | | |
| Tue, Aug 23 am | | | | | | | | | |
| Tue, Aug 23 pm | | | | | | | | | |
| Wed, Aug 24 am | | | | | | | | | |
| Wed, Aug 24 pm | | | | | | | | | |
| Thu, Aug 25 am | | | | | | | | | |
| Thu, Aug 25 pm | | | | | | | | | |
| Fri, Aug 26 am | | | | | | | | | |
| Sat, Aug 27 am | | | | | | | | | |
| Sat, Aug 27 pm | | | | | | | | | |
| Sun, Aug 28 am | | | | | | | | | |
| Sun, Aug 28 pm | | | | | | | | | |
| Mon, Aug 29 am | | | | | | | | | |
| Mon, Aug 29 pm | | | | | | | | | |
| Tue, Aug 30 am | | | | | | HR4.0-jr-2.5-N308 Lab.Stdnt | HR4.0-jr-0.0-N308 Lab | HR4.0-jr-0.0-N308 Lab.SIM.Stdnt | HR4.0-jr-1.5-N308 Lab.SIM.Stdnt |
| Tue, Aug 30 pm | | | | | | HR4.0-jr-0.0-N308 Lab | HR4.0-jr-0.0-N308 Lab | HR4.0-jr-0.0-N308 Lab | HR4.0-jr-0.0-N308 Lab.SIM |
| Wed, Aug 31 am | | | | | | | | | |

FIG. 16

| D20 | | | | | | | | | |
|---|---|---|---|---|---|---|---|---|---|
| Room | | Room 1 | Room 2 | Room 3 | Room 4 | Room 5 | Room 6 | Room 7 | Room 8 | Room 9 |
| Name | | 502 Library | 502 Comp Lab | 539 Conf Rm | 541 Conf Rm | 550 Skills Lab Fr | 550 Skills Lab Bk | 550 Skills Sym | 551 Sim Lab | 553 Sim Lab |

| Levels | Level 1 | Level 2 | Level 3 | Level 4 | Level 5 | Level 6 | Level 7 |
|---|---|---|---|---|---|---|---|
| Name | freshman | sophmore | junior | senior | second deg | graduate | other |
| Code | fr- | so- | jr- | sr- | sd- | gr- | ot- |
| Color | | | | | | | |

| Beginning Date for Calendar | Month ## | Date ## | Year ## |
|---|---|---|---|
| | 8 | 21 | 2011 |
| | Start on a Sunday | | 8/21/2011 |

FIG. 17

SYSTEM AND METHOD FOR ALLOCATING, SCHEDULING, TRACKING AND REPORTING USAGE OF TRAINING ASSETS AND FACILITIES

CROSS-REFERENCE TO RELATED APPLICATIONS

This patent application claims priority to, and incorporates by reference, U.S. Provisional Patent Application Ser. No. 61/456,688 filed 10 Nov. 2010.

BACKGROUND OF THE INVENTION

1. Field of the Invention

The invention is a system and method for spreadsheet and specific formula based governance of training assets and facilities, including student achievements, in any field and particularly in the medical simulation training field.

2. Description of Related Art

As powerful as sophisticated databases can be, in many cases they are not user friendly except in the eyes of formally trained information technology personnel. At the same time, the use of a spreadsheet (even by formally trained information technology personnel) for tracking and reporting of data records of any complexity is usually problematic: the functions of spreadsheets are not generally intended or believed to be particularly suited for management of data records including scheduling, tracking and reporting in multiple dimensions (such as multiple training facilities for multiple grade level users). Nonetheless, for management of training assets and facilities, given the choice many managers would prefer a spreadsheet-based system, if it existed, to having to master and use one of the comprehensive database programs available at this writing.

The need for easy-to-use tracking and reporting systems is particularly acute in any field where highly prized, high-demand training assets and facilities are used. As a nonlimiting example, nursing students generally are required to complete various simulations in simulation laboratories. These highly specialized simulation facilities are in no way fungible, so scheduling, tracking and reporting usage are both critically important and, up until the present invention, unwieldy to implement. In order to understand the first embodiment of the present invention, therefore, an initial review of the state of the art of nursing simulation laboratory facilities is helpful.

Studies show that students learn certain nursing procedures or health care interventions as well or better, in a simulated environment, as they do in a clinical setting. Simulation laboratory education provides in-depth preparation for clinical experience, because simulation effects both protocol development and practice before the student ever encounters any patient on which the same procedure is to be performed. A list of simulation equipment could include without limitation medical mannequins and simulators such as those having the intuitively descriptive names of: SimMan; SimMan 3G; SimBaby; Pelvic Simulator; NOELLE® Birthing Simulator including Newborn HAL (both remote controllable from up to 100 meters; standard features include programmable hemorrhage using simulated blood and catheterization with flow of simulated urine); Nurse Ann Vital Sims 3; Vital Sim Child; Vital Sim Infant. Other simulator mannequins known at this writing include resuscitation mannequins in which cardiac arrest simulation (particularly for EMT or paramedic training) includes reflux or regurgitation of artificial vomitus, which vomitus material must be cleared as part of reestablishing a reliable airway for successful cardiopulmonary resuscitation. Users of medical training simulators are inevitably positive if not grateful for the opportunity to practice on a simulator prior to treating a living patient experiencing the same or similar symptoms or crises.

Not only because practitioners require space around each mannequin or simulator in order to use it but because, in order to simulate a clinical setting, each mannequin or simulator will generally be in its own cubicle or patient room to enhance the simulation, such mannequin or simulator resources are generally allocated one-to-a-room or one-to-a-simulation-laboratory. (If all mannequins and simulators are used at once in one room, for instance in a disaster drill, the advance scheduled unavailability of all the mannequins and simulators still has to be scheduled and tracked.) Due to their high expense and high demand, simulators and their respective laboratories clearly constitute scarce resources for which scheduling, tracking and reporting has traditionally been a constant challenge. The simulator laboratories certainly cannot be "double-booked," but it is important that they be completely scheduled at all available times both for optimal medical education of the enrolled students and to maximize the economic return to the educational institution of the significant investment in the simulator resources themselves. In addition, and particularly in a medical educational setting, there is also a need not only to manage the scheduling and management of multiple simulation facilities but also to track student hours' completed as a condition of curriculum fulfillment and/or student licensure. A need therefore remains for a user-friendly spreadsheet-based system for allocating, scheduling, tracking and reporting assets and facilities, medical or otherwise, in a way that coordinates both facilities management and student grade level and hours' completion in an easy to use system and method of managing and reporting using (only) a computer spreadsheet.

SUMMARY OF THE INVENTION

The present invention is a system and method for scheduling, managing and reporting usage of two or more training facilities by two or more grade levels xl of instruction with two or more classifications of instruction defining typical student experience and hours including user defined multi-criteria queries, which includes a number of steps described as follows. First, the user enters data into a spreadsheet on a computer and specifically enters the data on a "Summary" sheet using single-cell, multiple-criteria data entry, following on-screen instructions described below. Additional classifications include, but are not limited to, typical student experience by grade level, typical student simulation or non-simulation experience by grade level, or any classification defined by the data user. Student level "xl" is specified as to individual student levels tracked by the spreadsheet, where "xl" is a level variable and actual data input specifies grade level by code. After data entry, single-cell student level classification, simulation experience classification, typical student level simulation and non-simulation experiences, and user defined filtered retrieval and totaling on dedicated tally sheets is implemented using formulas in one of two approaches. In the first approach, the formulas are:

For Tally Sheet formula =IF(ISNUMBER(FIND("xl-", Summary!$J10)),MID(Summary!$J10,3,3),0), and formula =IF(U5=FALSE,VALUE(0),VALUE(U5));

For Tally SIM formula =IF(ISNUMBER((FIND("xl-", Summary!$C158))*(FIND("SIM",Summary!$C158))),MID(Summary!$C158,3,3),0), and formula =IF(C107=FALSE,VALUE(0),VALUE(C107));

For Tally Stdnt formula =IF(ISNUMBER((FIND("xl-", Summary!$C158))*(FIND("Stdnt",Summary!$C158))),MID(Summary!$C158,10,3),0), and formula =IF(C152=FALSE,VALUE(0),VALUE(C152));

For Tally Stdnt SIM formula =IF(ISNUMBER((FIND ("xl-",Summary!$C11))*(FIND("SIM",Summary!$C11))*(FIND("Stdnt",Summary!$C11))),MID (Summary!$C11,10,3),0), and =IF(C5=FALSE, VALUE(0),VALUE(C5));

For Tally Open Query formula =IF(ISNUMBER((FIND (Summary!$C$9,Summary!$C11))*(FIND(Summary!$D$9,Summary!$C11))*(FIND(Summary!$E$9, Summary!$C11))*(FIND(Summary!$F$9, Summary!$C11))*(FIND(Summary!$G$9, Summary!$C11))*(FIND(Summary!$H$9, Summary!$C11))),MID(Summary!$C11,3,3),0), and formula =IF(C5=FALSE,VALUE(0),VALUE(C5)).

As to the first set of formulas presented above, automatically summed totals by room, student level, simulation and non-simulation classification, typical student experience by student level, typical student simulation experience by level, infinite classification as defined by user with multi-criteria queries, etc. are obtained on the Summary Sheet utilizing formulas =Tally!$C178&"Hrs:"&Tally!$J178, and =SUM (Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175).

Next, automatically summed totals by student level, simulation and non-simulation classification, typical student experience by student level, typical student simulation experience by level infinite classification as defined by user with multi-criteria queries, etc. are derived on individualized student level and open query sheets utilizing formula =SUM(Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175).

Finally, by copying the structure of the Summary Sheet to the student level sheets by formula, =(Summary!A10), when the Summary sheet is updated all related sheets are updated.

Although the above describes the possibility of stepwise implementation, the steps can be changed in order or can all be performed simultaneously after initial data entry, according to the functioning of the database containing the formulas.

In a second embodiment of the invention, a more elaborate array of formulas are populated into the spreadsheet to accomplish the same general goal of data entry and automated computer processing of facilities scheduling information in a spreadsheet, in which the facilities scheduling requires tracking of hours scheduled as well as tracking and reporting of two or more user grade levels xl, at least one user experience xe, and at least one user experience subset xs, the latter of which is usually but not necessarily a "SIM" experience, that is, a simulation experience as a subset of total student experience. The reason "student experience" is important is that when classes are scheduled into a facility and there are multiple students in a class, hands-on laboratory or simulation experience for that student may well be for a shorter time than the class is scheduled into the facility. When a class is scheduled to use a particularly laboratory or other facility, then, "student experience" or a typical subset "student simulation experience" can track usage for each individual student, not just the class as a whole. The overview of the second embodiment of the invention is to implement entry and capture of all the quantitative scheduling data together with optional and potentially unpredictable text strings that may accompany complex facilities' scheduling data entry. The aforementioned capture means that hours scheduled, user grade levels, student experience, and student experience subset, etc., are tracked along with additional optional data, by entering data in a single entry location, such that the data may be filtered, summed and counted and the entire data event is summarized automatically in various single cells. In this way, by single data entry of scheduling data, all output data is available in customized cells as outputs to a user, as described herein, by operation of the formulas in the spreadsheet.

BRIEF DESCRIPTION OF THE DRAWING(S)

The patent or application file contains at least one drawing executed in color. Copies of this patent or patent application publication with color drawing(s) will be provided by the Office upon request and payment of the necessary fee.

FIG. 1 is a screen shot of the "Summary" sheet layout for the nursing education simulation lab management first embodiment of the present invention;

FIG. 2 is a screen shot of the "Tally" sheet layout for the nursing simulation education first embodiment of the present invention;

FIG. 3 is a screen shot of the "Freshman" sheet layout for the nursing education simulation lab management first embodiment of the present invention;

FIG. 4 is a screen shot of the "Sophomore" sheet layout for the nursing education simulation lab management first embodiment of the present invention;

FIG. 5 is a screen shot of the "Second Degree" sheet layout for the nursing education simulation lab management first embodiment of the present invention;

FIG. 6 is a screen shot of the "Open Query" sheet layout for the nursing education lab management first embodiment of the present invention;

FIG. 7 is a screen shot of the "Labs 550-551" sheet layout for the nursing education simulation lab management first embodiment of the present invention;

FIG. 8 is screen shot of the "Summary" sheet layout for the nursing education simulation lab management second embodiment of the present invention;

FIG. 9 is a screen shot of the "Freshman" sheet layout for the nursing education simulation lab management second embodiment of the present invention;

Figure 10:
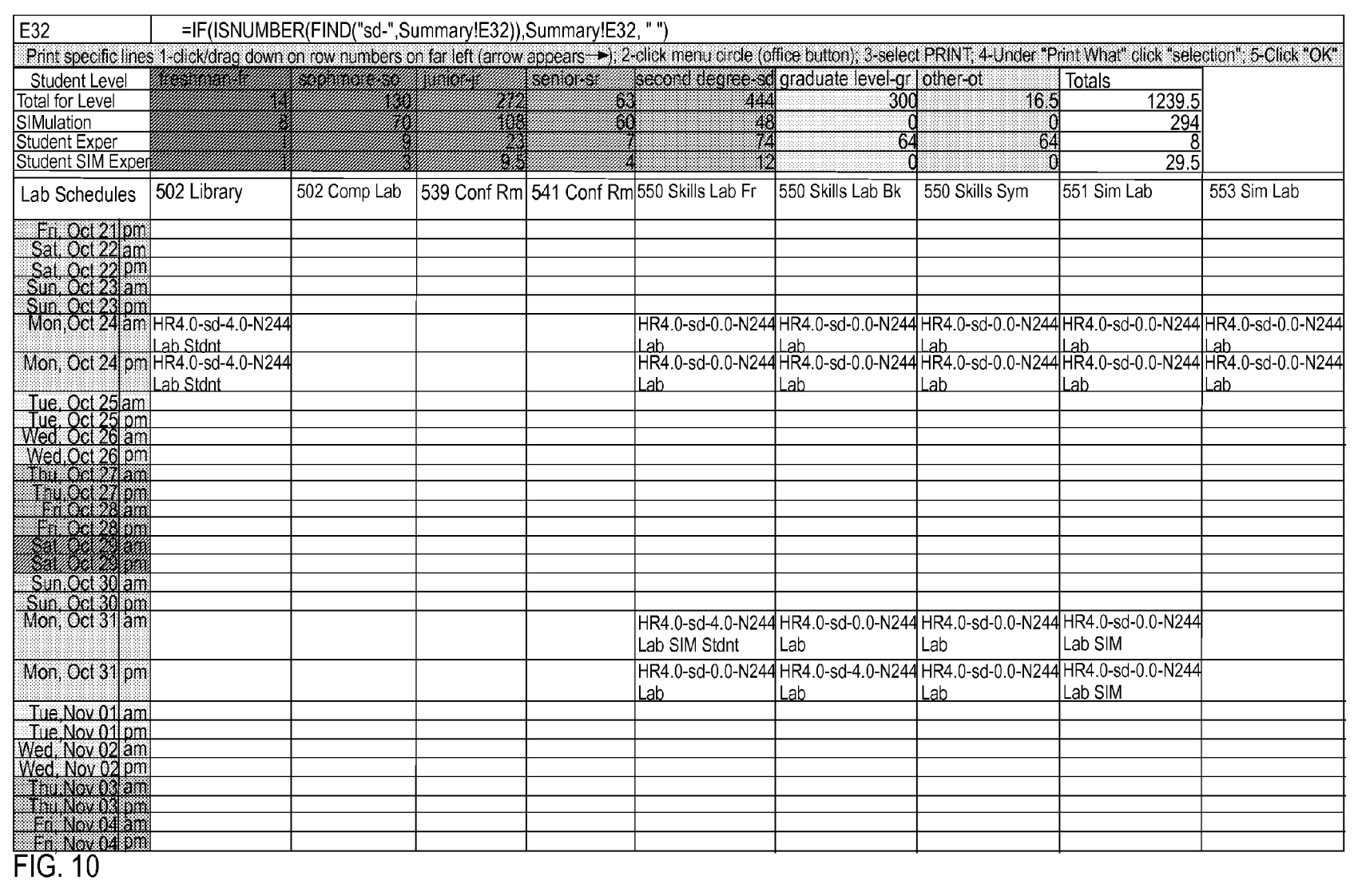

FIG. 10 is a screen shot of the "Second Degree" sheet layout for the nursing education simulation lab management second embodiment of the present invention;

FIG. 11 is a screen shot of the "Open Query" sheet layout for the nursing education simulation lab management second embodiment of the present invention;

FIG. 12 is a screen shot of the "Labs 550-551" sheet layout for the nursing education simulation lab management second embodiment of the present invention;

FIG. 13 is the first of three screen shots of the "Tally" sheet layout for the nursing education simulation lab management second embodiment of the present invention;

FIG. 14 is the second of three screen shots of the "Tally" sheet layout for the nursing education simulation lab management second embodiment of the present invention;

FIG. 15 is the third of three screen shots of the "Tally" sheet layout for the nursing education simulation lab management second embodiment of the present invention;

FIG. 16 is a screen shot of the "Selected Period" sheet layout for the nursing education simulation lab management second embodiment of the present invention; and FIG. 17 is a screen shot of the "Customize" sheet layout for the nursing education simulation lab management second embodiment of the present invention.

DETAILED DESCRIPTION OF THE INVENTION

The present system and method invokes a specialized application of an Excel (or similar) computer spreadsheet program to function as a database manager of resources, typically medical resources, personnel, facilities, student schedules and student hours' completion with automatically generated calendars, student hours reports, facilities usage reports and other tracking and reporting functions. The system and method may be used to manage two or more "grade levels" of instruction with two or more facilities or assets, including instructors and support staff, for which scheduling is required. The system and method can also distinguish among facilities, such as distinguishing between clinical facilities and simulation facilities, for record keeping purposes, using the present formulas and therefore without having to use advanced information technology such as pivot tables or other complicated implementations of data tracking.

An example (first embodiment) of the spreadsheet system and method of scheduling, tracking and reporting usage of multiple nursing simulation laboratories and generation of student hours' used reports is described below and with reference to the accompanying Figures. For a college or university level undergraduate/graduate school of nursing, the scheduling of simulation laboratories is not just a matter of allocating certain students and teachers to certain laboratories at certain times—the resource set up will also require coordination with the level of the students who will use the simulation lab. In other words, a simulation laboratory will be prepared and configured differently for a class of graduate school students than it will for incoming freshman or other lower level students who are on the lower end of the simulation learning curve. Therefore, a tracking and reporting system must be able to record and report the grade level of the students scheduled to use the lab to make the scheduling function of the system easy to use, as the labs are reconfigured throughout the day to meet the differing needs of the scheduled users. In the present invention, "grade level" designation is accomplished in part in a user-friendly way by using the Format Painter function of the spreadsheet to code the grade levels in color. Basic Instructions for color coding are outlined at the top of the spreadsheet for simplified visual identification (as shown in the color Figures, pale yellow—freshman; blue—sophomore; orange—junior; purple—senior; pink—second degree; grey—graduate level; ot—other, but choice of actual colors is arbitrary and can be customized by any user. Particular formulas are used for data entry and implementation of the present system and method as described in detail below.

Referring now to FIG. 1, a screen shot of the "Summary" layout sheet, the "Summary" layout sheet is the primary data screen for data entry for the first embodiment of the invention. By entering coded data representing student level, simulation or non-simulation type, whether entry represents typical student level experience, student cycling hours (hours for a student experience within the reserved lab hours), lab hours and course title, the lab space/time is reserved by observing the following data entry protocol: Positions 1, 2: HR to represent that numbers to follow are Room Reserved Hours; Positions 3, 4, 5: Hours scheduled formatted #.# (number point number); Positions 6, 7, 8, 9: Dash (-) and Student level: -fr—freshman, -so—sophomore, -jr—junior, -sr—senior, -sd—second degree, -gr—graduate level, -ot—other, followed by Dash (-); Positions 10, 11, 12: Hours scheduled for individual student level experiences within Reserved Room formatted #.# (number point number); Position 13: -(dash); Positions 14- . . . : Course Information including 'SIM' if simulation, null if not simulation, 'Stdnt' if represents a typical student level experience, and any additional classifications determined by the user (may include instructor name, etc). As described above, basic instructions for color coding are outlined at the top of the spreadsheet for simplified visual identification. In order to determine the total hours each room is scheduled, the following formula is used on this Summary layout spreadsheet: =Tally!$Q178&"Hrs: "&Tally!$X178 (formula copies the title of data being summed and copies the summed hours, minimizing opportunity for error). In order to determine total hours scheduled for a student level (freshman (fr), sophomore (so) and so on), the following formulas are used: =SUM(Tally!J5:J175,Tally!X5:X175,Tally!AL5:AL175,Tally!AZ5:AZ175,Tally!BN5:BN175,Tally!CB5:CB175,Tally CP5:CP175,Tally!DD5:DD175,Tally!DR5:DR175), =SUM('Tally SIM'!J175+'Tally SIM'!X175+'Tally SIM'!AL175+'Tally SIM'!AZ175+'Tally SIM'!BN175+'Tally SIM'!CB175+'Tally SIM'!CP175+'Tally SIM'!DD175+'Tally SIM'!DR175), =SUM('Tally Stdnt'!J175+'Tally Stdnt'!X175+'Tally Stdnt'!AL175+'Tally Stdnt'!AZ175+'Tally Stdnt'!BN175+'Tally Stdnt'!CB175+'Tally Stdnt'!CP175+'Tally Stdnt'!DD175+'Tally Stdnt'!DR175), and =SUM('Tally Stdnt SIM'!J175+'Tally Stdnt SIM'!X175+'Tally Stdnt SIM'!AL175+'Tally Stdnt SIM'!AZ175+'Tally Stdnt SIM'!BN175+'Tally Stdnt SIM'!CB175+'Tally Stdnt SIM'!CP175+'Tally Stdnt SIM'!DD175+'Tally Stdnt SIM'!DR175). The total hours' completed per level, total simulation hours, total typical student experience per level, and typical student simulation experience per level is then available to any teacher responsible for classes at that level, with manual adjustment thereafter for individual class member absences (in other words, this system does not purport to track individual training time completion per individual student, but rather tracks and reports training time completion by student level and typical hours for typical student experience (total and simulation) by student level, from which individual training time completion can be easily customized by the teacher who takes attendance in class.) Time slots that are still available are represented by fields left white/uncolored, because the user manually colors each time slot at the time the room is scheduled to give a visual indication of level of simulation laboratory use for the scheduled period. The primary functions of this "Summary" sheet therefore are: a) when a single coded data entry is made with unrelated classifying text strings and locked in (by depressing the enter key or moving to another field), the hours are updated as coded (that is, total hours the room or lab is scheduled, total hours per student level, total hours for simulation per student level, total hours for typical student within student level, and total simulation hours for typical student within student level are updated overall to reflect additional hours as the corresponding entries are made); b) the corresponding student level sheet (Freshman, Sophomore, Junior, etc.) is updated by duplicating the single coded data entry field onto the appropriate student level sheet; and c) enables the user to query with multiple criteria (unrelated text strings, with no known limit to the number of variables) to sum total hours and count occurrences of user defined criteria, which can be redefined for additional queries.

Figure 2:
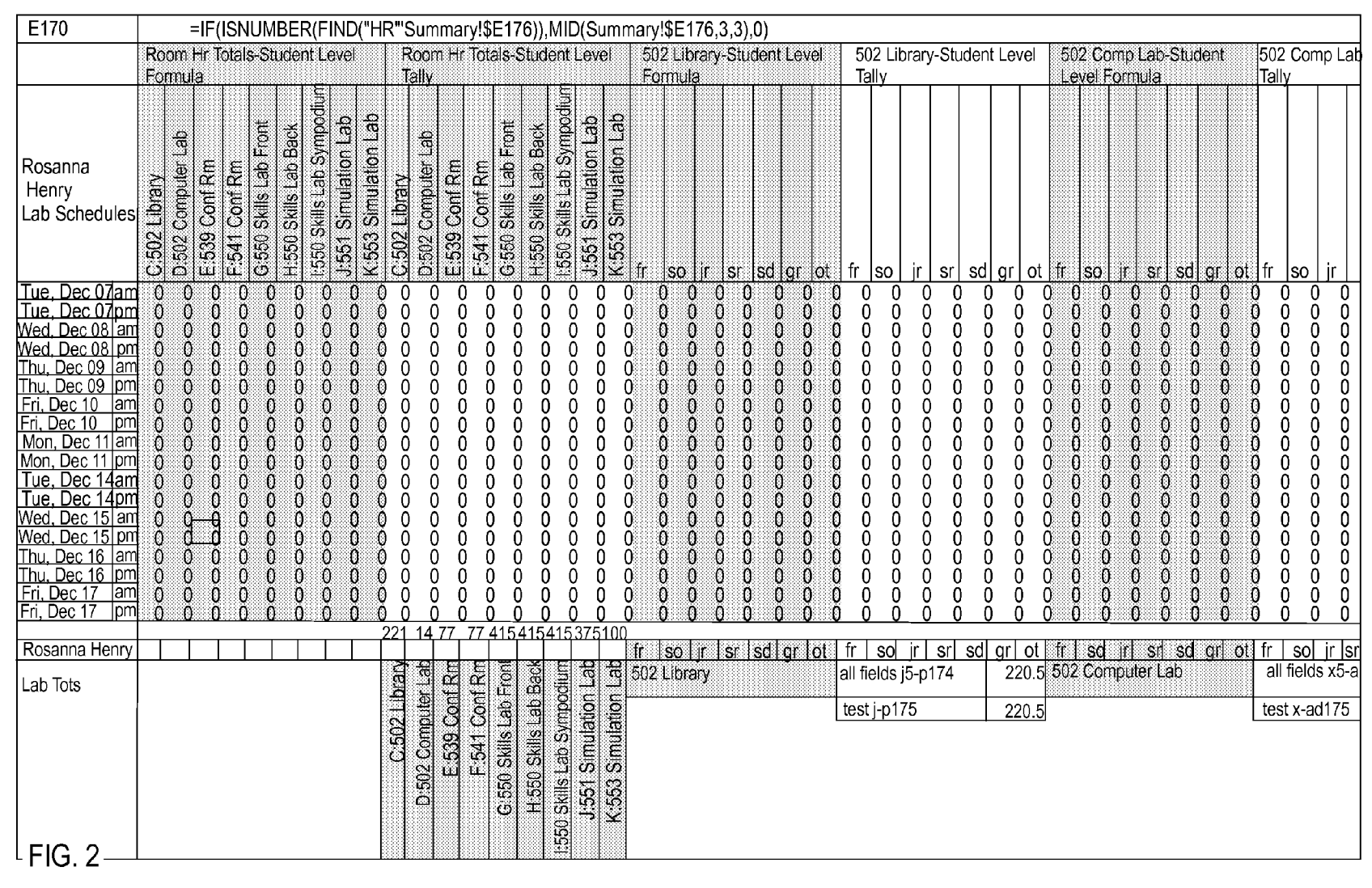

Referring now to FIG. 2, FIG. 2 is a screen shot of the "Tally" screen of the present spreadsheet, used in the first embodiment of the present system and method. The dates represented in Column A are copied from Summary Sheet utilizing a formula corresponding to the Summary sheet, formula =(Summary!A10), so that when the Summary sheet is updated, the Tally sheets are automatically updated. Column headings (Column C, 502 Library-Formula, 502

Library-Tally, fr, so, jr, etc.) are identifiers for ease of formula development and maintenance. Formulas to filter by room and student level are represented in the pale yellow cells and are variations of: a. =IF(ISNUMBER((FIND("fr-",Summary!$C158))),MID(Summary!$C158,3,3),0); i. ISNUMBER—defining data to be extracted as a number; ii. FIND ("fr-",Summary!$C158—to look at Summary sheet, absolute column C, varying row 158 to determine if "fr-" is true; iii. MID(Summary!$C158,3,3),0)—extract from Summary sheet, absolute column C, varying row 158, beginning position 3, to include positions (3, 4, 5), if true, else return 0; b. =IF(CW5=FALSE,VALUE(0),VALUE(CW5))—because the data returned with the preceding formula was incalculable, the column could not be summed, a supplemental formula to translate the numeric value was necessary; i. (CW5=FALSE,VALUE(0)—if varying field CW5 is false, return 0; ii. VALUE(CW5)—if the field is true, return the value of the field. The columns are summed for each level, formula =SUM(J5:J175). Sheets for Tally SIM, Tally Stdnt, Tally Stdnt SIM and Tally Open Query utilize the same governing formula and do not appear herein because the Tally Sheet is representative of the "tally" functions.

Figure 3:
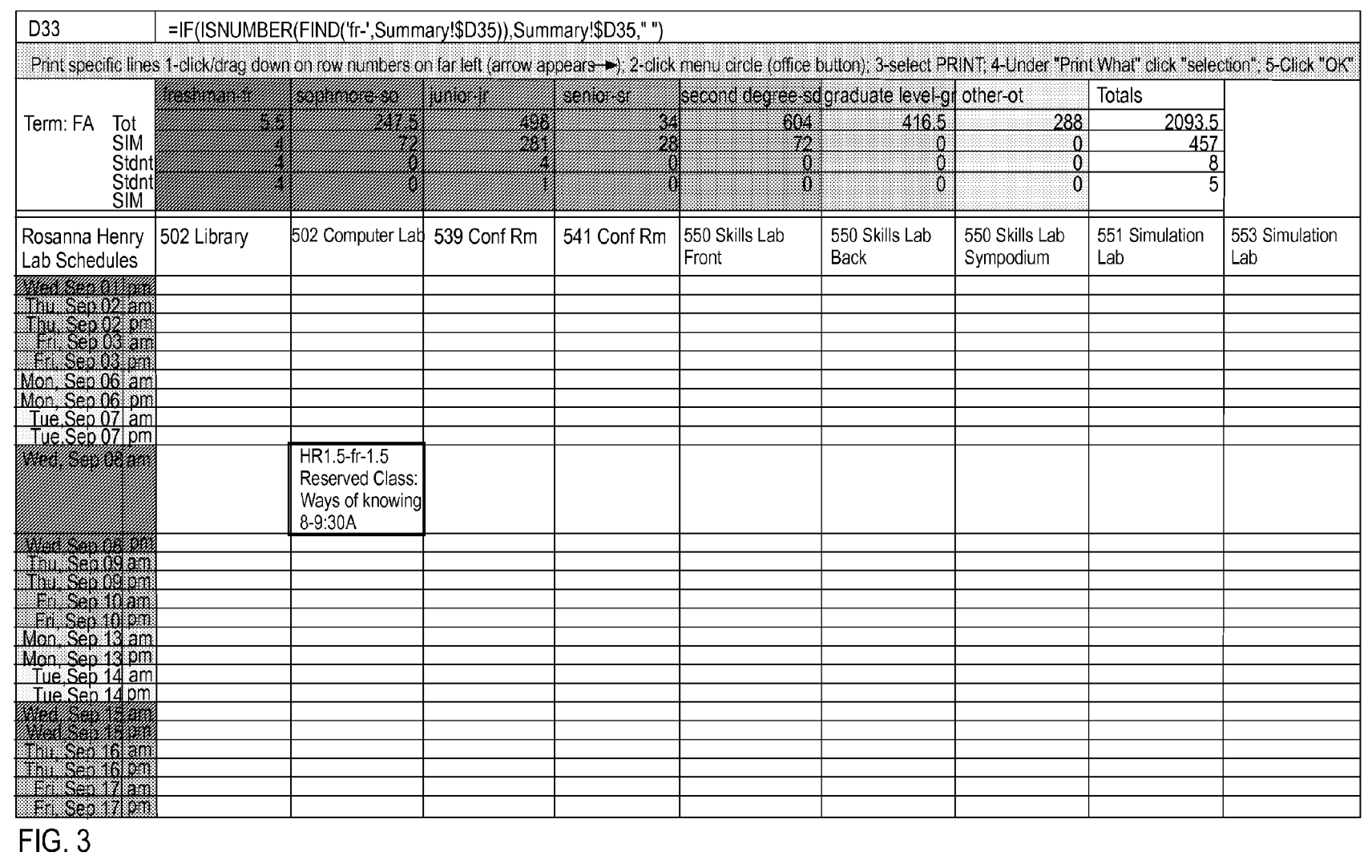

Referring now to FIG. 3, which is the Freshman screen of the first embodiment which is further typical of any student level of any system within the concept of this invention, the purpose of this sheet is to display entries for the "Freshman" student level exclusively. This sheet structure and function is repeated for any/all student levels for as many tabs or screens as the spreadsheet program will accommodate. Additional criteria can be identified and summed. These entries are not color coded because all data is exclusive to the level. The structure of this worksheet (dates, headings, etc.) is copied using formula, =(Summary!A10), so that when the Summary sheet is updated all related sheets (Tally, Freshman, etc.) are updated. Total hours for each level are displayed and there is likewise display of all rooms/labs scheduled for the applicable student level. The Freshman level sheet is updated by duplicating the single coded data entry field using formula, =IF(ISNUMBER(FIND("fr-",Summary!$C11)),Summary!$C11," ").

FIG. 4 is the "Sophomore" sheet layout and is similar to or the same as FIG. 3 except, for the first embodiment, the sheet shows a different level of student assigned to the laboratories or other scheduled resources. The same formulas, =(Summary!A10) and =IF(ISNUMBER(FIND("fr-",Summary!$C11)),Summary!$C11," "), govern this and any other student-level specific sheet layout in the spreadsheet of the present system and method. The Figures for Junior and Senior therefore do not appear herein because the Freshman and Sophomore sheets are representative of any grade level sheet and one skilled in the art can adapt the student grade levels to any student grade level system that the present invention is used to manage, from K-12 to graduate and post-graduate or any student level scheme identifiable with succession criteria. FIG. 5, showing the screen for "Second Degree" is representative of a different or successive level of training, for example, a candidate who has already finished undergraduate course work and is undertaking another ("second") degree of study.

Referring now to FIG. 6 is the "Open Query" sheet layout and is similar to FIGS. 3-5 except that it represents the output from a user defined multiple-criteria (unrelated text strings, with no known limit to the number of variables) query and sums total hours and counts occurrences of user defined criteria. Again, a purpose of this sheet is to display entries that satisfy the user defined criteria exclusively in printable format.

Figure 7:
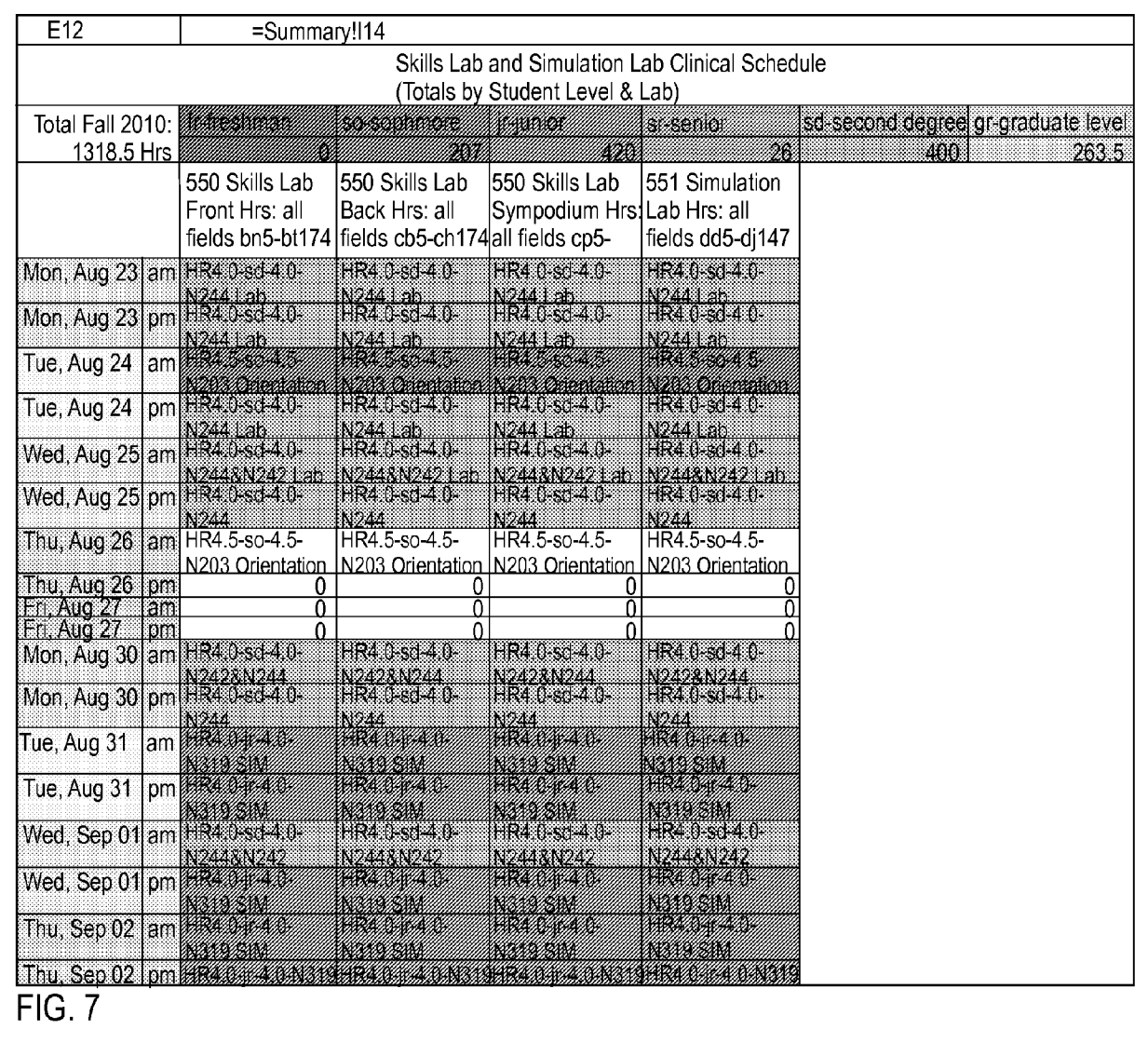

Referring now to FIG. 7, which is the "Labs 550-551" screen, a tab in the spreadsheet is used to represent exclusively lab/skill development and simulations as to facilities as scheduled. Although the sheet is entitled "Labs 550-551" for the purpose of the first embodiment, all physical facilities scheduled by the present system and method may be displayed on this sheet regardless of the name of each facility. For institutional management purposes, this screen becomes a tracking tool with evidence to managers, and as necessary to the applicable institutional administration, of scheduling density which suggests that additional facilities should be planned and constructed.

The present system and method, described here in part as being implemented on an Excel or similar spreadsheet, can be implemented on virtually any computer spreadsheet, including but not limited to open source software such as the software known as Open Office at this writing.

The above first embodiment of the invention is very particular to an undergraduate/graduate nursing school at a University, providing facilities tracking and student hours completion reporting as described above and shown in detail in FIGS. 1-7. However, the invention applies to any educational or training setting in which two or more grade levels of instruction, two or more classifications of training (simulation and non-simulation), or typical student experience within grade level need to be distinguished throughout scheduling and tracking of two or more training facilities with constant updated reporting of student hours' completed per level and constantly updated scheduling information (with grade designation per schedule entry) per facility. Generic formulas, then, generified to grade level "xl" as variably specified still filtering by grade level and room may be variations of the following: a. =IF(ISNUMBER(FIND("xl-",Summary!$J10))*(FIND("SIM-",Summary!$J10)),MID(Summary!$J10,3,3),0); i. ISNUMBER—defining data to be extracted as a number; ii. FIND("fr-",Summary!$J10—to look at Summary sheet, absolute column J, varying row 10 to determine if "fr-" is true; iii. FIND("SIM-",Summary!$J10—to look at Summary sheet, absolute column J, varying row 10 to determine if "SIM" is true; iv. MID(Summary!$J10,3,3),0)—extract from Summary sheet, absolute column J, varying row 10, beginning position 3, to include positions (3, 4, 5), if true, else return 0; b. =IF(CW5=FALSE,VALUE(0),VALUE (CW5))—because the data returned with the preceding formula was incalculable, the column could not be summed, a supplemental formula to translate the numeric value was necessary; i. (CW5=FALSE,VALUE(0)—if varying field CW5 is false, return 0; ii. VALUE(CW5)—if the field is true, return the value of the field. The columns are summed for each level, formula =SUM(J5:J175).

The system and method described herein satisfies the following needs: 1) Combined calendar (color coded by day of week) and room assignment and allotment of hours; 2) Novice-level, single-cell, multiple-criteria data entry, color coding by student level (utilizing paint brush), with on-screen instructions such as (fr-4.0-N244 Lab SIM); 3) Single-cell student level classification, retrieval and totaling on Tally Sheet (simulation classification, infinite classification—64 nesting levels, 8,000 characters) utilizing both a unique formula =IF(ISNUMBER(FIND("fr-",Summary!$J10))*(FIND("SIM-",Summary!$J10)),MID(Summary!$J10,3,3),0), and formula (CW5=FALSE,VALUE(0); 4) Automatically summed totals by room, student level, simulation classification, infinite classification, etc. on Summary Sheet utilizing formulas =Tally!$C178&" Hrs: "&Tally!$J178, and =SUM (Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175); 5) Automatically summed totals by student level, simulation classification, infinite classification, etc on individualized student level sheets utilizing formula =SUM(Tally!K5:K175, Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175); 6) the structure of the Summary Sheet is copied to the student level sheets by formula, =(Summary!A10), so that when the Summary sheet is updated all related sheets (Tally, Freshman, etc.) are updated; and 7) the Maintenance/customization for a new calendar period and additional filtering criteria is completed via a combination of find/replace and complex macro functions.

An innovative feature of the present invention is that a single cell, with multiple non-adjacent unrelated text strings, can be filtered and have data extracted for reporting according to this specification. Because the system and method can track all desired differentials (such as whether a training facility is "simulation" or "non-simulation"), it is now possible to have Grade Level A taught Course B by Instructor C in a simulation capacity and the method can filter for all these features either individually or grouped. The importance of this innovation is that it is much simpler for the user to achieve tracking and reporting as just described rather than to have to use advanced features of spreadsheet usage such as Pivot Table or Advanced Filtering, which are at this writing unfamiliar and inconvenient to many spreadsheet users, whereas single cell entry is easily learned and repeated. In other words, single cell filtering according to the present invention takes a myriad of information and makes it database friendly, which in turn makes the present system and method very easy and effective to use. Notwithstanding the simplicity of the system, macros can be added as desired, for example to customize and update individual system facets. The end user is prompted to supply customizing headers (room numbers, student levels) and additional filters for summing (Sim, non-Sim, Instructor, etc.). Nonetheless, the present system as described may be used successfully without any added macros or other features.

Indeed, the present single cell entry can be applied to track virtually any dynamic multi-criteria system. Because the broadest application of the present innovation is a multi-criteria filter row formula, such a filter row formula can be defined and modified by the user as preferred at any time (additional rows can be added for multi-criteria comparisons), even using just the single cell data entry as described elsewhere herein. Just as the user can query the spreadsheet as to how many (sum) and how many occurrences of (count) there are for: [freshman],[lab], [course#], [SIM], [Instructor], [any variable] and etc., with no known limit to the number of variables, this approach may be extrapolated to any other dynamic multi-criteria system's variables. For example, one could track instructor workload for several teachers over multiple classes in multiple subjects the same way, using multiple variables and "sum" and "count" together to achieve a joint function (both sum and count) that spreadsheets heretofore have not been looked to achieve. Typically, multi-criteria dynamic systems have heretofore been managed using a database instead of a spreadsheet, or at least, if by spreadsheet, using the advanced spreadsheet features referred to earlier in this paragraph. By "multi-criteria" is meant at least two criteria which require summing and at least two criteria which require counting.

In a second embodiment of the invention, a more elaborate array of formulas are populated into the spreadsheet to accomplish the same general goal of data entry and automated computer processing of facilities scheduling information in a spreadsheet, in which the facilities scheduling requires tracking of hours scheduled as well as tracking and reporting of two or more user grade levels xl, at least one user experience xe, and at least one user experience subset xs, the latter of which is usually but not necessarily a "SIM" experience, that is, a simulation experience as a subset of total student experience. The reason "student experience" is important is that when classes are scheduled into a facility and there are multiple students in a class, hands-on laboratory or simulation experience for that student may well be for a shorter time than the class is scheduled into the facility, but for licensure or academic reasons it will be very important to track the individual student experience (including simulation experience, which is usually a subset of laboratory or other experience overall) to report individual student achievements and training hours. When a class is scheduled to use a particularly laboratory or other facility, then, "student experience" or a typical subset "student simulation experience" can track usage for each individual student, as well as for the class as a whole. The overview of the second embodiment of the invention is to implement entry and capture of all the quantitative scheduling data, together with optional and potentially unpredictable text strings that may accompany complex facilities' scheduling data entry. This data capture means that hours scheduled, user grade levels, student experience, and student experience subset, etc., are tracked along with additional optional data, by entering data in a single entry location, such that the data may be filtered, summed and counted and the entire data event is summarized automatically in various single cells that are easy for a user to consult, read and understand. In this way, by single data entry of scheduling data, all output data is available in customized cells as outputs to a user, as described herein, by operation of the formulas in the spreadsheet.

Although the second embodiment of the invention is conceptually similar to the first embodiment described above, it uses different formulas to achieve similar results in a similar way. The best way to articulate the second embodiment of the invention is to provide the following detailed example, in association with FIGS. 8-17 herewith.

Example 1

Referring now to FIGS. 8-17, the Figures show a series of screen shots representative of the spreadsheet display of the second embodiment of the present invention.

Figure 8:
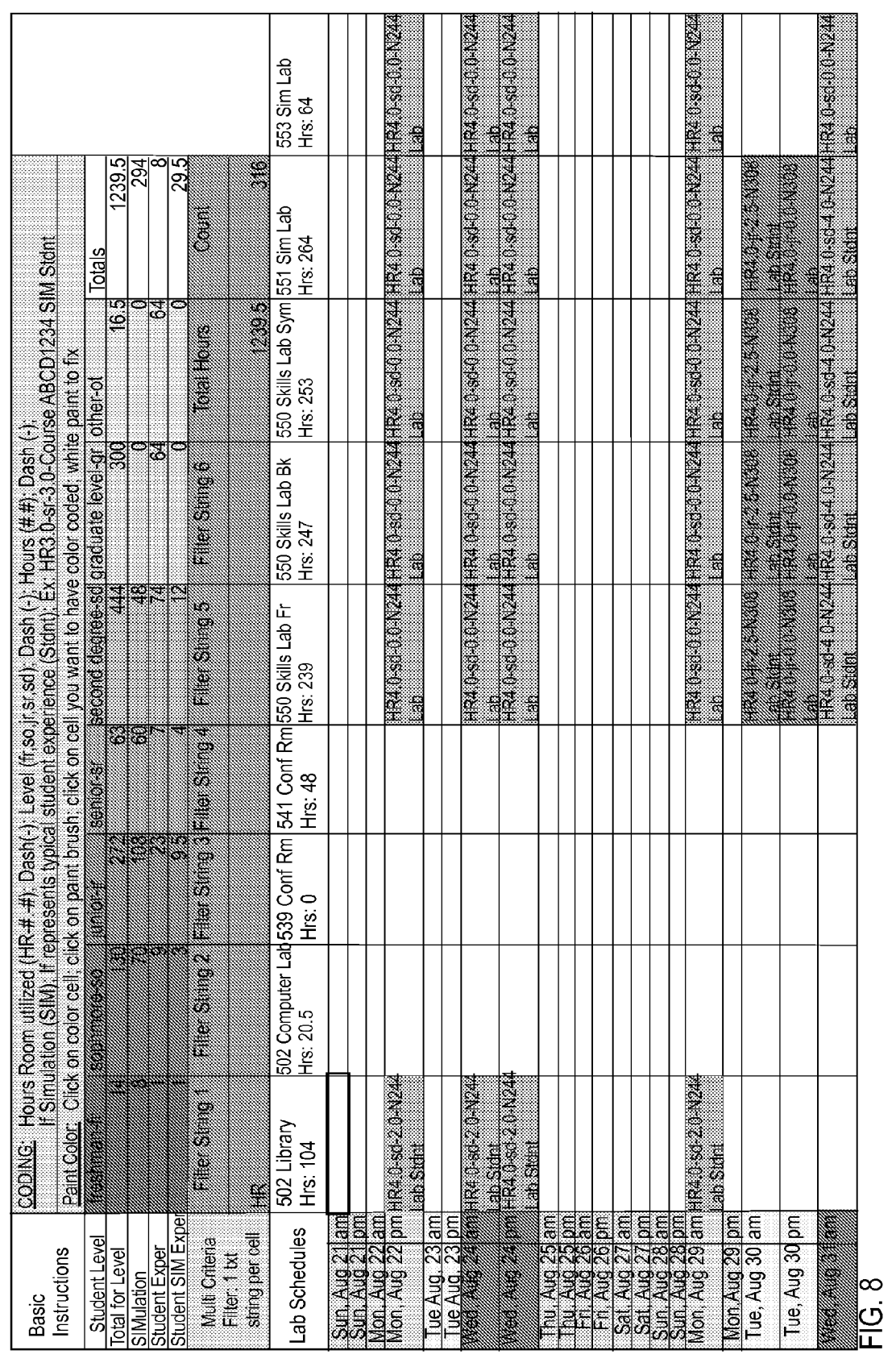

Referring to FIG. 8, a display indicates the coding convention to be used, in the yellow section of the Summary Sheet at columns C-J, row 1. The instruction for the purpose of this example reads, "CODING: Hours Room utilized (HR#.#); Dash (-); Level (fr, so, jr, sr, sd); Dash (-); Hours (#.#); Dash (-); If Simulation (SIM); If represents typical student experience (Stdnt); Ex: HR3.0-sr-3.0-Course ABCD1234 SIM Stdnt." In other words, this coding instruction provides the format for data entry, on the Summary sheet, for any row (calendar date and time) or column (facility), by hours followed by level ("xl") followed by student experience specified as to SIM if applicable. On the Summary Sheet, also, multi-criteria filters may be added to the cells at C-J row 9 with the convention of one text string per cell. One of the aspects of the invention that makes the present spreadsheet so easy for the user is that all actual data entry (that is, calendar entry, not customization) takes place on the Summary Sheet and is extremely intuitive—the user selects the column for the applicability facility to be scheduled, and then choose the calendar date (divided by am or pm) by spreadsheet row as shown in FIG. 8. As long as the data is entered according to the provided Coding instructions, the rest of the spreadsheet and its formulas function as follows, automatically, to provide an output to a user.

Referring now to FIG. 17, which represents the Customize sheet of this example, all cells accept customization entry, and by simple updating can copy/designate room description, level description and level codes, and first date of calendar. For example, CELL F14=DATE(E14,C14,D14) combines three cells to make 1 date cell to create a beginning date for the calendar, which is then fed into the Summary Sheet. To set the "student level" classifications using the Customize sheet, use the formulas "CELL C3, CELL D3 freshman—fr-=Customize!C7&"-"&Customize!C8 sophomore—so-=Customize!D7&"-"&Customize!D8 and etc.

Referring again to FIG. 8, Summary Sheet, the following formulas set the first date: for CELL C11 Sun, August 21=Customize!$F$14; for CELL C13 Mon, August 22=SUM (Customize!$F$14+1) and thus by +1, +2, etc. set the balance of the calendar.

Referring to all of FIGS. 8-17, various formulas are implemented as described below.

The following formula takes totals from the Tally tab and CELL C4, CELL D4 Number representing # fr (freshman) level is =Tally!L739; Number representing # so (sophomore) level is =Tally!M739 etc.

The following formulas copy the room description and tag "Hrs:' from the Tally sheet (the room description originates from the Customize sheet) CELL C10 for 502 Library Hrs: # of hours allotted to room =Tally!C4&"Hrs: "&Tally!C739 and CELL D10 for 502 Comp Lab Hrs: # of hours allotted to room =Tally!D4&" Hrs: "&Tally!D739.

On the Freshman Sheet, FIG. 9, (and analogously on all other levels so, jr, sr, sd, gr, ot,) the following formulas copy level description and code from the Summary sheet: CELL C4, CELL D4 for freshman—fr-=(Summary!C3) and for sophomore—so-=(Summary!D3); as do CELL A11, CELL A13 for Sun, August 21=(Summary!A11), and for Mon, August 22=(Summary!A13). The following formulas copy the totals by level, for SIM, for stdnt, and for stdnt/SIM: CELL C5, CELL C6, CELL D5; Freshman total for level #=(Summary!C4); Freshman SIM #=(Summary!C5); Sophomore total for level #=(Summary!D4). The following formulas copy the room description from the Customize sheet: CELL C10, CELL D10 for 502 Library =Customize!C2; and for 502 Comp Lab =Customize!D2. The following formulas copy the data entered on the Summary sheet if "xl-" is true; if not the formula adds a space: CELL C11, CELL C12, CELL D11. If cell C11 (C12, D11, etc.) on Summary sheet contains "fr-" copies data entered in cell C11 (C12, D11, etc), if not enters [space]. See also the following formulas: =IF(ISNUMBER(FIND("fr-",Summary!C11)),Summary!C11," "); =IF(ISNUMBER(FIND("fr-",Summary!C12)),Summary!C12," "); and =IF(ISNUMBER(FIND("fr-",Summary!D11)),Summary!D11," ").

Figure 11:
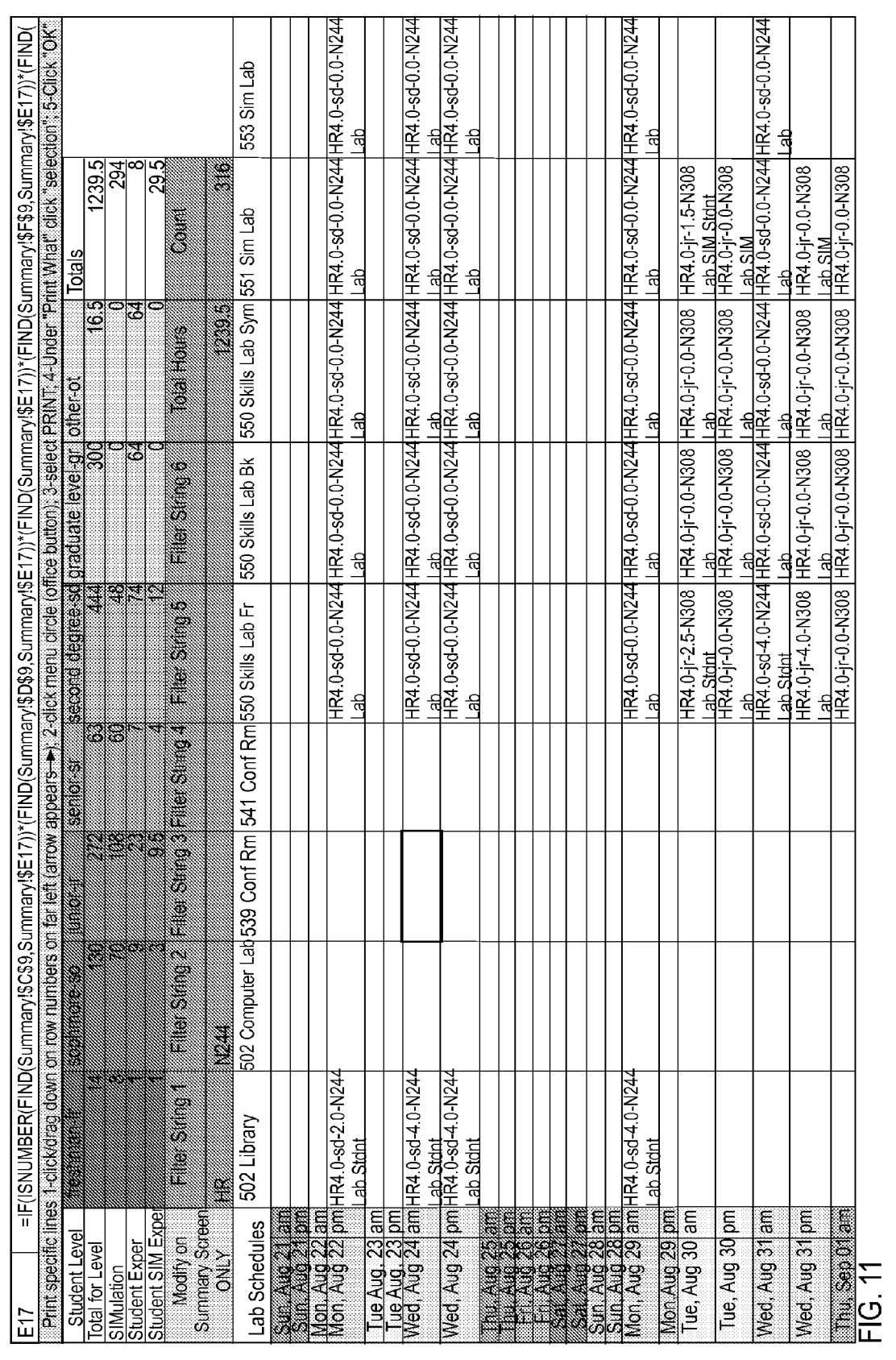

Referring now to FIG. 11, the "Open Query" sheet, the following formulas copy data as described from Summary sheet, Customize sheet and Tally Sheet:

These formulas copy level description and code from Summary sheet:
CELL C4, CELL D4
freshman—fr-=(Summary!C3)
sophomore—so-=(Summary!D3)
These formulas copy date from Summary sheet:
CELL A11, CELL A13
Sun, August 21=(Summary!A11)
Mon, August 22=(Summary!A13)
These formulas copy the totals by level, for SIM, for stdnt, for stdnt/SIM:
CELL C4, CELL C5, CELL C6, CELL C7, CELL D4
Freshman total for level #=(Summary!C4)
Freshman SIM #=(Summary!C5)
Freshman stdnt #=(Summary!C6)
Freshman stdnt/SIM #=(Summary!C7)
Sophomore total for level #=(Summary!D4)
These formulas copy the room description from the Customize sheet:
CELL C10, CELL D10
502 Library=Customize!C2
502 Comp Lab=Customize!D2
These formulas copy the data entered on Summary sheet if "xl-" is true, if not puts in [space]:
CELL, C11, CELL C12, CELL D11
If cell C11 (C12, D11, etc.) on Summary sheet contains defined filter data and copies data entered in cell C11 (C12, D11, etc) if true, if not enters [space]
=IF(ISNUMBER((FIND(Summary!$C$9,Summary!$C11))*(FIND(Summary!$D$9,Summary!$C11))*(FIND(Summary!$E$9,Summary!$C11))*(FIND(Summary!F$9,Summary!$C11))*(FIND(Summary!$H$9,Summary!$C11))*(FIND(Summary!$H$9,Summary!$C11))),(Summary!$C11)," ")
=IF(ISNUMBER((FIND(Summary!$C$9,Summary!$C12))*(FIND(Summary!$D$9,Summary!$C12))*(FIND(Summary!$E$9,Summary!$C12))*(FIND(Summary!$F$9,Summary!$C12))*(FIND(Summary!$G$9,Summary!$C12))*(FIND(Summary!$H$9,Summary!$C12))),(Summary!$C12)," ")
=IF(ISNUMBER((FIND(Summary!$C$9,Summary!$D11))*(FIND(Summary!$D$9,Summary!$D11))*(FIND(Summary!$E$9,Summary!$D11))*(FIND(Summary!$F$9,Summary!$D11))*(FIND(Summary!$G$9,Summary!$D11))*(FIND(Summary!$H$9,Summary!$D11))),(Summary!$D11)," ")
These formulas copy the totals from the Tally sheet:
CELL I9, CELL J9
Total Hours for multi-criteria filter=SUM(Tally!AN739:AV739)
Total count of occurrences for multi-criteria filler =SUM(Tally!AN740:AV740)

Referring now to FIG. 16, the "Selected Period" sheet, the following formulas copy data as described from the Summary sheet and Tally sheet.

These formulas copy the level description and code from the Summary sheet as follows:
CELL C4, CELL D4
freshman—fr-=(Summary!C3)
sophomore—so-=(Summary!D3)
These formulas copy date from Summary sheet
CELL A11, CELL A13
Sun, August 21=(Summary!A11)
Mon, August 22=(Summary!A13)
These formulas copy the totals by level, for SIM, for stdnt, for stdnt/SIM ONLY for selected dale period and defined criteria from the Tally Sheet
CELL C5, CELL C6, CELL C7, CELL C8, CELL D5
Freshman total for level #=Tally!CS739
Freshman SIM #=Tally!DN739
Freshman stdnt #=Tally!E1739
Freshman stdnt/SIM #=Tally!FD739
Sophomore total for level #=Tally!CV739

These formulas copy the room description and totals ONLY for the selected date period and defined criteria from the Tally sheet

CELL C10, CELL D10

502 Library=Tally!CH4&" Hrs: "&Tally!CH739

502 Comp Lab=Tally!CI4&" Hrs: "&Tally!CI739

These formulas copy the data entered on Summary sheet if "xl-" is true, if not enters [space]

CELL C11, CELL C12, CELL D11

If cell C11 (C12, D11, etc.) on Summary sheet is on or within selected date period and contains defined fitter data, then copies data entered in cell C11 (C12, D11, etc) if true, if not enters [space]

=IF(ISNUMBER((FIND(Summary!$C$9,Summary!$C11))*(FIND(Summary!$D$9,Summary!$C11))*(FIND(Summary!$E$9,Summary!$C11))*(FIND(Summary!$F$9,Summary!$C11))*(FIND(Summary!$G$9,Summary!$C11))*(FIND(Summary!$H$9,Summary!$C11))),(Summary!$C11)," ")

=IF(ISNUMBER((FIND(Summary!$C$9,Summary!$C12))*(FIND(Summary!$D$9,Summary!$C12))*(FIND*Summary!$E$9,Summary!$C12))*(FIND(Summary!$F$9,Summary!$C12))*(FIND(Summary!$G$9,Summary!$C12))*(FIND(Summary!$H$9,Summary!$C12))),(Summary!$C12)," ")

=IF(ISNUMBER((FIND(Summary!$C$9,Summary!$D11))*(FIND(Summary!$D$9,Summary!$D11))*(FIND(Summary!$E$9,Summary!$D11))*(FIND(Summary!$F$9,Summary!$D11))*(FIND(Summary!$G$9,Summary!$D11))*(FIND(Summary!$H$9,Summary!$D11))),(Summary!$D11)," ")

These formulas copy totals from the Tally sheet:

CELL I9 is total Hours for selected date period multi-criteria filter
=SUM(Tally!CH739:CP739)

CELL J9 is total count of occurrences for selected date period multi-criteria filter
=SUM(Tally!CH740:CP740)

Figure 13:
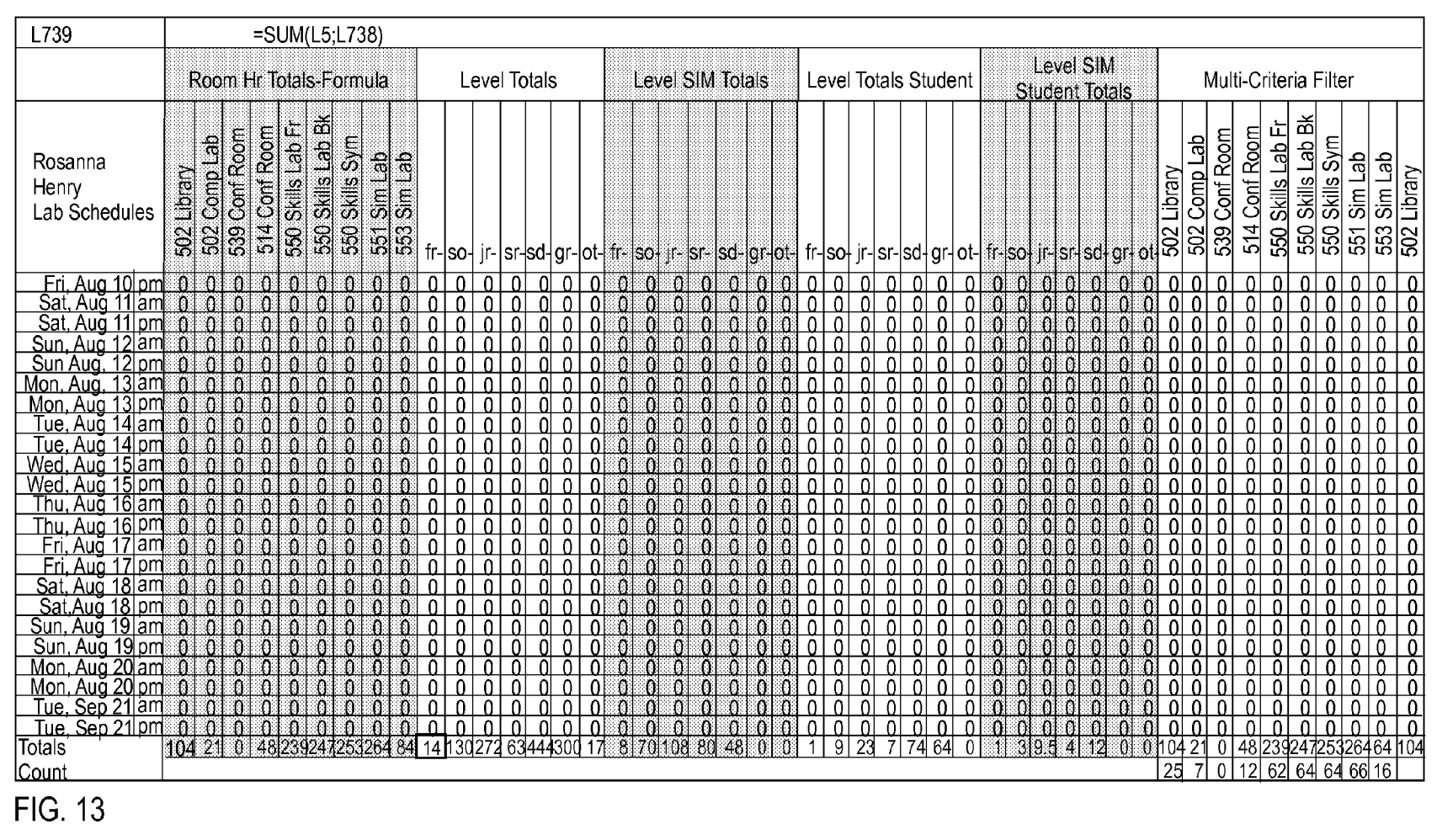
Figure 14:
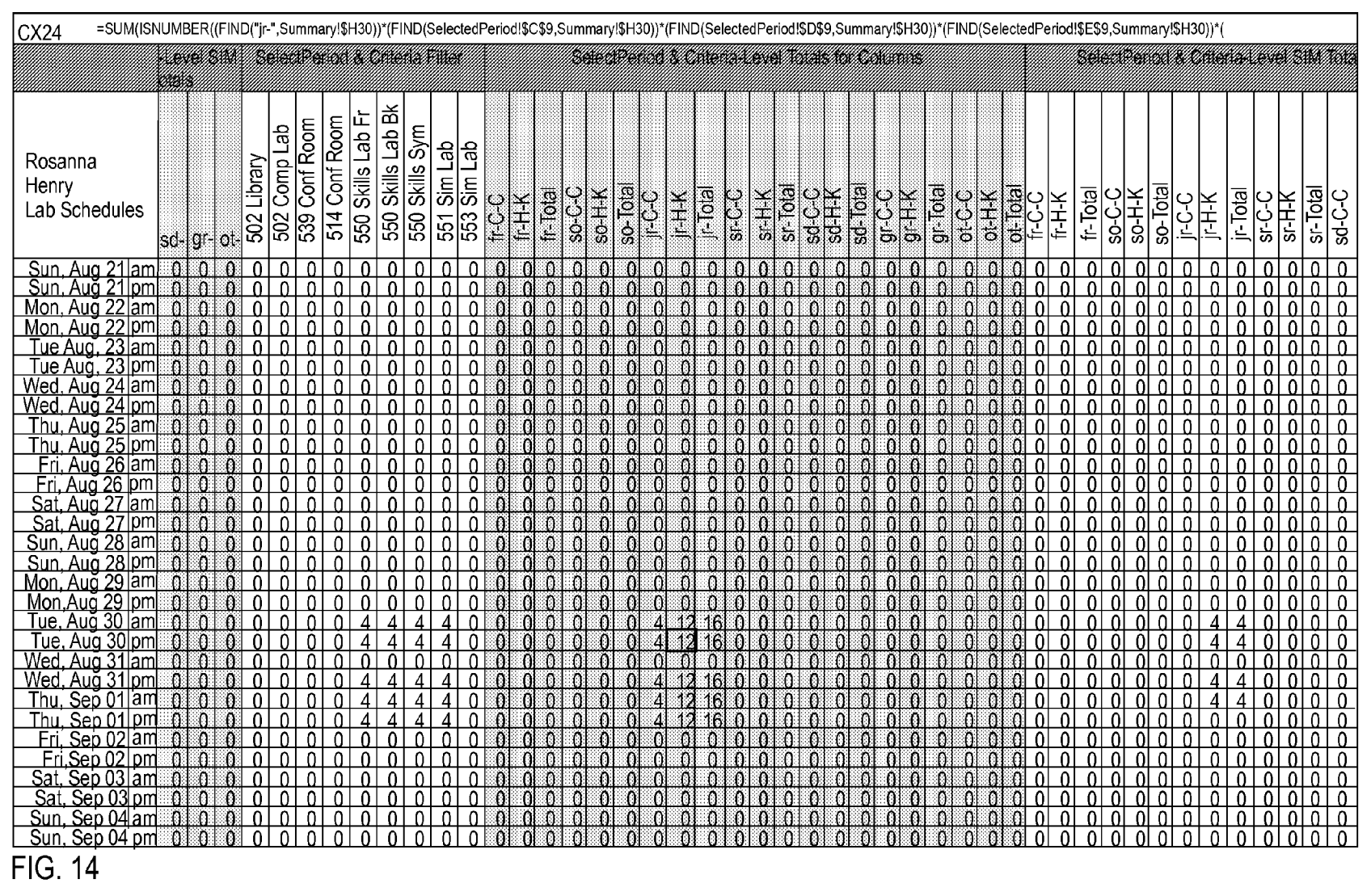
Figure 15:
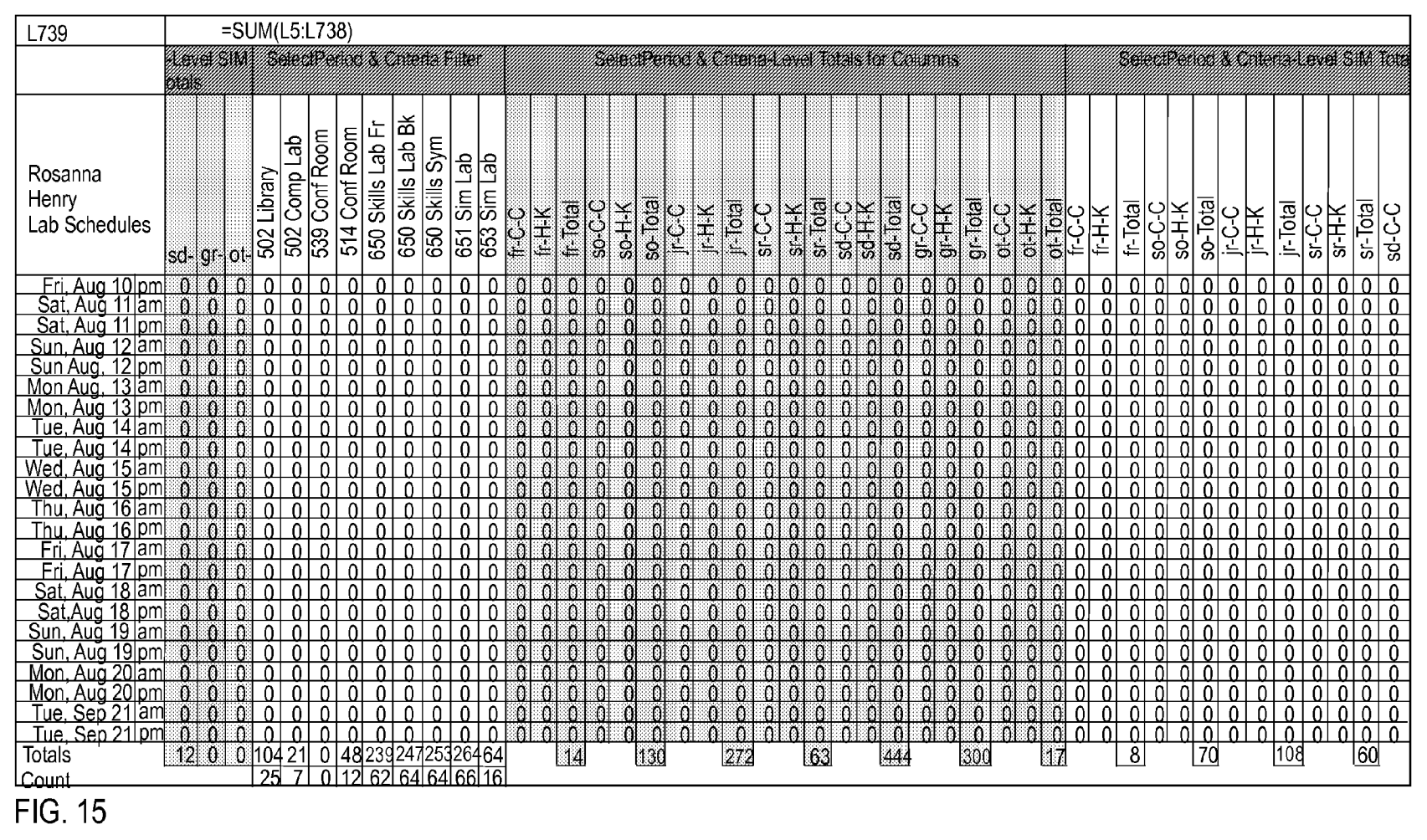

Referring now to FIGS. 13, 14 and 15, which are three screen shots displaying columns of the Tally Sheet, the Primary Headings are typed in for easy identification without formulas. The following formulas and conventions are used on the Tally Sheet:

These formulas set up headings and subheadings:
Room Hr Totals-Formula (both headings have same subheadings)
Multi-Criteria Filter
  CELL C4-502 Library from Customize sheet
    =Customize!$C$2
  CELL D4-502 Comp Lab from Customize sheet
    =Customize!$D$2
Level Totals (each heading has same subheadings)
Level SIM Totals
Level Totals Student
Level SIM Student Totals
  CELL L4-Fr-from Customize sheet
    =Customize!$C$8
  CELL M4-So-from Customize sheet
    =Customize!$D$8

SelectPeriod & Any/All Criteria Filter
  CELL CH4-502 Library from Customize sheet
    =Customize!$C$2
  CELL CI4-502 Comp Lab from Customize sheet
    =Customize!$D$2
SelectPeriod & Any/All Criteria-Level Totals for Columns
SelectPeriod & Any/All Criteria-Level SIM Totals for Columns
SelectPeriod & Any/All Criteria-Level Student for Columns
SelectPeriod & Any/All Criteria-Level SIM & Student Totals
  CELL CQ4-fr-C-G from Customize sheet
    =Customize!$C$8&"C-G"
  CELL CR4-fr-H-K from Customize sheet
    =Customize!$C$8&"H-K"
  CELL CS4-Total from Customize sheet
    =Customize!$C$8&"Total"
  CELL CT4-so-C-G from Customize sheet
    =Customize!$D$8&"C-G"
  CELL CU4-so-H-K from Customize sheet
    =Customize!$D$8&"H-K"
  CELL CV-Total from Customize sheet
    =Customize!$D$8&"Total"

These formulas copy date from Summary sheet:
CELL A5 Sun, August 21=(Summary!A11)
CELL A13 Mon, August 22=(Summary!A13) etc.

These calculating formulas from the Tally sheet show 3 examples of each to establish a pattern and demonstrate continuity.

Room Hr Totals-Formula—the column sums from these are "copied" to Summary sheet row 10, columns C-K:

CELL C5 for 502 Library represents number of hours room is scheduled for use in cell C11; if "HR" is found in C11 then returns 3 numbers from third position, else 0
=IF(ISNUMBER(FIND("HR",Summary!$C11)),MID(Summary!$C11,3,3)*1,0)

CELL C739 for 502 Library represents number of hours for year scheduled for specified room
=SUM(C5:C738)

CELL C6 for 502 Library represents number of hours room is scheduled for use in cell C12; if "HR" is found in C12 then returns 3 numbers from third position, else 0
=IF(ISNUMBER(FIND("HR",Summary!$C12)),MID(Summary!$C12,3,3)*1,0)

CELL C739 for 502 Library represents number of hours for year scheduled for specified room
=SUM(C5:C738)

CELL D5 for 502 Comp Lab represents number of hours room is scheduled for use in cell D11; if "HR" is found in D11 then returns 3 numbers from third position, else 0
=IF(ISNUMBER(FIND("HR",Summary!$D11)),MID(Summary!$D11,3,3)*1,0)

CELL D739 for 502 Comp Lab represents number of hours for year scheduled for specified room
=SUM(D5:D738)

Level Totals—the column sums from these are "copied" to Summary sheet row 4, columns C-K:

CELL L5 for fr-represents number of hours for all rooms scheduled for freshman; if "fr-" is found in Summary!C11,D11,E11,F11,G11,H11,I11,J11 and/or K11 returns sum of 3 numbers from each true cell third position, else 0

=SUM(IF(ISNUMBER(FIND("fr-",Summary!$C11)),
MID(Summary!
$C11,3,3)*1,0)+IF(ISNUMBER(FIND("fr-",Summary!
$D11)),MID(Summary!
$D11,3,3)*1,0)+IF(ISNUMBER(FIND("fr-",Summary!
$E11),MID(Summary!
$E11,3,3)*1,0)+IF(ISNUMBER(FIND("fr-",Summary!
$F11)),MID(Summary!
$F11,3,3)*1,0)+IF(ISNUMBER(FIND("fr-",Summary!
$G11)),MID(Summary!
$G11,3,3)*1,0)+IF(ISNUMBER(FIND("fr-",Summary!
$H11)),MID(Summary!
$H11,3,3)*1,0)+IF(ISNUMBER(FIND("fr-",Summary!
$I11)),MID(Summary!
$I11,3,3)*1,0)+IF(ISNUMBER(FIND("fr-",Summary!
$J11)),MID(Summary!
$J11,3,3)*1,0)+IF(ISNUMBER(FIND("fr-",Summary!
$K11)),MID(Summary!$K11,3,3)*1,0))

CELL L6 for fr-represents number of hours for all rooms scheduled for freshman; if "fr-" is found in Summary! C12,D12,E12,F12,G12,H12,I12,J12 and/or K12 returns sum of 3 numbers from each true cell third position, else 0

=SUM(IF(ISNUMBER(FIND("fr-",Summary!$C12)),
MID(Summary!
$C12,3,3)*1,0)+IF(ISNUMBER(FIND("fr-",Summary!
$D12)),MID(Summary!
$D12,3,3)*1,0)+IF(ISNUMBER(FIND("fr-",Summary!
$E12)),MID(Summary!
$E12,3,3)*1,0)+IF(ISNUMBER(FIND("fr-",Summary!
$F12)),MID(Summary!
$F12,3,3)*1,0)+IF(ISNUMBER(FIND("fr-",Summary!
$G12)),MID(Summary!
$G12,3,3)*1,0)+IF(ISNUMBER(FIND("fr-",Summary!
$H12)),MID(Summary!
$H12,3,3)*1,0)+IF(ISNUMBER(FIND("fr-",Summary!
$I12)),MID(Summary!
I12,3,3)*1,0)+IF(ISNUMBER(FIND("fr-",Summary!
$J12)),MID(Summary!
$J12,3,3)*1,0)+IF(ISNUMBER(FIND("fr-",Summary!
$K12)),MID(Summary!$K12,3,3)*1,0))

CELL L739 (for both CELLS L5 and L6) for fr—represents number of hours for year for all rooms scheduled for freshman
=SUM(L5:L738)

CELL M5 for so-represents number of hours for all rooms scheduled for sophomore; if "so-" is found in Summary! C11,D11,E11,F11,G11,H11,I11,J11 and/or K11 returns sum of 3 numbers from each true cell third position, else 0

=SUM(IF(ISNUMBER(FIND("so-",Summary!$C11)),
MID(Summary!
$C11,3,3)*1,0)+IF(ISNUMBER(FIND("so-",Summary!
$D11)),MID(Summary!
$D11,3,3)*1,0)+IF(ISNUMBER(FIND("so-",Summary!
$E11)),MID(Summary!
$E11,3,3)*1,0)+IF(ISNUMBER(FIND("so-",Summary!
$F11,3,3)),MID(Summary!
$F11,3,3)*1,0)+IF(ISNUMBER(FIND("so-",Summary!
$G11)),MID(Summary!
$G11,3,3)*1,0)+IF(ISNUMBER(FIND("so-",Summary!
$H11)),MID(Summary!
$H11,3,3)*1,0)+IF(ISNUMBER(FIND("so-",Summary!
$I11)),MID(Summary!
$I11,3,3)*1,0)+IF(ISNUMBER(FIND("so-",Summary!
$J11)),MID(Summary!
$J11,3,3)*1,0)+IF(ISNUMBER(FIND("so-",Summary!
$K11)),MID(Summary!$K11,3,3)*1,0))

CELL M739 for fr-represents number of hours for year for all rooms scheduled for sophomore
=SUM(M5:M738)

Level SIM Totals—the column sums from these are "copied" to Summary sheet row 5, columns C-K:

CELL S5 for fr-represents number of hours for all rooms scheduled for freshman in SIM; if "fr-" and "SIM" are found in Summary! C11,D11,E11,F11,G11,H11,I11, J11 and/or K11 returns sum of 3 numbers from each true cell third position, else 0

=(SUM(IF(ISNUMBER((FIND("fr-",Summary!
$C11))*(FIND("SIM",Summary!$C11))),MID(Summary!
$C11,3,3)*1,0)+IF(ISNUMBER((FIND("fr-",Summary!
$D11))*(FIND("SIM",Summary!$D11))),MID(Summary!
$D11,3,3),0)+IF(ISNUMBER((FIND("fr-",Summary!
$E11))*(FIND("SIM",Summary!$E11))),MID(Summary!
$E11,3,3),0)+IF(ISNUMBER((FIND("fr-",Summary!
$F11))*(FIND("SIM",Summary!$F11))),MID(Summary!
$F11,3,3),0)+IF(ISNUMBER((FIND("fr-",Summary!
$G11))*(FIND("SIM",Summary!$G11))),MID(Summary!
$G11,3,3),0)+IF(ISNUMBER((FIND("fr-",Summary!
$H11))*(FIND("SIM",Summary!$H11))),MID(Summary!
$H11,3,3),0)+IF(ISNUMBER((FIND("fr-",Summary!
$I11))*(FIND("SIM",Summary!$I11))),MID(Summary!
$I11,3,3),0)+IF(ISNUMBER((FIND("fr-",Summary!
$J11))*(FIND("SIM",Summary!$J11))),MID(Summary!
$J11,3,3),0)+IF(ISNUMBER((FIND("fr-",Summary!
$K11))*(FIND("SIM",Summary!$K11))),MID(Summary!
$K11,3,3),0)))

CELL S6 for fr-represents number of hours for all rooms scheduled for freshman in SIM; if "fr-" and "SIM" are found in Summary! C12,D12,E12,F12,G12,H12,I12, J12 and/or K12 returns sum of 3 numbers from each true cell third position, else 0

=(SUM(IF(ISNUMBER((FIND("fr-",Summary!
$C12))*(FIND("SIM",Summary!$C12))),MID(Summary!
$C12,3,3)*1,0)+IF(ISNUMBER((FIND("fr-",Summary!
$D12))*(FIND("SIM",Summary!$D12))),MID(Summary!
$D12,3,3),0)+IF(ISNUMBER((FIND("fr-",Summary!
$E12))*(FIND("SIM",Summary!$E12))),MID(Summary!
$E12,3,3),0)+IF(ISNUMBER((FIND("fr-",Summary!
$F12))*(FIND("SIM",Summary!$F12))),MID(Summary!
$F12,3,3),0)+IF(ISNUMBER((FIND("fr-",Summary!
$G12))*(FIND("SIM",Summary!$G12))),MID(Summary!
$G12,3,3),0)+IF(ISNUMBER((FIND("fr-",Summary!
$H12))*(FIND("SIM",Summary!$H12))),MID(Summary!
$H12,3,3),0)+IF(ISNUMBER((FIND("fr-",Summary!
$I12))*(FIND("SIM",Summary!$I12))),MID(Summary!
$I12,3,3),0)+IF(ISNUMBER((FIND("fr-",Summary!
$J12))*(FIND("SIM",Summary!$J12))),MID(Summary!
$J12,3,3),0)+IF(ISNUMBER((FIND("fr-",Summary!
$K12))*(FIND("SIM",Summary!$K12))),MID(Summary!

$K12,3,3),0)))
CELL S739 (for both CELLS S5 and S6) for fr—represents number of hours for year for all rooms scheduled for freshman in SIM
=SUM(S5:S738)
CELL T5 for so-represents number of hours for all rooms scheduled for sophomore in SIM; if "so-" and "SIM" are found in Summary! C11,D11,E11,F11,G11H11,I11, J11 and/or K11 returns sum of 3 numbers from each true cell third position, else 0
=(SUM(IF(ISNUMBER((FIND("so-",Summary!$C11))*(FIND("SIM",Summary!$C11))),MID(Summary!$C11,3,3)*1,0)+IF(ISNUMBER((FIND("so-",Summary!$D11))*(FIND("SIM",Summary!$D11))),MID(Summary!$D11,3,3),0)+IF(ISNUMBER((FIND("so-",Summary!$E11))*(FIND("SIM",Summary!$E11))),MID(Summary!$E11,3,3),0)+IF(ISNUMBER((FIND("so-",Summary!$F11))*(FIND("SIM",Summary!$F11))),MID(Summary!$F11,3,3),0)+IF(ISNUMBER((FIND("so-",Summary!$G11))*(FIND("SIM",Summary!$G11))),MID(Summary!$G11,3,3),0)+IF(ISNUMBER((FIND("so-",Summary!$H11))*(FIND("SIM",Summary!$H11))),MID(Summary!$H11,3,3),0)+IF(ISNUMBER((FIND("so-",Summary!$I11))*(FIND("SIM",Summary!$I11))),MID(Summary!$I11,3,3),0)+IF(ISNUMBER((FIND("so-",Summary!$J11))*(FIND("SIM",Summary!$J11))),MID(Summary!$J11,3,3),0)+IF(ISNUMBER(FIND("so-",Summary!$K11))*(FIND("SIM",Summary!$K11))),MID(Summary!$K11,3,3),0)))
CELL T39 for fr-represents number of hours for year for all rooms scheduled for sophomore in SIM
=SUM(T5:T738)
Level Totals Student (a typical Stdnt experience)—the column sums from these are "copied" to Summary sheet row 6, columns C-K:
CELL Z5 for fr—represents number of hours for all rooms scheduled for freshman for Stdnt; if "fr-" and "Stdnt" are found in Summary! C11,D11,E11,F11,G11,H11,I11, J11 and/or K11 returns sum of 3 numbers from each true cell tenth position, else 0
=SUM(IF(ISNUMBER((FIND("fr-",Summary!$C11))*(FIND("Stdnt",Summary!$C11))),MID(Summary!$C11,10,3)*1,0)+IF(ISNUMBER((FIND("fr-",Summary!$D11))*(FIND("Stdnt",Summary!$D11))),MID(Summary!$D11,10,3)*1,0)+IF(ISNUMBER((FIND("fr-",Summary!$E11))*(FIND("Stdnt",Summary!$E11))),MID(Summary!$E11,10,3)*0,1)+IF(ISNUMBER((FIND("fr-",Summary!$F11))*(FIND("Stdnt",Summary!$F11))),MID(Summary!$F11,10,3)*1,0)+IF(ISNUMBER((FIND("fr-",Summary!$G11))*(FIND("Stdnt",Summary!$G11))),MID(Summary!$G11,10,3)*1,0)+IF(ISNUMBER((FIND("fr-",Summary!$H11))*(FIND("Stdnt",Summary!$H11))),MID(Summary!$H11,10,3)*1,0)+IF(ISNUMBER((FIND("fr-",Summary!$I11))*(FIND("Stdnt",Summary!$I11))),MID(Summary!$I11,10,3)*1,0)+IF(ISNUMBER((FIND("fr-",Summary!$J11))*(FIND("Stdnt",Summary!$J11))),MID(Summary!$J11,10,3)*1,0)+IF(ISNUMBER((FIND("fr-",Summary!$K11))*(FIND("Stdnt",Summary!$K11))),MID(Summary!$K11,10,3)*1,0))
CELL Z6 for fr-represents number of hours for all rooms scheduled for freshman for Stdnt; if "fr-" and "Stdnt" are found in Summary! C12,D12,E12,F12,G12,H12,I12, J12 and/or K12 returns sum of 3 numbers from each true cell tenth position, else 0
=SUM(IF(ISNUMBER((FIND("fr-",Summary!$C12))*(FIND("Stdnt",Summary!$C12))),MID(Summary!$C12,10,3)*1,0)+IF(ISNUMBER((FIND("fr-",Summary!$D12))*(FIND("Stdnt",Summary!$D12))),MID(Summary!$D12,10,3)*1,0)+IF(ISNUMBER((FIND("fr-",Summary!$E12))*(FIND("Stdnt",Summary!$E12))),MID(Summary!$E12,10,3)*1,0)+IF(ISNUMBER((FIND("fr-",Summary!$F12))*(FIND("Stdnt",Summary!$F12))),MID(Summary!$F12,10,3)*1,0)+IF(ISNUMBER((FIND("fr-",Summary!$G12))*(FIND("Stdnt",Summary!$G12))),MID(Summary!$G12,10,3)*1,0)+IF(ISNUMBER((FIND("fr-",Summary!$H12))*(FIND("Stdnt",Summary!$H12))),MID(Summary!$H12,10,3)*1,0)+IF(ISNUMBER((FIND("fr-",Summary!$I12))*(FIND("Stdnt",Summary!$I12))),MID(Summary!$I12,10,3)*1,0)+IF(ISNUMBER((FIND("fr-",Summary!$J12))*(FIND("Stdnt",Summary!$J12))),MID(Summary!$J12,10,3)*1,0)+IF(ISNUMBER((FIND("fr-",Summary!$K12))*(FIND("Stdnt",Summary!$K12))),MID(Summary!$K12,10,3)*1.0))
CELL Z739 (for both CELLS Z5 and Z6) for fr-represents number of hours for year for all rooms scheduled for freshman for Stdnt
=SUM(Z5:Z738)
CELL AA5 for so-represents number of hours for all rooms scheduled for sophomore for Stdnt; if "so-" and "Stdnt" are found in Summary!
C11,D11,E11,F11,G11,H11,I11,J11 and/or K11 returns sum of 3 numbers from each true cell tenth position, else 0
=SUM(IF(ISNUMBER((FIND("so-",Summary!$C11))*(FIND("Stdnt",Summary!$C11))),MID(Summary!$C11,10,3)*1,0)+IF(ISNUMBER((FIND("so-",Summary!$D11))*(FIND("Stdnt",Summary!$D11))),MID(Summary!$D11,10,3)*1,0)+IF(ISNUMBER((FIND("so-",Summary!$E11))*(FIND("Stdnt",Summary!$E11))),MID(Summary!$E11,10,3)*1,0)+IF(ISNUMBER((FIND("so-",Summary!$F11))*(FIND("Stdnt",Summary!$F11))),MID(Summary!$F11,10,3)*1,0)+IF(ISNUMBER((FIND("so-",Summary!$G11))*(FIND("Stdnt",Summary!$G11))),MID(Summary!$G11,10,3)*1,0)+IF(ISNUMBER((FIND("so-",Summary!$H11))*(FIND("Stdnt",Summary!$H11))),MID(Summary!

$H11,10,3)*1,0)+IF(ISNUMBER((FIND("so-",Summary!$I11))*
(FIND("Stdnt",Summary!$I11))),MID(Summary!$I11,10,3)*1,0)+IF(ISNUMBER((FIND("so-",Summary!$J11))*
(FIND("Stdnt",Summary!$J11))),MID(Summary!$J11,10,3)*1,0)+IF(ISNUMBER((FIND("so-",Summary!$K11))*
(FIND("Stdnt",Summary!$K11))),MID(Summary!$K11,10,3)*1,0))

CELL AA39 for so-represents number of hours for year for all rooms scheduled for sophomore for Stdnt

=SUM(AA5:A738)

Level SIM Student Totals—the column sums from these are "copied" to Summary sheet row 7, columns C-K:

CELL AN5 for fr-represents number of hours for all rooms scheduled for freshman for Stdnt in SIM; if "fr-" and "SIM" and "Stdnt" are found in Summary!C11,D11, E11,F11,G11,H11,I11,J11 and/or K11 returns sum of 3 numbers from each true cell tenth position, else 0

=SUM(IF(ISNUMBER((FIND("fr-",Summary!$C11))*(FIND("SIM",Summary!$C11))*(FIND("Stdnt",Summary!$C11))),MID(Summary!$C11,10,3)*1,0)+IF(ISNUMBER((FIND("fr-",Summary!$D11))*
(FIND("SIM",Summary!$D11))*(FIND("Stdnt",Summary!$D11))),MID(Summary!$D11,10,3)*1,0)+IF(ISNUMBER((FIND("fr-",Summary!$E11))*
(FIND("SIM",Summary!$E11))*(FIND("Stdnt",Summary!$E11))),MID(Summary!$E11,10,3)*1,0)+IF(ISNUMBER((FIND("fr-",Summary!$F11))*
(FIND("SIM",Summary!$F11))*(FIND("Stdnt",Summary!$F11))),MID(Summary!$F11,10,3)*1,0)+IF(ISNUMBER((FIND("fr-",Summary!$G11))*
(FIND("SIM",Summary!$G11))*(FIND("Stdnt",Summary!$G11))),MID(Summary!$G11,10,3)*1,0)+IF(ISNUMBER((FIND("fr-",Summary!$H11))*
(FIND("SIM",Summary!$H11))*(FIND("Stdnt",Summary!$H11))),MID(Summary!$H11,10,3)*1,0)+IF(ISNUMBER((FIND("fr-",Summary!$I11))*
(FIND("SIM",Summary!$I11))*(FIND("Stdnt",Summary!$I11))),MID(Summary!$I11,10,3)*1,0)+IF(ISNUMBER((FIND("fr-",Summary!$J11))*
(FIND("SIM",Summary!$J11))*(FIND("Stdnt",Summary!$J11))),MID(Summary!$J11,10,3)*1,0)+IF(ISNUMBER((FIND("fr-",Summary!$K11))*
(FIND("SIM",Summary!$K11))*(FIND("Stdnt",Summary!$K11))),MID(Summary!$K11,10,3)*1,0))

CELL AN6 for fr-represents number of hours for all rooms scheduled for freshman for Stdnt in SIM; if "fr-" and "SIM" and "Stdnt" are found in Summary!C12,D12, E12,F12,G12,H12,I12,J12 and/or K12 returns sum of 3 numbers from each true cell tenth position, else 0

=SUM(IF(ISNUMBER((FIND("fr-",Summary!$C12))*(FIND("SIM",Summary!$C12))*(FIND("Stdnt",Summary!$C12))),MID(Summary!$C12,10,3)*1,0)+IF(ISNUMBER((FIND("fr-",Summary!$D12))*
(FIND("SIM",Summary!$D12))*(FIND("Stdnt",Summary!$D12))),MID(Summary!$D12,10,3)*1,0)+IF(ISNUMBER((FIND("fr-",Summary!$E12))*
(FIND("SIM",Summary!$E12))*(FIND("Stdnt",Summary!$E12))),MID(Summary!$E12,10,3)*1,0)+IF(ISNUMBER(FIND("fr-",Summary!$F12))*
(FIND("SIM",Summary!$F12))*(FIND("Stdnt",Summary!$F12))),MID(Summary!$F12,10,3)*1,0)+IF(ISNUMBER((FIND("fr-",Summary!$G12))*
(FIND("SIM",Summary!$G12))*(FIND("Stdnt",Summary!$G12))),MID(Summary!$G12,10,3)*1,0)+IF(ISNUMBER((FIND("fr-",Summary!$H12))*
(FIND("SIM",Summary!$H12))*(FIND("Stdnt",Summary!$H12))),MID(Summary!$H12,10,3)*1,0)+IF(ISNUMBER((FIND("fr-",Summary!$I12))*
(FIND("SIM",Summary!$I12))*(FIND("Stdnt",Summary!$I12))),MID(Summary!$I12,10,3)*1,0)+IF(ISNUMBER((FIND("fr-",Summary!$J12))*
(FIND("SIM",Summary!$J12))*(FIND("Stdnt",Summary!$J12))),MID(Summary!$J12,10,3)*1,0)+IF(ISNUMBER((FIND("fr-",Summary!$K12))*
(FIND("SIM",Summary!$K12))*(FIND("Stdnt",Summary!$K12))),MID(Summary!$K12,10,3)*1,0))

CELL AG739 (for both CELLS AG5 and AG6) for fr-represents number of hours for year for all rooms scheduled for freshman for Stdnt in SIM

=SUM(AG5:AG738)

CELL AO5 for so-represents number of hours for all rooms scheduled for sophomore for Stdnt in SIM; if "so-" and "SIM" and "Stdnt" are found in Summary!C11,D11, E11,F11,G11,H11,I11,J11 and/or K11 returns sum of 3 numbers from each true cell tenth position, else 0

=SUM(IF(ISNUMBER((FIND("so-",Summary!$C11))*(FIND("SIM",Summary!$C11))*(FIND("Stdnt",Summary!$C11))),MID(Summary!$C11,10,3)*1,0)+IF(ISNUMBER((FIND("so-",Summary!$D11))*
(FIND("SIM",Summary!$D11))*(FIND("Stdnt",Summary!$D11))),MID(Summary!$D11,10,3)*1,0)+IF(ISNUMBER(FIND("so-",Summary!$E11))*

(FIND("SIM",Summary!$E11))*(FIND("Stdnt",Summary!
   $E11))),MID(Summary!
   $E11,10,3)*1,0)+IF(ISNUMBER((FIND("so-",Summary!$F11))*
(FIND("SIM",Summary!$F11))*(FIND("Stdnt",Summary!
   $F11))),MID(Summary!
   $F11,10,3)*1,0)+IF(ISNUMBER((FIND("so-",Summary!$G11))*
(FIND("SIM",Summary!$G11))*(FIND("Stdnt",Summary!
   $G11))),MID(Summary!
   G11,10,3)*1,0)+IF(ISNUMBER((FIND("so-",Summary!$H11))*
(FIND("SIM",Summary!$H11))*(FIND("Stdnt",Summary!
   $H11))),MID(Summary!
   $H11,10,3)*1,0)+IF(ISNUMBER((FIND("so-",Summary!$I11))*
(FIND("SIM",Summary!$I11))*(FIND("Stdnt",Summary!
   $I11))),MID(Summary!
   $I11,10,3)*1,0)+IF(ISNUMBER((FIND("so-",Summary!$J11))*
(FIND("SIM",Summary!$J11))*(FIND("Stdnt",Summary!
   $J11))),MID(Summary!
   $J11,10,3)*1,0)+IF(ISNUMBER((FIND("so-",Summary!$K11))*
(FIND("SIM",Summary!$K11))*(FIND("Stdnt",Summary!
   $K11))),MID(Summary!$K11,10,3)*1,0))

CELL AH739 for so-represents number of hours for year for all rooms scheduled for sophomore for Stdnt in SIM
=SUM(AH5:AH38)

Multi-Criteria Filter—The column sum and count from these are "copied" to both Summary sheet and Query sheet row 9, columns I and J:

CELL AN5 for multiple-criteria represents number of hours for room scheduled (502 Library) for defined filter; if criteria defined on OpenQuery sheet in cells absolute cells C9,D9,E9,F9,G9,H9 are found in cell Summary!C11 returns 3 numbers from cell if true third position, else 0
=SUM(IF(ISNUMBER((FIND(Summary!$C$9,Summary!$C11))*
(FIND(Summary!$D$9,Summary!$C11))*(FIND(Summary!
   $E$9,Summary!$C11))*(FIND(Summary!$F$9,Summary!$C11))*
(FIND(Summary!$G$9,Summary!$C11))*(FIND(Summary!
   $H$9,Summary!$C11))),MID(Summary!$C11,3,3)
   *1,0))

CELL AN6 for multiple-criteria represents number of hours for room scheduled (502 Library) for defined filter; if criteria defined on OpenQuery sheet in cells absolute cells C9,D9,E9,F9,G9,H9 are found in cell Summary!C12 returns 3 numbers from cell if true third position, else 0
=SUM(IF(ISNUMBER((FIND(Summary!$C$9,Summary!$C12))*
(FIND(Summary!$D$9,Summary!$C12))*(FIND(Summary!
   $E$9,Summary!$C12))*(FIND(Summary!$F$9,Summary!$C12))*
(FIND(Summary!$G$9,Summary!$C12))*(FIND(Summary!
   $H$9,Summary!$C12))),MID(Summary!$C12,3,3)*1,
   0))

CELL AN739 (for both CELLS AN5 and AN6) represents number of hours for column for room scheduled for defined filter
=SUM(AN5:AN738)

CELL AN740 (for both CELLS AN5 and AN6) represents count of hours for column for room scheduled for defined filter if # greater than 0
=COUNTIF(AN5:AN738,">0")

CELL AO5 for multiple-criteria represents number of hours for room scheduled (502 Camp Lab) for defined filter; if criteria defined on OpenQuery sheet in cells absolute cells C9,D9,E9,F9,G9,H9 are found in cell Summary!D11 returns 3 numbers from cell if true third position, else 0
=SUM(IF(ISNUMBER((FIND(Summary!$C$9,Summary!$D11))*
(FIND(Summary!$D$9,Summary!$D11))*(FIND(Summary!
   $E$9,Summary!$D11))*(FIND(Summary!$F$9,Summary!$D11))*
(FIND(Summary!$G$9,Summary!$D11))*(FIND(Summary!
   $H$9,Summary!$D11))),MID(Summary!$D11,3,3)
   *1,0))

CELL AO739 represents number of hours for column for room scheduled for defined filter
=SUM(AO5:AO738)

CELL AO740 represents count of hours for column for room scheduled for defined filter if # greater than 0
=COUNTIF(AO5:AO738,">0")

SelectPeriod & Any/All Criteria Filter—the column sum and count from these are "copied" to Selected Period sheet row 9, columns I and J CELL CH5 for multiple-criteria for select period represents number of hours for room scheduled (502 Library) on or within selected date period and defined filter; if criteria defined on SelectPeriod sheet in cells absolute cells C9,D9,E9,F9,G9,H9 and on or between dates specified on SelectPeriod sheet absolute cells F1 and G1 are found in cell Summary!C11 returns 3 numbers from cell if true third position, else 0
=SUM(IF(ISNUMBER((FIND(SelectedPeriod!$C$9,
   Summary!
   $C11))*(FIND(SelectedPeriod!$D$9,Summary!
   $C11))*(FIND(SelectedPeriod!$E$9,Summary!
   $C11))*(FIND(SelectedPeriod!$F$9,Summary!
   $C11))*(FIND(SelectedPeriod!$G$9,Summary!
   $C11))*(FIND(SelectedPeriod!$H$9,Summary!$C11)))
   *(Summary!
   $A11>=SelectedPeriod!$F$1)*
   (Summary!$A11<=Selected Period!
   $H$1),MID(Summary!$C11,3,3)*1,0))

CELL CH6 for multiple-criteria for select period represents number of hours for room scheduled (502 Library) on or within selected date period and defined filter; if criteria defined on SelectPeriod sheet in cells absolute cells C9,D9,E9,F9,G9,H9 and on or between dates specified on SelectPeriod sheet absolute cells F1 and G1 are found in cell Summary!C12 returns 3 numbers from cell if true third position, else 0

=SUM(IF(ISNUMBER((FIND(SelectedPeriod!$C$9, Summary!
$C12))*(FIND(SelectedPeriod!$D$9,Summary!
$C12))*(FIND(SelectedPeriod!$E$9,Summary!
$C12))*(FIND(SelectedPeriod!$F$9,Summary!
$C12))*(FIND(SelectedPeriod!$G$9,Summary!
$C12))*(FIND(SelectedPeriod!$H$9,Summary!$C12)))
*(Summary!
$A12>=SelectedPeriod!$F$1)*
(Summary!$A12<=SelectedPeriod!
$H$1),MID(Summary!$C12,3,3)*1,0))
CELL CH739 (for both CELLS CH5 and CH6) represents number of hours for column for room scheduled for defined filter and selected period
=SUM(CH5:CH738)
CELL CH740 (for both CELLS CH5 and CH6) represents count of hours for column for room scheduled for defined filter and selected period if # greater than 0
=COUNTIF(CH5:CP738,">0")
CELL CI5 for multiple-criteria for select period represents number of hours for room scheduled (502 Comp Lab) on or within selected date period and defined filter; if criteria defined on SelectPeriod sheet in cells absolute cells C9,D9,E9,F9,G9,H9 and on or between dates specified on SelectPeriod sheet absolute cells F1 and G1 are found in cell Summary!D11 returns 3 numbers from cell if true third position, else 0
=SUM(IF(ISNUMBER((FIND(SelectedPeriod!$C$9, Summary!
$D11)*(FIND(SelectedPeriod!$D$9,Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))
*(Summary!
$A11>=SelectedPeriod!$F$1)*
(Summary!$A11<=SelectedPeriod!
$H$1),MID(Summary)!$D11,3,3)*1,0))
CELL CI739 represents number of hours for column for room scheduled for defined filter and selected period
=SUM(CI5:CI738)
CELL CI740-columns CH thru CP for total count on Selected Period sheet represents count of hours for column for room scheduled for defined filter and selected period if # greater than 0
=COUNTIF(CI5:CI738,">0")
SelectPeriod & Any/All Criteria-Level Totals for Columns—Note: due to size of formulas "C-G"+"H-K" to sum for each level—the column sum and count from the summed are "copied" to Selected Period sheet row 4, columns C through J
CELL CQ 5 for fr-C-G represents number of hours for all rooms in columns C-G scheduled for freshman for any/all criteria scheduled on or within selected date period; if "fr-" and criteria defined on SelectPeriod sheet in cells absolute cells C9,D9,E9,F9,G9,H9 and on or between dates specified on SelectPeriod sheet absolute cells F1 and G1 are found in cells Summary!C11,D11,E11,F11 and/or G11 returns sum of 3 numbers from each true cell third position, else 0
=SUM(IF(ISNUMBER((FIND("fr-",Summary!
$C11))*(FIND(SelectedPcriod!$C$9,Summary!
$C11))*(FIND(SelectedPeriod!$D$9,Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!
$C11))*(FIND(SelectedPeriod!$H$9,Summary!$C11)))*(Summary!
$A11>=SelectedPeriod!$F$1)*
(Summary!$A11<=SelectedPeriod!
$H$1), MID(Summary!
$C11,3,3)*1,0)+IF(ISNUMBER((FIND("fr-",Summary!
$D11))*(FIND(SelectedPeriod!$C$9,Summary!
$D11))*(FIND(SelectedPeriod!$D$9,Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))*(Summary!
$A11>=SelectedPeriod!$F$1)*
(Summary!$A11<=SelectedPeriod!
$H$1), MID(Summary!
$D11,3,3)*1,0)+IF(ISNUMBER((FIND("fr-",Summary!
$E11))*(FIND(SelectedPeriod!$C$9,Summary!
$E11))*(FIND(SelectedPeriod!$D$9,Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*(Summary!
$A11>=SelectedPeriod!$F$1)*
(Summary!$A11<=SelectedPeriod!
$H$1), MID(Summary!
$E11,3,3)*1,0))+IF(ISNUMBER((FIND("fr-",Summary!
$F11))*(FIND(SelectedPeriod!$C$9,Summary!
$F11))*(FIND(SelectedPeriod!$D$9,Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*(Summary!
$A11>=SelectedPeriod!$F$1)*
(Summary!$A11<=SelectedPeriod!
$H$1), MID(Summary!
$F11,3,3)*1,0)+IF(ISNUMBER((FIND("fr-",Summary!
$G11))*(FIND(SelectedPeriod!$C$9,Summary!
$G11))*(FIND(SelectedPeriod!$D$9,Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Summary!$G11)))*(Summary!
$A11>=SelectedPeriod!$F$1)*
(Summary!$A11<=SelectedPeriod!
$H$1), MID(Summary!$G11,3,3)*1,0))
CELL CR5 for fr-H-K represents number of hours for all rooms in columns H-K scheduled for freshman for any/all criteria scheduled on or within selected date period; if "fr-" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11 and/or K11 returns sum of 3 numbers from each true cell third position, else 0
=SUM(IF(ISNUMBER((FIND("fr-",Summary!
$H11))*(FIND(SelectedPeriod!$C$9,Summary!
$H11))*(FIND(SelectedPeriod!$D$9,Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Summary!$H11)))*(Summary!

$A11>=SelectedPeriod!$F$1)*
(Summary!$A11<=SelectedPeriod!
$H$1), MID(Summary!
$H11,3,3)*1,0)+IF(ISNUMBER((FIND("fr-",Summary!
$I11))*(FIND(SelectedPeriod!$C$9,Summary!
$I11))*(FIND(SelectedPeriod!$D$9,Summary!
$I11))*(FIND(SelectedPeriod!$E$9,Summary!
$I11))*(FIND(SelectedPeriod!$F$9,Summary!
$I11))*(FIND(SelectedPeriod!$G$9,Summary!
$I11))*(FIND(SelectedPeriod!$H$9,Summary!$I11)))*
(Summary!
$A11>=SelectedPeriod!$F$1)*
(Summary!$A11<=SelectedPeriod!
$H$1), MID(Summary!
$I11,3,3)*1,0)+IF(ISNUMBER((FIND("fr-",Summary!
$J11))*(FIND(SelectedPeriod!$C$9,Summary!
$J11))*(FIND(SelectedPeriod!$D$9,Summary!
$J11))*(FIND(SelectedPeriod!$E$9,Summary!
$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))*
(Summary!
$A11>=SelectedPeriod!$F$1)*
(Summary!$A11<=SelectedPeriod!
$H$1), MID(Summary!
$J11,3,3)*1,0)+IF(ISNUMBER((FIND("fr-",Summary!
$K11))*(FIND(SelectedPeriod!$C$9,Summary!
$K11))*(FIND(SelectedPeriod!$D$9,Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Summary!$K11)))*(Summary!
$A11>=SelectedPeriod!$F$1)*
(Summary!$A11>=SelectedPeriod!
$H$1), MID(Summary!$K11,3,3)*1,0))

CELL CS5 for fr-Total represents number of hours for all rooms C-G+H-K scheduled for freshman for any/all criteria scheduled on or within selected date period; sum cells CQ & CR
=SUM(CQ5:CR5)

CELL CQ6 for fr-C-G represents number of hours for all rooms in columns C-G scheduled for freshman for any/all criteria scheduled on or within selected date period; if "fr-" and criteria defined on SelectPeriod sheet in cells absolute cells C9,D9,E9,F9,G9,H9 and on or between dates specified on SelectPeriod sheet absolute cells F1 and G1 are found in cells Summary!C12,D12,E12,F12 and/or G12 returns sum of 3 numbers from each true cell third position, else 0
=SUM(IF(ISNUMBER((FIND("fr-",Summary!
$C12))*(FIND(SelectedPeriod!$C$9,Summary!
$C12))*(FIND(SelectedPeriod!$D$9,Summary!
$C12))*(FIND(SelectedPeriod!$E$9,Summary!
$C12))*(FIND(SelectedPeriod!$F$9,Summary!
$C12))*(FIND(SelectedPeriod!$G$9,Summary!
$C12))*(FIND(SelectedPeriod!$H$9,Summary!$C12)))*(Summary!
$A12>=SelectedPeriod!$F$1)*
(Summary!$A12<=SelectedPeriod!
$H$1), MID(Summary!
$C12,3,3)*1,0)+IF(ISNUMBER((FIND("fr-",Summary!
$D12))*(FIND(SelectedPeriod!$C$9,Summary!
$D12))*(FIND(SelectedPeriod!$D$9,Summary!
$D12))*(FIND(SelectedPeriod!$E$9,Summary!
$D12))*(FIND(SelectedPeriod!$F$9,Summary!
$D12))*(FIND(SelectedPeriod!$G$9,Summary!
$D12))*(FIND(SelectedPeriod!$H$9,Summary!$D12)))*(Summary!
$A12>=SelectedPeriod!$F$1)*
(Summary!$A12<=Selected Period!
$H$1), MID(Summary!
$D12,3,3)*1,0)+IF(ISNUMBER((FIND("fr-",Summary!
$E12))*(FIND(SelectedPeriod!$C$9,Summary!
$E12))*(FIND(SelectedPeriod!$D$9,Summary!
$E12))*(FIND(SelectedPeriod!$E$9,Summary!
$E12))*(FIND(SelectedPeriod!$F$9,Summary!
$E12))*(FIND(SelectedPeriod!$G$9,Summary!
$E12))*(FIND(SelectedPeriod!$H$9,Summary!$E12)))*
(Summary!
$A12>=SelectedPeriod!$F$1)*
(Summary!$A12<=Selected Period!
$H$1), MID(Summary!
$E12,3,3)*1,0)+IF(ISNUMBER((FIND("fr-",Summary!
$F12))*(FIND(SelectedPeriod!$C$9,Summary!
$F12))*(FIND(SelectedPeriod!$D$9,Summary!
$F12))*(FIND(SelectedPeriod!$E$9,Summary!
$F12))*(FIND(SelectedPeriod!$F$9,Summary!
$F12))*(FIND(SelectedPeriod!$G$9,Summary!
$F12))*(FIND(SelectedPeriod!$H$9,Summary!$F12)))*
(Summary!
$A12>=SelectedPeriod!$F$1)*
(Summary!$A12<=SelectedPeriod!
$H$1), MID(Summary!
$F12,3,3)*1.0)+IF(ISNUMBER((FIND("fr-",Summary!
$G12))*(FIND(SelectedPeriod!$C$9,Summary!
$G12))*(FIND(SelectedPeriod!$D$9,Summary!
$G12))*(FIND(SelectedPeriod!$E$9,Summary!
$G12))*(FIND(SelectedPeriod!$F$9,Summary!
$G12))*(FIND(SelectedPeriod!$G$9,Summary!
$G12))*(FIND(SelectedPeriod!$H$9,Summary!$G12)))*(Summary!
$A12>=SelectedPeriod!$F$1)*
(Summary!$A12<=SelectedPeriod!
$H$1), MID(Summary!$G12,3,3)*1,0))

CELL CR6 for fr-H-K represents number of hours for all rooms in columns H-K scheduled for freshman for any/all criteria scheduled on or within selected date period; if "fr-" and criteria defined on SelectPeriod sheet in cells absolute cells C9,D9,E9,F9,G9,H9 and on or between dates specified on SelectPeriod sheet absolute cells F1 and G1 are found in cells Summary!H12,I12,J12 and/or K12 returns sum of 3 numbers from each true cell third position, else 0
=SUM(IF(ISNUMBER((FIND("fr-",Summary!
$H12))*(FIND(SelectedPeriod!$C$9,Summary!
$H12))*(FIND(SelectedPeriod!$D$9,Summary!
$H12))*(FIND(SelectedPeriod!$E$9,Summary!
$H12))*(FIND(SelectedPeriod!$F$9,Summary!
$H12))*(FIND(SelectedPeriod!$G$9,Summary!
$H12))*(FIND(SelectedPeriod!$H$9,Summary!$H12)))*Summary!
$A12>=SelectedPeriod!$F$1)*
(Summary!$A12>=SelectedPeriod!
$H$1), MID(Summary!
$H12,3,3)*1,0)+IF(ISNUMBER((FIND("fr-",Summary!
$I12))*(FIND(SelectedPeriod!$C$9,Summary!
$I12))*(FIND(SelectedPeriod!$D$9,Summary!
$I12))*(FIND(SelectedPeriod!$E$9,Summary!
$I12))*(FIND(SelectedPeriod!$F$9,Summary!
$I12))*(FIND(SelectedPeriod!$G$9,Summary!
$I12))*(FIND(SelectedPeriod!$H$9,Summary!$I12)))*
(Summary!

$A12>=SelectedPeriod!$F$1)*
(Summary!$A12<=SelectedPeriod!
$H$1), MID(Summary!
$I12,3,3)*1,0)+IF(ISNUMBER((FIND("fr-",Summary!
$J12))*(FIND(SelectedPeriod!$C$9,Summary!
$J12))*(FIND(SelectedPeriod!$D$9,Summary!
$J12))*(FIND(SelectedPeriod!$E$9,Summary!
$J12))*(FIND(SelectedPeriod!$F$9,Summary!
$J12))*(FIND(SelectedPeriod!$G$9,Summary!
$J12))*(FIND(SelectedPeriod!$H$9,Summary!$J12)))*
(Summary!
$A12>=SelectedPeriod!$F$1)*
(Summary!$A12<=SelectedPeriod!
$H$1), MID(Summary!
$J12,3,3)*1,0)+IF(ISNUMBER((FIND("fr-",Summary!
$K12))*(FIND(SelectedPeriod!$C$9,Summary!
$K12))*(FIND(SelectedPeriod!$D$9,Summary!
$K12))*(FIND(SelectedPeriod!$E$9,Summary!
$K12))*(FIND(SelectedPeriod!$F$9,Summary!
$K12))*(FIND(SelectedPeriod!$G$9,Summary!
$K12))*(FIND(SelectedPeriod!$H$9,Summary!$K12)))*(Summary!
$A12>=SelectedPeriod!$F$1)*
(Summary!$A12<=SelectedPeriod!
$H$1), MID(Summary!$K12,3,3)*1,0))
CELL CS6 for fr-Total represents number of hours for all rooms C-G+H-K scheduled for freshman for any/all criteria scheduled on or within selected date period; sum cells CQ & CR
=SUM(CQ5:CR5)
CELL CS739 for Totals for CELLS CQ & CR; sum column CS for total hours for all rooms scheduled for freshman for any/all criteria scheduled on or within selected date period
=SUM(CS5:CS738)
CELL CT5 for so-C-G represents number of hours for all rooms in columns C-G scheduled for sophomore for any/all criteria scheduled on or within selected date period; if "so-" and criteria defined on SelectPeriod sheet in cells absolute cells C9,D9,E9,F9,G9,H9 and on or between dates specified on SelectPeriod sheet absolute cells F1 and G1 are found in cells Summary!C11, D11,E11,F11 and/or G11 returns sum of 3 numbers from each true cell third position, else 0
=SUM(IF(ISNUMBER((FIND("so-",Summary!
$C11))*(FIND(SelectedPeriod!$C$9,Summary!
$C11))*(FIND(SelectedPeriod!$D$9,Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!
$C11))*(FIND(SelectedPeriod!$H$9,Summary!$C11)))*(Summary!
$A11>=SelectedPeriod!$F$1)*
(Summary!$A11<=SelectedPeriod!
$H$1), MID(Summary!
$C11,3,3)*1,0)+IF(ISNUMBER((FIND("so-",Summary!
$D11))*(FIND(SelectedPeriod!$C$9,Summary!
$D11))*(FIND(SelectedPeriod!$D$9,Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))*(Summary!
$A11>=SelectedPeriod!$F$1)*
(Summary!$A11<=SelectedPeriod!
$H$1), MID(Summary!
$D11,3,3)*1,0)+IF(ISNUMBER((FIND("so-",Summary!
$E11))*(FIND(SelectedPeriod!$C$9,Summary!
$E11))*(FIND(SelectedPeriod!$D$9,Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*
(Summary!
$A11>=SelectedPeriod!$F$1)*
(Summary!$A11<=SelectedPeriod!
$H$1), MID(Summary!
$E11,3,3)*1,0)+IF(ISNUMBER((FIND("so-",Summary!
$F11))*(FIND(SelectedPeriod!$C$9,Summary!
$F11))*(FIND(SelectedPeriod!$D$9,Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*
(Summary!
$A11>=SelectedPeriod!$F$1)*
(Summary!$A11<=SelectedPeriod!
$H$1), MID(Summary!
$F11,3,3)*1,0)+IF(ISNUMBER((FIND("so-",Summary!
$G11))*(FIND(SelectedPeriod!$C$9,Summary!
$G11))*(FIND(SelectedPeriod!$D$9,Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*FIND(SelectedPeriod!$H$9,Summary!$G11)))*
(Summary!
$A11>=SelectedPeriod!$F$1)*
(Summary!$A11<=SelectedPeriod!
$H$1), MID(Summary!$G11,3,3)*1.0))
CELL CU5 for so-H-K represents number of hours for all rooms in columns H-K scheduled for sophomore for any/all criteria scheduled on or within selected date period; if "so-" and criteria defined on SelectPeriod sheet in cells absolute cells C9,D9,E9,F9,G9,H9 and on or between dates specified on SelectPeriod sheet absolute cells F1 and G1 are found in cells Summary!H11, I11,J11 and/or K 11 returns sum of 3 numbers from each true cell third position, else 0
=SUM(IF(ISNUMBER((FIND("so-",Summary!
$H11))*(FIND(SelectedPeriod!$C$9,Summary!
$H11))*(FIND(SelectedPeriod!$D$9,Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Summary!$H11)))*(Summary!
$A11>=SelectedPeriod!$F$1)*
(Summary!$A11<=SelectedPeriod!
$H$1), MID(Summary!
$H11,3,3)*1,0)+IF(ISNUMBER((FIND("so-",Summary!
$I11))*(FIND(SelectedPeriod!$C$9,Summary!
$I11))*(FIND(SelectedPeriod!$D$9,Summary!
$I11))*(FIND(SelectedPeriod!$E$9,Summary!
$I11))*(FIND(SelectedPeriod!$F$9,Summary!
$I11))*(FIND(SelectedPeriod!$G$9,Summary!
$I11))*(FIND(SelectedPeriod!$H$9,Summary!$I11)))*
(Summary!
$A11>=SelectedPeriod!$F$1)*
(Summary!$A11<=SelectedPeriod!
$H$1), MID(Summary!
$I11,3,3)*1,0)+IF(ISNUMBER((FIND("so-",Summary!
$J11))*(FIND(SelectedPeriod!$C$9,Summary!
$J11))*(FIND(SelectedPeriod!$D$9,Summary!
$J11))*(FIND(SelectedPeriod!$E$9,Summary!

$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))*
 (Summary!
$A11>=SelectedPeriod!$F$1)*
 (Summary!$A11<=SelectedPeriod!
$H$1), MID(Summary!
$J11,3,3)*1,0)+IF(ISNUMBER((FIND("so-",Summary!
$K11))*(FIND(SelectedPeriod!$C$9,Summary!
$K11))*(FIND(SelectedPeriod!$D$9,Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Sum-
 mary!$K11)))*(Summary!
$A11>=SelectedPeriod!$F$1)*
 (Summary!$A11<=Selected Period!
$H$1), MID(Summary!$K11,3,3)*1,0))
CELL CV5 for so-Total represents number of hours for all rooms C-G+H-K scheduled for sophomore for any/all criteria scheduled on or within selected date period; sum cells CT & CU
=SUM(CT5:CU5)
CELL CV739 for Totals for CELLS CT & CU; sum column CV for total hours for all rooms scheduled for sophomore for any/all criteria scheduled on or within selected date period
=SUM(CV5:CV738)
SelectPeriod & Any/All Criteria-Level SIM Totals for Columns—Note: due to size of formulas "C-G"+"H-K" to sum for each level—the column sum and count from the summed are "copied" to SelectedPeriod sheet row 4, columns C through J
CELL DL5 for fr-C-G represents number of hours for all rooms in columns C-G scheduled for freshman in SIM for any/all criteria scheduled on or within selected date period; if "fr-" and "SIM" and criteria defined on SelectPeriod sheet in cells absolute cells C9,D9,E9,F9,G9,H9 and on or between dates specified on SelectPeriod sheet absolute cells F1 and G1 are found in cells Summary! C11,D11,E11,F11 and/or G11 returns sum of 3 numbers from each true cell third position, else 0
=SUM(IF(ISNUMBER(((FIND("fr-",Summary!
$C11))*(FIND("SIM",Summary!$C11)))*(FIND(Select-
 edPeriod!
$C$9,Summary!$C11))*(FIND(SelectedPeriod!$D$9,
 Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!
$C11))*(FIND(SelectedPeriod!$H$9,Sum-
 mary!$C11)))*(Summary!
$A11>=SelectedPeriod!$F$1)*
 (Summary!$A11<=SelectedPeriod!
$H$1),MID(Summary!
$C11,3,3)*1,0)+IF(ISNUMBER(((FIND("fr-",Sum-
 mary!
$D11))*(FIND("SIM",Summary!$D11)))*(FIND(Se-
 lectedPeriod!
$C$9,Summary!$D11))*(FIND(SelectedPeriod!$D$9,
 Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Sum-
 mary!$D11)))*(Summary!
$A11>=SelectedPeriod!$F$1)*
 (Summary!$A11<=SelectedPeriod!
$H$1),MID(Summary!
$D11,3,3)*1,0)+IF(ISNUMBER(((FIND("fr-",Sum-
 mary!
$E11))*(FIND("SIM",Summary!$E11)))*(FIND(Select-
 edPeriod!
$C$9,Summary!$E11))*(FIND(SelectedPeriod!$D$9,
 Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*
 (Summary!
$A11>=SelectedPeriod!$F$1)*
 (Summary!$A11<SelectedPeriod!
$H$1),MID(Summary!
$E11,3,3)*1,0)+IF(ISNUMBER(((FIND("fr-",Summary!
$F11))*(FIND("SIM",Summary!$F11)))*(FIND(Select-
 edPeriod!
$C$9,Summary!$F11))*(FIND(SelectedPeriod!$D$9,
 Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*
 (Summary!
$A11>=SelectedPeriod!$F$1)*
 (Summary!$A11<=SelectedPeriod!
$H$1),MID(Summary!
$F11,3,3)*1,0)+IF(ISNUMBER(((FIND("fr-",Summary!
$G11))*(FIND("SIM",Summary!$G11)))*(FIND(Se-
 lectedPeriod!
$C$9,Summary!$G11))*(FIND(SelectedPeriod!$D$9,
 Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Sum-
 mary!$G11)))*(Summary!
$A11>=SelectedPeriod!$F$1)*
 (Summary!$A11<=SelectedPeriod!
$H$1),MID(Summary!$G11,3,3)*1,0))
CELL DM5 for fr-H-K represents number of hours for all rooms in columns H-K scheduled for freshman in SIM for any/all criteria scheduled on or within selected date period; if "fr-" and "SIM" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11, and/or K11 returns sum of 3 numbers from each true cell third position, else 0
=SUM(IF(ISNUMBER(((FIND("fr-",Summary!
$H11))*(FIND("SIM",Summary!$H11)*(FIND(Select-
 edPeriod!
$C$9,Summary!$H11))*(FIND(SelectedPeriod!$D$9,
 Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Sum-
 mary!$H11)))*(Summary!
$A11>=SelectedPeriod!$F$1)*
 (Summary!$A11<=Selected Period!
$H$1),MID(Summary!
$H11,3,3)*1,0)+IF(ISNUMBER(((FIND("fr-",Sum-
 mary!

$I11))*(FIND("SIM",Summary!$I11)))*(FIND(SelectedPeriod!
$C$9,Summary!$I11))*(FIND(SelectedPeriod!$D$9, Summary!
$I11))*FIND(SelectedPeriod!$E$9,Summary!
$I11))*(FIND(SelectedPeriod!$F$9,Summary!
$I11))*(FIND(SelectedPeriod!$G$9,Summary!
$I11))*(FIND(SelectedPeriod!$H$9,Summary!$I11)))* (Summary!
$A11>=SelectedPeriod!$F$1)* (Summary!$A11<=SelectedPeriod!
$H$1), MID(Summary!
$I11,3,3)*1,0)+IF(ISNUMBER(((FIND("fr-",Summary!
$J11))*(FIND("SIM",Summary!$J11)))*(FIND(SelectedPeriod!
$C$9,Summary!$J11))*(FIND(SelectedPeriod!$D$9, Summary!
$J11))*(FIND(SelectedPeriod!$E$9,Summary!
$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))* (Summary!
$A11>=SelectedPeriod!$F$1)* (Summary!$A11<=SelectedPeriod!
$H$1), MID(Summary!
$J11,3,3)*1,0)+IF(ISNUMBER(((FIND("fr-",Summary!
$K11))*(FIND("SIM",Summary!$K11)*(FIND(SelectedPeriod!
$C$9,Summary!$K11))*(FIND(SelectedPeriod!$D$9, Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Summary!$K11)))*(Summary!
$A11>=SelectedPeriod!$F$1)* (Summary!$A11<=SelectedPeriod!
$H$1), MID(Summary!$K11,3,3)*1,0))
CELL DN5 for fr-Total represents number of hours for all rooms C-G+H-K scheduled for freshman in SIM for any/all criteria scheduled on or within selected date period; sum cells DL & DM
=SUM(DL5:DM5)
CELL DL6 for fr-C-G represents number of hours for all rooms in columns C-G scheduled for freshman in SIM for any/all criteria scheduled on or within selected date period; if "fr-" and "SIM" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11 and/or K11 returns sum of 3 numbers from each true cell third position, else 0
=SUM(IF(ISNUMBER(((FIND("fr-",Summary!
$C12))*(FIND("SIM",Summary!$C12)))*(FIND(SelectedPeriod!
$C$9,Summary!$C12))*(FIND(SelectedPeriod!$D$9, Summary!
$C12))*(FIND(SelectedPeriod!$E$9,Summary!
$C12))*(FIND(SelectedPeriod!$F$9,Summary!
$C12))*(FIND(SelectedPeriod!$G$9,Summary!
$C12))*(FIND(SelectedPeriod!$H$9,Summary!$C12)))*(Summary!
$A12>=SelectedPeriod!$F$1)* (Summary!$A12<=SelectedPeriod!
$H$1),MID(Summary!
$C12,3,3)*1,0)+IF(ISNUMBER(((FIND("fr-",Summary!
$D12))*(FIND("SIM",Summary!$D12)))*(FIND(SelectedPeriod!
$C$9,Summary!$D12))*(FIND(SelectedPeriod!$D$9, Summary!
$D12))*(FIND(SelectedPeriod!$E$9,Summary!
$D12))*(FIND(SelectedPeriod!$F$9,Summary!
$D12))*FIND(SelectedPeriod!$G$9,Summary!
$D12))*(FIND(SelectedPeriod!$H$9,Summary!$D12)))*(Summary!
$A12>=SelectedPeriod!$F$1)* (Summary!$A12<=SelectedPeriod!
$H$1),MID(Summary!
$D12,3,3)*1,0)+IF(ISNUMBER(((FIND("fr-",Summary!
$E12))*(FIND("SIM",Summary!$E12)))*(FIND(SelectedPeriod!
$C$9,Summary!$E12))*(FIND(SelectedPeriod!$D$9, Summary!
$E12))*(FIND(SelectedPeriod!$E$9,Summary!
$E12))*(FIND(SelectedPeriod!$F$9,Summary!
$E12))*(FIND(SelectedPeriod!$G$9,Summary!
$E12))*(FIND(SelectedPeriod!$H$9,Summary!$E12)))*Summary!
$A12>=SelectedPeriod!$F$1)* (Summary!$A12<=SelectedPeriod!
$H$1),MID(Summary!
$E12,3,3)*1,0)+IF(ISNUMBER(((FIND("fr-",Summary!
$F12))*(FIND("SIM",Summary!$F12)))*(FIND(SelectedPeriod!
$C$9,Summary!$F12))*(FIND(SelectedPeriod!$D$9, Summary!
$F12))*(FIND(SelectedPeriod!$E$9,Summary!
$F12))*(FIND(SelectedPeriod!$F$9,Summary!
$F12))*(FIND(SelectedPeriod!$G$9,Summary!
$F12))*(FIND(SelectedPeriod!$H$9,Summary!$F12)))* (Summary!
$A12>=SelectedPeriod!$F$1)* (Summary!$A12<=SelectedPeriod!
$H$1),MID(Summary!
$F12,3,3)*1,0)+IF(ISNUMBER(((FIND("fr-",Summary!
$G12))*(FIND("SIM",Summary!$G12)))*(FIND(SelectedPeriod!
$C$9,Summary!$G12))*(FIND(SelectedPeriod!$D$9, Summary!
$G12))*(FIND(SelectedPeriod!$E$9,Summary!
$G12))*(FIND(SelectedPeriod!$F$9,Summary!
$G12))*(FIND(SelectedPeriod!$G$9,Summary!
$G12))*(FIND(SelectedPeriod!$H$9,Summary!$G12)))*(Summary!
$A12>=SelectedPeriod!$F$1)* (Summary!$A12<=SelectedPeriod!
$H$1),MID(Summary!$G12,3,3)*1,0))
CELL DM6 for fr-H-K represents number of hours for all rooms in columns H-K scheduled for freshman in SIM for any/all criteria scheduled on or within selected date period; if "fr-" and "SIM" and criteria defined on SelectPeriod sheet in cells absolute cells C9,D9,E9,F9,G9,H9 and on or between dates specified on SelectPeriod sheet absolute cells F1 and G1 are found in cells Summary!H12,I12,J12, and/or K12 returns sum of 3 numbers from each true cell third position, else 0
=SUM(IF(ISNUMBER(((FIND("fr-",Summary!
$H12))*(FIND("SIM",Summary!$H12)))*(FIND(SelectedPeriod!
$C$9,Summary!$H12))*(FIND(SelectedPeriod!$D$9, Summary!
$H12))*(FIND(SelectedPeriod!$E$9,Summary!

$H12))*(FIND(SelectedPeriod!$F$9,Summary!
$H12))*(FIND(SelectedPeriod!$G$9,Summary!
$H12))*(FIND(SelectedPeriod!$H$9,Summary!$H12)))*(Summary!
$A12>=SelectedPeriod!$F$1)*
   (Summary!$A12<=SelectedPeriod!
$H$1),MID(Summary!
$H12,3,3)*1,0)+IF(ISNUMBER(((FIND("fr-",Summary!
$I12))*(FIND("SIM",Summary!$I12)))*(FIND(SelectedPeriod!
$C$9,Summary!$I12))*(FIND(SelectedPeriod!$D$9,
   Summary!
$I12))*(FIND(SelectedPeriod!$E$9,Summary!
$I12))*(FIND(SelectedPeriod!$F$9,Summary!
$I12))*(FIND(SelectedPeriod!$G$9,Summary!
$I12))*(FIND(SelectedPeriod!$H$9,Summary!$I12)))*
   (Summary!
$A12>=SelectedPeriod!$F$1)*
   (Summary!$A12<=SelectedPeriod!
$H$1), MID(Summary!
$I12,3,3)*1,0)+IF(ISNUMBER(((FIND("fr-",Summary!
$J12))*(FIND("SIM",Summary!$J12)))*(FIND(SelectedPeriod!
$C$9,Summary!$J12))*(FIND(SelectedPeriod!$D$9,
   Summary!
$J12))*(FIND(SelectedPeriod!$E$9,Summary!
$J12))*(FIND(SelectedPeriod!$F$9,Summary!
$J12))*(FIND(SelectedPeriod!$G$9,Summary!
$J12))*(FIND(SelectedPeriod!$H$9,Summary!$J12)))*
   (Summary!
$A12>=SelectedPeriod!$F$1)*
   (Summary!$A12<=SelectedPeriod!
$H$1), MID(Summary!
$J12,3,3)*1,0)+IF(ISNUMBER(((FIND("fr-",Summary!
$K12))*(FIND("SIM",Summary!$K12)))*(FIND(SelectedPeriod!
$C$9,Summary!$K12))*(FIND(SelectedPeriod!$D$9,
   Summary!
$K12))*(FIND(SelectedPeriod!$E$9,Summary!
$K12))*(FIND(SelectedPeriod!$F$9,Summary!
$K12))*(FIND(SelectedPeriod!$G$9,Summary!
$K12))*(FIND(SelectedPeriod!$H$9,Summary!$K12)))*(Summary!
$A12>=SelectedPeriod!$F$1)*
   (Summary!$A12<=SelectedPeriod!
$H$1), MID(Summary!$K12,3,3)*1,0))
CELL DN6 for fr-Total represents number of hours for all rooms C-G+H-K scheduled for freshman in SIM for any/all criteria scheduled on or within selected date period; sum cells DL & DM
=SUM(DL6:DM6)
CELL DN739 Totals for CELLS DL & DM; sum column DN for total hours for all rooms scheduled for freshman in "SIM" for any/all criteria scheduled on or within selected date period
=SUM(DN5:DN738)
CELL DO5 for so-C-G represents number of hours for all rooms in columns C-G scheduled for sophomore in SIM for any/all criteria scheduled on or within selected dale period; if "so-" and "SIM" and criteria defined on SelectPeriod sheet in cells absolute cells C9,D9,E9,F9, G9,H9 and on or between dates specified on SelectPeriod sheet absolute cells F1 and G1 are found in cells Summary!C11,D11,E11,F11 and/or G11 returns sum of 3 numbers from each true cell third position, else 0

=SUM(IF(ISNUMBER(((FIND("so-",Summary!
$C11))*(FIND("SIM",Summary!$C11)))*(FIND(SelectedPeriod!
$C$9,Summary!$C11))*(FIND(SelectedPeriod!$D$9,
   Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!
$C11))*(FIND(SelectedPeriod!$H$9,Summary!$C11)))*(Summary!
$A11>=SelectedPeriod!$F$1)*
   (Summary!$A11<=SelectedPeriod!
$H$1),MID(Summary!
$C11,3,3)*1,0)+IF(ISNUMBER(((FIND("so-",Summary!
$D11))*(FIND("SIM",Summary!$D11)))*(FIND(SelectedPeriod!
$C$9,Summary!$D11))*(FIND(SelectedPeriod!$D$9,
   Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))*(Summary!
$A11>=SelectedPeriod!$F$1)*
   (Summary!$A11<=SelectedPeriod!
$H$1),MID(Summary!
$D11,3,3)*1.0)+IF(ISNUMBER(((FIND("so-",Summary!
$E11))*(FIND("SIM",Summary!$E11)))*(FIND(SelectedPeriod!
$C$9,Summary!$E11))*(FIND(SelectedPeriod!$D$9,
   Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*(Summary!
$A11>=SelectedPeriod!$F$1)*
   (Summary!$A11<=SelectedPeriod!
$H$1),MID(Summary!
$E11,3,3)*1,0)+IF(ISNUMBER(((FIND("so-",Summary!
$F11))*(FIND("SIM",Summary!$F11)))*(FIND(SelectedPeriod!
$C$9,Summary!$F11))*(FIND(SelectedPeriod!$D$9,
   Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*(Summary!
$A11>=SelectedPeriod!$F$1)*
   (Summary!$A11<=SelectedPeriod!
$H$1),MID(Summary!
$F11,3,3)*1,0)+IF(ISNUMBER(((FIND("so-",Summary!
$G11))*(FIND("SIM",Summary!$G11)))*(FIND(SelectedPeriod!
$C$9,Summary!$G11))*(FIND(SelectedPeriod!$D$9,
   Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Summary!$G11)))*(Summary!

$A11>=SelectedPeriod!$F$1)*(Summary!$A11<=SelectedPeriod!$H$1),MID(Summary!$G11,3,3)*1,0))

CELL DP5 for so-H-K represents number of hours for all rooms in columns H-K scheduled for sophomore in SIM for any/all criteria scheduled on or within selected date period; if "so-" and "SIM" and criteria defined on SelectPeriod sheet in cells absolute cells C9,D9,E9,F9,G9,H9 and on or between dates specified on SelectPeriod sheet absolute cells F1 and G1 are found in cells Summary! H11,I11,J11 and/or K11 returns sum of 3 numbers from each true cell third position, else 0

=SUM(IF(ISNUMBER(((FIND("so-",Summary!$H11))*(FIND("SIM",Summary!$H11)))*(FIND(SelectedPeriod!$C$9,Summary!$H11))*(FIND(SelectedPeriod!$D$9,Summary!$H11))*(FIND(SelectedPeriod!$E$9,Summary!$H11))*(FIND(SelectedPeriod!$F$9,Summary!$H11))*(FIND(SelectedPeriod!$G$9,Summary!$H11))*(FIND(SelectedPeriod!$H$9,Summary!$H11)))*(Summary!$A11>=SelectedPeriod!$F$1)*(Summary!$A11<=SelectedPeriod!$H$1),MID(Summary!$H11,3,3)*1,0)+IF(ISNUMBER(((FIND("so-",Summary!$I11))*(FIND("SIM",Summary!$I11)))*(FIND(SelectedPeriod!$C$9,Summary!$I11))*(FIND(SelectedPeriod!$D$9,Summary!$I11))*(FIND(SelectedPeriod!$E$9,Summary!$I11))*(FIND(SelectedPeriod!$F$9,Summary!$I11))*FIND(SelectedPeriod!$G$9,Summary!$I11))*(FIND(SelectedPeriod!$H$9,Summary!$I11)))*(Summary!$A11>=SelectedPeriod!$F$1)*(Summary!$A11<=SelectedPeriod!$H$1), MID(Summary!$I11,3,3)*1,0)+IF(ISNUMBER(((FIND("so-",Summary!$J11))*(FIND("SIM",Summary!$J11)))*(FIND(SelectedPeriod!$C$9,Summary!$J11))*(FIND(SelectedPeriod!$D$9,Summary!$J11))*(FIND(SelectedPeriod!$E$9,Summary!$J11))*(FIND(SelectedPeriod!$F$9,Summary!$J11))*(FIND)(SelectedPeriod!$G$9,Summary!$J11))*(FIND(SelectedPeriod!$H$9,Summary!$J11)))*(Summary!$A11>=SelectedPeriod!$F$1)*(Summary!$A11<=SelectedPeriod!$H$1), MID(Summary!$J11,3,3)*1,0)+IF(ISNUMBER(((FIND)("so-",Summary!$K11))*(FIND("SIM",Summary!$K11)))*(FIND(SelectedPeriod!$C$9,Summary!$K11))*(FIND(SelectedPeriod!$D$9,Summary!$K11))*(FIND(SelectedPeriod!$E$9,Summary!$K11))*(FIND(SelectedPeriod!$F$9,Summary!$K11))*(FIND(SelectedPeriod!$G$9,Summary!$K11))*(FIND(SelectedPeriod!$H$9,Summary!$K11)))*(Summary!$A11>=SelectedPeriod!$F$1)*(Summary!$A11<=SelectedPeriod!$H$1), MID(Summary!$K11,3,3)*1,0))

CELL DQ5 for so-Total represents number of hours for all rooms C-G+H-K scheduled for sophomore in SIM for any all criteria scheduled on or within selected date period; sum cells DO & DP

=SUM(DO5:DP5)

CELL DQ739 Totals for CELLS DO & DP; sum columns DQ for total hours for all rooms scheduled for sophomore in "SIM" for any all criteria scheduled on or within selected date period

=SUM(DQ5:DQ738)

SelectPeriod & Any/All Criteria-Level Stdnt Totals for Columns—Note: due to size of formulas "C-G"+"H-K" to sum for each level—the column sum and count from the summed are "copied" to SelectedPeriod sheet row 4, columns C through J CELL EG5 for fr-C-G represents number of hours for all rooms in columns C-G scheduled for freshman for Stdnt for any/all criteria scheduled on or within selected date period; if "fr-" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary! C11,D11,E11,F11 and/or G11 returns sum of 3 numbers from each true cell tenth position, else 0

=SUM(IF(ISNUMBER(((FIND("fr-",Summary!$C11))*(FIND("Stdnt",Summary!$C11)))*FIND(SelectedPeriod!$C$9,Summary!$C11))*FIND(SelectedPeriod!$D$9,Summary!$C11))*(FIND(SelectedPeriod!$E$9,Summary!$C11))*(FIND(SelectedPeriod!$F$9,Summary!$C11))*(FIND(SelectedPeriod!$G$9,Summary!$C11))*(FIND(SelectedPeriod!$H$9,Summary!$C11)))*(Summary!$A11>=SelectedPeriod!$F$1)*(Summary!$A11<=SelectedPeriod!$H$1),MID(Summary!$C11,10,3)*1,0)+IF(ISNUMBER(((FIND("fr-",Summary!$D11))*(FIND("Stdnt",Summary!$D11)))*(FIND(SelectedPeriod!$C$9,Summary!$D11))*(FIND(SelectedPeriod!$D$9,Summary!$D11))*(FIND(SelectedPeriod!$E$9,Summary!$D11))*(FIND(SelectedPeriod!$F$9,Summary!$D11))*(FIND(SelectedPeriod!$G$9,Summary!$D11))*(FIND(SelectedPeriod!$H$9,Summary!$D11)))*(Summary!$A11>=SelectedPeriod!$F$1)*(Summary!$A11<=SelectedPeriod!$H$1),MID(Summary!$D11,10,3)*1,0)+IF(ISNUMBER(((FIND("fr-",Summary!$E11))*(FIND("Stdnt",Summary!$E11)))*(FIND(SelectedPeriod!$C$9,Summary!$E11))*(FIND(SelectedPeriod!$D$9,Summary!$E11))*(FIND(SelectedPeriod!$E$9,Summary!$E11))*(FIND(SelectedPeriod!$F$9,Summary!$E11))*(FIND(SelectedPeriod!$G$9,Summary!$E11))*(FIND(SelectedPeriod!$H$9,Summary!$E11)))*(Summary!$A11>=SelectedPeriod!$F$1)*(Summary!$A11<=SelectedPeriod!$H$1),MID(Summary!

$E11,10,3)*1,0)+IF(ISNUMBER(((FIND("fr-",Summary!
$F11))*(FIND("Stdnt",Summary!$F11)))*(FIND(SelectedPeriod!
$C$9,Summary!$F11))*(FIND(SelectedPeriod!$D$9,Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*(Summary!
$A11>=SelectedPeriod!$F$1)*(Summary!$A11<=SelectedPeriod!
$H$1),MID(Summary!
$F11,10,3)*1,0)+IF(ISNUMBER(((FIND("fr-",Summary!
$G11))*(FIND("Stdnt",Summary!$G11)))*(FIND(SelectedPeriod!
$C$9,Summary!$G11))*(FIND(SelectedPeriod!$D$9,Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Summary!$G11)))*(Summary!
$A11>=SelectedPeriod!$F$1)*(Summary!$A11<=SelectedPeriod!
$H$1),MID(Summary!$G11,10,3)*1.0))

CELL EH5 for fr-H-K represents number of hours for all rooms in columns H-K scheduled for freshman for Stdnt for any/all criteria scheduled on or within selected date period; if "fr-" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11, and/or K11 returns sum of 3 numbers from each true cell tenth position, else 0

=SUM(IF(ISNUMBER(((FIND("fr-",Summary!
$H11))*(FIND("Stdnt",Summary!$H11)))*(FIND(SelectedPeriod!
$C$9,Summary!$H11))*(FIND(SelectedPeriod!$D$9,Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Summary!$H11)))*(Summary!
$A11>=SelectedPeriod!$F$1)*(Summary!$A11<=SelectedPeriod!
$H$1),MID(Summary!
$H11,10,3)*1,0)+IF(ISNUMBER(((FIND("fr-",Summary!
$I11)*(FIND("Stdnt",Summary!$I11)))*(FIND(SelectedPeriod!
$C$9,Summary!$I11))*(FIND(SelectedPeriod!$D$9,Summary!
$I11))*(FIND(SelectedPeriod!$E$9,Summary!
$I11))*(FIND(SelectedPeriod!$F$9,Summary!
$I11))*(FIND(SelectedPeriod!$G$9,Summary!
$I11))*(FIND(SelectedPeriod!$H$9,Summary!$I11)))*(Summary!
$A11>=SelectedPeriod!$F$1)*(Summary!$A11<=SelectedPeriod!
$H$1), MID(Summary!
$I11,10,3)*1,0)+IF(ISNUMBER(((FIND("fr-",Summary!
$J11))*(FIND("Stdnt",Summary!$J11))*(FIND(SelectedPeriod!
$C$9,Summary!$J11))*(FIND(SelectedPeriod!$D$9,Summary!
$J11))*(FIND(SelectedPeriod!$E$9,Summary!
$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))*(Summary!
$A11>=SelectedPeriod!$F$1)*(Summary!$A11<=SelectedPeriod!
$H$1), MID(Summary!
$J11,10,3)*1,0)+IF(ISNUMBER(((FIND("fr-",Summary!
$K11))*(FIND("Stdnt",Summary!$K11)))*(FIND(SelectedPeriod!
$C$9,Summary!$K11))*(FIND(SelectedPeriod!$D$9,Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Summary!$K11))*(Summary!
$A11>=SelectedPeriod!$F$1)*(Summary!$A11<=SelectedPeriod!
$H$1), MID(Summary!$K11,10,3)*1,0))

CELL EI5 for fr-Total represents number of hours for all rooms C-G+H-K scheduled for freshman for "Stdnt" for any/all criteria scheduled on or within selected date period; sum cells EG & EH

=SUM(EG5:EH5)

CELL EG6 for fr-C-G represents number of hours for all rooms in columns C-G scheduled for freshman for Stdnt for any/all criteria scheduled on or within selected date period: if "fr-" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!C12,D12,E12,F12 and/or G12 returns sum of 3 numbers from each true cell tenth position, else 0

=SUM(IF(ISNUMBER(((FIND("fr-",Summary!
$C12))*(FIND("Stdnt",Summary!$C12)))*(FIND(SelectedPeriod!
$C$9,Summary!$C12))*(FIND(SelectedPeriod!$D$9,Summary!
$C12))*(FIND(SelectedPeriod!$E$9,Summary!
$C12))*(FIND(SelectedPeriod!$F$9,Summary!
$C12))*(FIND(SelectedPeriod!$G$9,Summary!
$C12))*(FIND(SelectedPeriod!$H$9,Summary!$C12)))*(Summary!
$A12>=SelectedPeriod!$F$1)*(Summary!$A12<=SelectedPeriod!
$H$1),MID(Summary!
$C12,10,3)*1,0)+IF(ISNUMBER(((FIND("fr-",Summary!
$D12))*(FIND("Stdnt",Summary!$D12)))*(FIND(Selected Period!
$C$9,Summary!$D12))*(FIND(SelectedPeriod!$D$9,Summary!
$D12))*(FIND(SelectedPeriod!$E$9,Summary!
$D12))*(FIND(SelectedPeriod!$F$9,Summary!
$D12))*(FIND(SelectedPeriod!$G$9,Summary!
$D12))*(FIND(SelectedPeriod!$H$9,Summary!$D12)))*(Summary!
$A12>=SelectedPeriod!$F$1)*(Summary!$A12<=SelectedPeriod!
$H$1),MID(Summary!

$D12,10,3)*1,0)+IF(ISNUMBER(((FIND("fr-",Summary!
$E12))*(FIND("Stdnt",Summary!$E12)))*(FIND(SelectedPeriod!
$C$9,Summary!$E12))*(FIND(SelectedPeriod!$D$9,Summary!
$E12))*(FIND(SelectedPeriod!$E$9,Summary!
$E12))*(FIND(SelectedPeriod!$F$9,Summary!
$E12))*(FIND(SelectedPeriod!$G$9,Summary!
$E12))*(FIND(SelectedPeriod!$H$9,Summary!$E12)))*
(Summary!
$A12>=SelectedPeriod!$F$1)*
(Summary!$A12<SelectedPeriod!
$H$1),MID(Summary!
$E12,10,3)*1,0)+IF(ISNUMBER(((FIND("fr-",Summary!
$F12))*(FIND("Stdnt",Summary!$F12)))*(FIND(SelectedPeriod!
$C$9,Summary!$F12))*(FIND(SelectedPeriod!$D$9,Summary!
$F12))*(FIND(SelectedPeriod!$E$9,Summary!
$F12))*(FIND(SelectedPeriod!$F$9,Summary!
$F12))*(FIND(SelectedPeriod!$G$9,Summary!
$F12))*(FIND(SelectedPeriod!$H$9,Summary!$F12)))*
(Summary!
$A12>=SelectedPeriod!$F$1)*
(Summary!$A12<=SelectedPeriod!
$H$1),MID(Summary!
$F12,10,3)*1,0)+IF(ISNUMBER(((FIND("fr-",Summary!
$G12))*(FIND("Stdnt",Summary!$G12)))*(FIND(SelectedPeriod!
$C$9,Summary!$G12))*(FIND(SelectedPeriod!$D$9,Summary!
$G12))*(FIND(SelectedPeriod!$E$9,Summary!
$G12))*(FIND(SelectedPeriod!$F$9,Summary!
$G12))*(FIND(SelectedPeriod!$G$9,Summary!
$G12))*(FIND(SelectedPeriod!$H$9,Summary!$G12)))
*(Summary!
$A12>=SelectedPeriod!$F$1)*
(Summary!$A12<=SelectedPeriod!
$H$1),MID(Summary!$G12,10,3)*1,0))

CELL EH6 for fr-H-K represents number of hours for all rooms in columns H-K scheduled for freshman for Stdnt for any/all criteria scheduled on or within selected date period; if "fr-" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H12,I12,J12, and/or K12 returns sum of 3 numbers from each true cell tenth position, else 0

=SUM(IF(ISNUMBER(((FIND("fr-",Summary!
$H12))*(FIND("Stdnt",Summary!$H12)))*(FIND(SelectedPeriod!
$C$9,Summary!$H12))*(FIND(SelectedPeriod!$D$9,Summary!
$H12))*(FIND(SelectedPeriod!$E$9,Summary!
$H12))*(FIND(SelectedPeriod!$F$9,Summary!
$H12))*(FIND(SelectedPeriod!$G$9,Summary!
$H12))*(FIND(SelectedPeriod!$H$9,Summary!$H12)))*(Summary!
$A12>=SelectedPeriod!$F$1)*
(Summary!$A12<=SelectedPeriod!
$H$1), MID(Summary!
$H12,10,3)*1,0)+IF(ISNUMBER(((FIND("fr-",Summary!
$I12))*(FIND("Stdnt",Summary!$I12)))*(FIND(SelectedPeriod!
$C$9,Summary!$I12))*(FIND(SelectedPeriod!$D$9,Summary!
$I12))*(FIND(SelectedPeriod!$E$9,Summary!
$I12))*(FIND(SelectedPeriod!$F$9,Summary!
$I12))*(FIND(SelectedPeriod!$G$9,Summary!
$I12))*(FIND(SelectedPeriod!$H$9,Summary!$I12)))*
(Summary!
$A12>=SelectedPeriod!$F$1)*
(Summary!$A12<=SelectedPeriod!
$H$1), MID(Summary!
$I12,10,3)*1,0)+IF(ISNUMBER(((FIND("fr-",Summary!
$J12))*(FIND("Stdnt",Summary!$J12)))*(FIND(SelectedPeriod!
$C$9,Summary!$J12))*(FIND(SelectedPeriod!$D$9,Summary!
$J12))*(FIND(SelectedPeriod!$E$9,Summary!
$J12))*(FIND(SelectedPeriod!$F$9,Summary!
$J12))*(FIND(SelectedPeriod!$G$9,Summary!
$J12))*(FIND(SelectedPeriod!$H$9,Summary!$J12)))*
(Summary!
$A12>=SelectedPeriod!$F$1)*
(Summary!$A12<=SelectedPeriod!
$H$1), MID(Summary!
$J12,10,3)*1,0)+IF(ISNUMBER(((FIND("fr-",Summary!
$K12))*(FIND("Stdnt",Summary!$K12)))*(FIND(SelectedPeriod!
$C$9,Summary!$K12))*(FIND(SelectedPeriod!$D$9,Summary!
$K12))*(FIND(SelectedPeriod!$E$9,Summary!
$K12))*(FIND(SelectedPeriod!$F$9,Summary!
$K12))*(FIND(SelectedPeriod!$G$9,Summary!
$K12))*(FIND(SelectedPeriod!$H$9,Summary!$K12)))*(Summary!
$A12>=SelectedPeriod!$F$1)*
(Summary!$A12<=SelectedPeriod!
$H$1), MID(Summary!$K12,10,3)*1.0))

CELL EI6 for fr-Total represents number of hours for all rooms C-G+H-K scheduled for freshman for "Stdnt" for any/all criteria scheduled on or within selected date period; sum cells EG & EH

=SUM(EG6:EH6)

CELL EI739 for Totals for CELLS EG & EH; sum columns EI for total hours for all rooms scheduled for freshman for "Stdnt" for any/all criteria scheduled on or within selected date period

=SUM(EI5:EI738)

CELL EJ5 for so-C-G represents number of hours for all rooms in columns C-G scheduled for sophomore for Stdnt for any/all criteria scheduled on or within selected date period; if "so-" and "Stdnt" and criteria defined on SelectPeriod sheet in cells absolute cells C9,D9,E9,F9,G9,H9 and on or between dales specified on SelectPeriod sheet absolute cells F1 and G1 are found in cells Summary!C11,D11,E11,F11 and/or G11 returns sum of 3 numbers from each true cell tenth position, else 0

=SUM(IF(ISNUMBER(((FIND("so-",Summary!
$C11))*(FIND("Stdnt",Summary!$C11)))*(FIND(SelectedPeriod!
$C$9,Summary!$C11))*(FIND(SelectedPeriod!$D$9,Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!

$C11))*(FIND(SelectedPeriod!$H$9,Summary!$C11)))*(Summary!
$A11>=SelectedPeriod!$F$1)*
(Summary!$A11<=SelectedPeriod!
$H$1),MID(Summary!
$C11,10,3)*1,0)+IF(ISNUMBER(((FIND("so-",Summary!
$D11))*(FIND("Stdnt",Summary!$D11)))*(FIND(SelectedPeriod!
$C$9,Summary!$D11))*(FIND(SelectedPeriod!$D9,Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))*(Summary!
$A11>=SelectedPeriod!$F$1)*
(Summary!$A11<=SelectedPeriod!
$H$1),MID(Summary!
$D11,10,3)*1,0)+IF(ISNUMBER(((FIND("so-",Summary!
$E11))*(FIND("Stdnt",Summary!$E11)))*(FIND(SelectedPeriod!
$C$9,Summary!$E11))*(FIND(SelectedPeriod!$D9,Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*
(Summary!
$A11>=SelectedPeriod!$F$1)*
(Summary!$A11<=SelectedPeriod!
$H$1),MID(Summary!
$E11,10,3)*1,0)+IF(ISNUMBER(((FIND("so-",Summary!
$F11))*(FIND("Stdnt",Summary!$F11)))*(FIND(SelectedPeriod!
$C$9,Summary!$F11))*(FIND(SelectedPeriod!$D9,Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(FIND(SelectedPeriod!$H$9,Summary!$F11)))*
(Summary!
$A11>=SelectedPeriod!$F$1)*
(Summary!$A11<=SelectedPeriod!
$H$1),MID(Summary!
$F11,10,3)*1,0)+IF(ISNUMBER(((FIND("so-",Summary!
$G11))*(FIND("Stdnt",Summary!$G11)))*(FIND(SelectedPeriod!
$C$9,Summary!$G11))*(FIND(SelectedPeriod!$D9,Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Summary!$G11)))*(Summary!
$A11>=SelectedPeriod!$F$1)*
(Summary!$A11<=SelectedPeriod!
$H$1),MID(Summary!$G11,10,3)*1.0))
CELL EK5 for so-H-K represents number of hours for all rooms in columns H-K scheduled for sophomore for Stdnt for any/all criteria scheduled on or within selected date period; If "so-" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11 and or K11 returns sum of 3 numbers from each true cell tenth position, else 0
=SUM(IF(ISNUMBER(((FIND("so-",Summary!
$H11))*(FIND("Stdnt",Summary!$H11)))*(FIND(SelectedPeriod!
$C$9,Summary!$H11))*(FIND(SelectedPeriod!$D$9,Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Summary!$H11)))*(Summary!
$A11>=SelectedPeriod!$F$1)*
(Summary!$A11<=SelectedPeriod!
$H$1),MID(Summary!
$H11,10,3)*1,0)+IF(ISNUMBER(((FIND("so-",Summary!
$I11))*(FIND("Stdnt",Summary!$I11)))*(FIND(SelectedPeriod!
$C$9,Summary!$I11))*(FIND(SelectedPeriod!$D$9,Summary!
$I11))*(FIND(SelectedPeriod!$E$9,Summary!
$I11))*(FIND(SelectedPeriod!$F$9,Summary!
I11))*(FIND(SelectedPeriod!$G$9,Summary!
$I11))*(FIND(SelectedPeriod!$H$9,Summary!$I11)))*
(Summary!
$A11>=SelectedPeriod!$F$1)*
(Summary!$A11<=SelectedPeriod!
$H$1), MID(Summary!
$I11,10,3)*1,0)+IF(ISNUMBER(((FIND("so-",Summary!
$J11))*(FIND("Stdnt",Summary!$J11)))*(FIND(SelectedPeriod!
$C$9,Summary!$J11))*(FIND(SelectedPeriod!$D$9,Summary!
$J11))*(FIND(SelectedPeriod!$E$9,Summary!
$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))*
(Summary!
$A11>=SelectedPeriod!$F$1)*
(Summary!$A11<=SelectedPeriod!
$H$1), MID(Summary!
$J11,10,3)*1,0)+IF(ISNUMBER(((FIND("so-",Summary!
$K11))*(FIND("Stdnt",Summary!$K11)))*(FIND(SelectedPeriod!
$C$9,Summary!$K11))*(FIND(SelectedPeriod!$D$9,Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Summary!$K11)))*(Summary!
$A11>=SelectedPeriod!$F$1)*
(Summary!$A11<=SelectedPeriod!
$H$1), MID(Summary!$K11,10,3)*1,0))
CELL EL5 for so-Total represents number of hours for all rooms C-G+H-K scheduled for sophomore for "Stdnt" for any/all criteria scheduled on or within selected date period; sum cells EJ & EK
=SUM(EJ5:EK5)
CELL EL739 for Totals for CELLS EJ & EK; sum column EL for total hours for all rooms scheduled for sophomore for "Stdnt" for any/all criteria scheduled on or within selected date period

=SUM(EL5:EL738)

SelectPeriod & Any All Criteria-Level Stdnt & SIM Totals for Columns—Note: due to size of formulas "C-G"+"H-K" to sum for each level—the column sum and count from the summed are "copied" to Selected Period sheet row 4, columns C through J CELL FB5 for fr-C-G represents number of hours for all rooms in columns C-G scheduled for freshman for Stdnt in SIM for any/all criteria scheduled on or within selected date period; if "fr-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!C11,D11,E11,F11 and/or G11 returns sum of 3 numbers from each true cell tenth position, else 0

=SUM(IF(ISNUMBER(((FIND("fr-",Summary!$C11))*(FIND("SIM",Summary!$C11))*(FIND("Stdnt",Summary!$C11)))*(FIND(SelectedPeriod!$C$9,Summary!$C11))*(FIND(SelectedPeriod!$D$9,Summary!$C11))*(FIND(SelectedPeriod!$E$9,Summary!$C11))*(FIND(SelectedPeriod!$F$9,Summary!$C11))*(FIND(SelectedPeriod!$G$9,Summary!$C11))*(FIND(SelectedPeriod!$H$9,Summary!$C11)))*(Summary!$A11>=SelectedPeriod!$F$1)*(Summary!$A11<=SelectedPeriod!$H$1),MID(Summary!$C11,10,3)*1,0)+IF(ISNUMBER(((FIND("fr-",Summary!$D11))*(FIND("SIM",Summary!$D11))*(FIND("Stdnt",Summary!$D11)))*(FIND(SelectedPeriod!$C$9,Summary!$D11))*(FIND(SelectedPeriod!$D$9,Summary!$D11))*(FIND(SelectedPeriod!$E$9,Summary!$D11))*(FIND(SelectedPeriod!$F$9,Summary!$D11))*(FIND(SelectedPeriod!$G$9,Summary!$D11))*(FIND(SelectedPeriod!$H$9,Summary!$D11)))*(Summary!$A11>=SelectedPeriod!$F$1)*(Summary!$A11<=SelectedPeriod!$H$1),MID(Summary!$D11,10,3)*1,0)+IF(ISNUMBER(((FIND("fr-",Summary!$E11))*(FIND("SIM",Summary!$E11))*(FIND("Stdnt",Summary!$E11)))*(FIND(SelectedPeriod!$C$9,Summary!$E11))*(FIND(SelectedPeriod!$D$9,Summary!$E11))*(FIND(SelectedPeriod!$E$9,Summary!$E11))*(FIND(SelectedPeriod!$F$9,Summary!$E11))*(FIND(SelectedPeriod!$G$9,Summary!$E11))*(FIND(SelectedPeriod!$H$9,Summary!$E11)))*(Summary!$A11>=SelectedPeriod!$F$1)*(Summary!$A11<=SelectedPeriod!$H$1),MID(Summary!$E11,10,3)*1,0)+IF(ISNUMBER(((FIND("fr-",Summary!$F11))*(FIND("SIM",Summary!$F11))*(FIND("Stdnt",Summary!$F11)))*(FIND(SelectedPeriod!$C$9,Summary!$F11))*(FIND(SelectedPeriod!$D$9,Summary!$F11))*(FIND(SelectedPeriod!$E$9,Summary!$F11))*(FIND(SelectedPeriod!$F$9,Summary!$F11))*(FIND(SelectedPeriod!$G$9,Summary!$F11))*(FIND(SelectedPeriod!$H$9,Summary!$F11)))*(Summary!$A11>=SelectedPeriod!$F$1)*(Summary!$A11<=SelectedPeriod!$H$1),MID(Summary!$F11,10,3)*1,0)+IF(ISNUMBER(((FIND("fr-",Summary!$G11))*(FIND("SIM",Summary!$G11))*(FIND("Stdnt",Summary!$G11)))*(FIND(SelectedPeriod!$C$9,Summary!$G11))*(FIND(SelectedPeriod!$D$9,Summary!$G11))*(FIND(SelectedPeriod!$E$9,Summary!$G11))*(FIND(SelectedPeriod!$F$9,Summary!$G11))*(FIND(SelectedPeriod!$G$9,Summary!$G11))*(FIND(SelectedPeriod!$H$9,Summary!$G11)))*(Summary!$A11>=SelectedPeriod!$F$1)*(Summary!$A11<=SelectedPeriod!$H$1),MID(Summary!$G11,10,3)*1,0))

CELL FC5 for fr-H-K represents number of hours for all rooms in columns H-K scheduled for freshman for Stdnt in SIM for any/all criteria scheduled on or within selected date period; if "fr-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11, and/or K11 returns sum of 3 numbers from each true cell tenth position, else 0

=SUM(IF(ISNUMBER(((FIND("fr-",Summary!$H11))*(FIND("SIM",Summary!$H11))*(FIND("Stdnt",Summary!$H11)))*(FIND(SelectedPeriod!$C$9,Summary!$H11))*(FIND(SelectedPeriod!$D$9,Summary!$H11))*(FIND(SelectedPeriod!$E$9,Summary!$H11))*(FIND(SelectedPeriod!$F$9,Summary!$H11))*(FIND(SelectedPeriod!$G$9,Summary!$H11))*(FIND(SelectedPeriod!$H$9,Summary!$H11)))*(Summary!$A11>=SelectedPeriod!$F$1)*(Summary!$A11<=SelectedPeriod!$H$1), MID(Summary!$H11,10,3)*1,0)+IF(ISNUMBER(((FIND("fr-",Summary!$I11))*(FIND("SIM",Summary!$I11))*(FIND("Stdnt",Summary!$I11))*(FIND(SelectedPeriod!$C$9,Summary!$I11))*(FIND(SelectedPeriod!$D$9,Summary!$I11))*(FIND(SelectedPeriod!$E$9,Summary!$I11))*(FIND(SelectedPeriod!$F$9,Summary!$I11))*(FIND(SelectedPeriod!$G$9,Summary!$I11))*(FIND(SelectedPeriod!$H$9,Summary!$I11)))*(Summary!$A11>=SelectedPeriod!$F$1)*(Summary!$A11<=SelectedPeriod!$H$1), MID(Summary!$I11,10,3)*1,0)+IF(ISNUMBER(((FIND("fr-",Summary!$J11))*(FIND("SIM",Summary!$J11))*(FIND("Stdnt",Summary!$J11))*(FIND(SelectedPeriod!$C$9,Summary!$J11))*(FIND(SelectedPeriod!$D$9,Summary!$J11))*(FIND(SelectedPeriod!$E$9,Summary!$J11))*(FIND(SelectedPeriod!$F$9,Summary!$J11))*(FIND(SelectedPeriod!$G$9,Summary!$J11))*(FIND(SelectedPeriod!$H$9,Summary!$J11)))*(Summary!

$A11>=SelectedPeriod!$F$1)*(Summary!$A11<=SelectedPeriod!$H$1), MID(Summary!$J11,10,3)*1,0)+IF(ISNUMBER(((FIND("fr-",Summary!$K11))*(FIND("SIM",Summary!$K11)*(FIND("Stdnt",Summary!$K11))))*(FIND(SelectedPeriod!$C$9,Summary!$K11))*(FIND(SelectedPeriod!$D$9,Summary!$K11))*(FIND(SelectedPeriod!$E$9,Summary!$K11))*(FIND(SelectedPeriod!$F$9,Summary!$K11))*(FIND(SelectedPeriod!$G$9,Summary!$K11))*(FIND(SelectedPeriod!$H$9,Summary!$K11)))*(Summary!$A11>=SelectedPeriod!$F$1)*(Summary!$A11<=SelectedPeriod!$H$1), MID(Summary!$K11,10,3)*1,0))

CELL FD5 for fr-Total represents number of hours for all rooms C-G+H-K scheduled for freshman for "Stdnt" in SIM for any/all criteria scheduled on or within selected date period; sum cells FB & FC
=SUM(FB5:FC5)

CELL FB6 for fr-C-G represents number of hours for all rooms in columns C-G scheduled for freshman for Stdnt in SIM for any/all criteria scheduled on or within selected date period; if "fr-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!C12,D12,E12,F12 and/or G12 returns sum of 3 numbers from each true cell tenth position, else 0
=SUM(IF(ISNUMBER(((FIND("fr-",Summary!$C12))*(FIND("SIM",Summary!$C12))*(FIND("Stdnt",Summary!$C12)))*(FIND(SelectedPeriod!$C$9,Summary!$C12))*(FIND(SelectedPeriod!$D$9,Summary!$C12))*(FIND(SelectedPeriod!$E$9,Summary!$C12))*(FIND(SelectedPeriod!$F$9,Summary!$C12))*(FIND(SelectedPeriod!$G$9,Summary!$C12))*(FIND(SelectedPeriod!$H$9,Summary!$C12)))*(Summary!$A12>=SelectedPeriod!$F$1)*(Summary!$A12<=SelectedPeriod!$H$1),MID(Summary!$C12,10,3)*1,0)+IF(ISNUMBER(((FIND("fr-",Summary!$D12))*(FIND("SIM",Summary!$D12))*(FIND("Stdnt",Summary!$D12)))*(FIND(SelectedPeriod!$C$9,Summary!$D12))*(FIND(SelectedPeriod!$D$9,Summary!$D12))*(FIND(SelectedPeriod!$E$9,Summary!$D12))*(FIND(SelectedPeriod!$F$9,Summary!$D12))*(FIND(SelectedPeriod!$G$9,Summary!$D12))*(FIND(SelectedPeriod!$H$9,Summary!$D12)))*(Summary!$A12>=SelectedPeriod!$F$1)*(Summary!$A12<=SelectedPeriod!$H$1),MID(Summary!$D12,10,3)*1,0)+IF(ISNUMBER(((FIND("fr-",Summary!$E12))*(FIND("SIM",Summary!$E12))*(FIND("Stdnt",Summary!$E12)))*(FIND(SelectedPeriod!$C$9,Summary!$E12))*(FIND(SelectedPeriod!$D$9,Summary!$E12))*(FIND(SelectedPeriod!$E$9,Summary!$E12))*(FIND(SelectedPeriod!$F$9,Summary!$E12))*(FIND(SelectedPeriod!$G$9,Summary!$E12))*(FIND(SelectedPeriod!$H$9,Summary!$E12)))*(Summary!$A12>=SelectedPeriod!$F$1)*(Summary!$A12<=SelectedPeriod!$H$1),MID(Summary!$E12,10,3)*1,0)+IF(ISNUMBER(((FIND("fr-",Summary!$F12))*(FIND("SIM",Summary!$F12))*(FIND("Stdnt",Summary!$F12)))*(FIND(SelectedPeriod!$C$9,Summary!$F12))*(FIND(SelectedPeriod!$D$9,Summary!$F12))*(FIND(SelectedPeriod!$E$9,Summary!$F12))*(FIND(SelectedPeriod!$F$9,Summary!$F12))*(FIND(SelectedPeriod!$G$9,Summary!$F12))*(FIND(SelectedPeriod!$H$9,Summary!$F12)))*(Summary!$A12>=SelectedPeriod!$F$1)*(Summary!$A12<=SelectedPeriod!$H$1),MID(Summary!$F12,10,3)*1,0)+IF(ISNUMBER(((FIND("fr-",Summary!$G12))*(FIND("SIM",Summary!$G12))*(FIND("Stdnt",Summary!$G12)))*(FIND(SelectedPeriod!$C$9,Summary!$G12))*(FIND(SelectedPeriod!$D$9,Summary!$G12))*(FIND(SelectedPeriod!$E$9,Summary!$G12))*(FIND(SelectedPeriod!$F$9,Summary!$G12))*(FIND(SelectedPeriod!$G$9,Summary!$G12))*(FIND(SelectedPeriod!$H$9,Summary!$G12)))*(Summary!$A12>=SelectedPeriod!$F$1)*(Summary!$A12<=SelectedPeriod!$H$1),MID(Summary!$G12,10,3)*1.0))

CELL FC6 for fr-H-K represents number of hours for all rooms in columns H-K scheduled for freshman for Stdnt in SIM for any/all criteria scheduled on or within selected date period; if "fr-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H12,I12,J12, and/or K12 returns sum of 3 numbers from each true cell tenth position, else 0
=SUM(IF(ISNUMBER(((FIND("fr-",Summary!$H12))*(FIND("SIM",Summary!$H12))*(FIND("Stdnt",Summary!$H12)))*(FIND(SelectedPeriod!$C$9,Summary!$H12))*(FIND(SelectedPeriod!$D$9,Summary!$H12))*(FIND(SelectedPeriod!$E$9,Summary!$H12))*(FIND(SelectedPeriod!$F$9,Summary!$H12))*(FIND(SelectedPeriod!$G$9,Summary!$H12))*(FIND(SelectedPeriod!$H$9,Summary!$H12)))*(Summary!$A12>=SelectedPeriod!$F$1)*(Summary!$A12<=SelectedPeriod!$H$1), MID(Summary!$H12,10,3)*1,0)+IF(ISNUMBER(((FIND("fr-",Summary!$I12))*(FIND("SIM",Summary!$I12))*(FIND("Stdnt",Summary!$I12)))*(FIND(SelectedPeriod!$C$9,Summary!$I12))*(FIND(SelectedPeriod!$D$9,Summary!$I12))*(FIND(SelectedPeriod!$E$9,Summary!$I12))*(FIND(SelectedPeriod!$F$9,Summary!$I12))*(FIND(SelectedPeriod!$G$9,Summary!$I12))

$I12))*(FIND(SelectedPeriod!$H$9,Summary!$I12)))*(Summary!
$A12>=SelectedPeriod!$F$1)*(Summary!$A12<=SelectedPeriod!
$H$1), MID(Summary!
$I12,10,3)*1,0)+IF(ISNUMBER(((FIND("fr-",Summary!
$J12))*(FIND("SIM",Summary!$J12))*(FIND("Stdnt",Summary!
$J12)))*(FIND(SelectedPeriod!$C$9,Summary!
$J12))*(FIND(SelectedPeriod!$D$9,Summary!
$J12))*(FIND(SelectedPeriod!$E$9,Summary!
$J12))*(FIND(SelectedPeriod!$F$9,Summary!
$J12))*(FIND(SelectedPeriod!$G$9,Summary!
$J12))*(FIND(SelectedPeriod!$H$9,Summary!$J12)))*(Summary!
$A12>=SelectedPeriod!$F$1)*(Summary!$A12<=SelectedPeriod!
$H$1), MID(Summary!
$J12,10,3)*1,0)+IF(ISNUMBER(((FIND("fr-",Summary!
$K12))*(FIND("SIM",Summary!$K12)*(FIND("Stdnt",Summary!
$K12)))*(FIND(SelectedPeriod!$C$9,Summary!
$K12))*(FIND(SelectedPeriod!$D$9,Summary!
$K12))*(FIND(SelectedPeriod!$E$9,Summary!
$K12))*(FIND(SelectedPeriod!$F$9,Summary!
$K12))*(FIND(SelectedPeriod!$G$9,Summary!
$K12))*(FIND(SelectedPeriod!$H$9,Summary!$K12)))*(Summary!
$A12>=SelectedPeriod!$F$1)*(Summary!$A12<=SelectedPeriod!
$H$1), MID(Summary!$K12,10,3)*1,0))
CELL FD6 for fr-Total represents number of hours for all rooms C-G+H-K scheduled for freshman for "Stdnt" in SIM for any/all criteria scheduled on or within selected date period; sum cells FB & FC
=SUM(FB6:FC6)
CELL FD739 for Totals for CELLS FB & FC; sum column FD for total hours for all rooms scheduled for freshman for "Stdnt" in SIM for any/all criteria scheduled on or within selected date period
=SUM(FD5:FD738)
CELL FE5 for so-C-G represents number of hours for all rooms in columns C-G scheduled for sophomore for Stdnt in SIM for any/all criteria scheduled on or within selected date period; if "so-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!C11,D11,E11,F11 and/or G11 returns sum of 3 numbers from each true cell tenth position, else 0
=SUM(IF(ISNUMBER(((FIND("so-",Summary!
$C11))*(FIND("SIM",Summary!$C11))*(FIND("Stdnt",Summary!
$C11)))*(FIND(SelectedPeriod!$C$9,Summary!
$C11))*(FIND(SelectedPeriod!$D$9,Summary!
$C11))*(FIND(SelectedPeriod!$E$9,Summary!
$C11))*(FIND(SelectedPeriod!$F$9,Summary!
$C11))*(FIND(SelectedPeriod!$G$9,Summary!
$C11))*(FIND(SelectedPeriod!$H$9,Summary!$C11)))*(Summary!
$A11>=SelectedPeriod!$F$1)*(Summary!$A11<=SelectedPeriod!
$H$1),MID(Summary!
$C11,10,3)*1,0)+IF(ISNUMBER(((FIND("so-",Summary!
$D11))*(FIND("SIM",Summary!$D11))*(FIND("Stdnt",Summary!
$D11)))*(FIND(SelectedPeriod!$C$9,Summary!
$D11))*(FIND(SelectedPeriod!$D$9,Summary!
$D11))*(FIND(SelectedPeriod!$E$9,Summary!
$D11))*(FIND(SelectedPeriod!$F$9,Summary!
$D11))*(FIND(SelectedPeriod!$G$9,Summary!
$D11))*(FIND(SelectedPeriod!$H$9,Summary!$D11)))*(Summary!
$A11>=SelectedPeriod!$F$1)*(Summary!$A11<=SelectedPeriod!
$H$1),MID(Summary!
$D11,10,3)*1,0)+IF(ISNUMBER(((FIND("so-",Summary!
$E11))*(FIND("SIM",Summary!$E11))*(FIND("Stdnt",Summary!
$E11)))*(FIND(SelectedPeriod!$C$9,Summary!
$E11))*(FIND(SelectedPeriod!$D$9,Summary!
$E11))*(FIND(SelectedPeriod!$E$9,Summary!
$E11))*(FIND(SelectedPeriod!$F$9,Summary!
$E11))*(FIND(SelectedPeriod!$G$9,Summary!
$E11))*(FIND(SelectedPeriod!$H$9,Summary!$E11)))*(Summary!
$A11>=SelectedPeriod!$F$1)*(Summary!$A11<=SelectedPeriod!
$H$1),MID(Summary!
$E11,10,3)*1,0)+IF(ISNUMBER(((FIND("so-",Summary!
$F11))*(FIND("SIM",Summary!$F11))*(FIND("Stdnt",Summary!
$F11)))*(FIND(SelectedPeriod!$C$9,Summary!
$F11))*(FIND(SelectedPeriod!$D$9,Summary!
$F11))*(FIND(SelectedPeriod!$E$9,Summary!
$F11))*(FIND(SelectedPeriod!$F$9,Summary!
$F11))*(FIND(SelectedPeriod!$G$9,Summary!
$F11))*(SelectedPeriod!$H$9,Summary!$F11)))*(Summary!
$A11>=SelectedPeriod!$F$1)*(Summary!$A11<=SelectedPeriod!
$H$1),MID(Summary!
$F11,10,3)*1,0)+IF(ISNUMBER(((FIND("so-",Summary!
$G11))*(FIND("SIM",Summary!$G11))*(FIND("Stdnt",Summary!
$G11)))*(FIND(SelectedPeriod!$C$9,Summary!
$G11))*(FIND(SelectedPeriod!$D$9,Summary!
$G11))*(FIND(SelectedPeriod!$E$9,Summary!
$G11))*(FIND(SelectedPeriod!$F$9,Summary!
$G11))*(FIND(SelectedPeriod!$G$9,Summary!
$G11))*(FIND(SelectedPeriod!$H$9,Summary!$G11)))*(Summary!
$A11>=SelectedPeriod!$F$1)*(Summary!$A11<=SelectedPeriod!
$H$1),MID(Summary!$G11,10,3)*1,0))
CELL FF5 for so-H-K represents number of hours for all rooms in columns H-K scheduled for sophomore for Stdnt in SIM for any/all criteria scheduled on or within selected date period; if "so-" and "SIM" and "Stdnt" and criteria defined on SelectPeriod sheet in cells absolute cells C9,D9,E9,F9,G9,H9 and on or between dates specified on SelectPeriod sheet absolute cells F1 and G1 are found in cells Summary!H11,I11,J11, and/or K11 returns sum of 3 numbers from each true cell tenth position, else 0

=SUM(IF(ISNUMBER(((FIND("so-",Summary!
$H11))*(FIND("SIM",Summary!$H11))*(FIND
("Stdnt",Summary!
$H11)))*(FIND(SelectedPeriod!$C$9,Summary!
$H11))*(FIND(SelectedPeriod!$D$9,Summary!
$H11))*(FIND(SelectedPeriod!$E$9,Summary!
$H11))*(FIND(SelectedPeriod!$F$9,Summary!
$H11))*(FIND(SelectedPeriod!$G$9,Summary!
$H11))*(FIND(SelectedPeriod!$H$9,Summary!$H11)))*(Summary!
$A11>=SelectedPeriod!$F$1)*
(Summary!$A11<=SelectedPeriod!
$H$1), MID(Summary!
$H11,10,3)*1,0)+IF(ISNUMBER(((FIND("so-",Summary!
$I11))*(FIND("SIM",Summary!$I11))*(FIND("Stdnt",
Summary!
$I11)))*(FIND(SelectedPeriod!$C$9,Summary!
$I11))*(FIND(SelectedPeriod!$D$9,Summary!
$I11))*(FIND(SelectedPeriod!$E$9,Summary!
$I11))*(FIND(SelectedPeriod!$F$9,Summary!
$I11))*(FIND(SelectedPeriod!$G$9,Summary!
$I11))*(FIND(SelectedPeriod!$H$9,Summary!$I11)))*
(Summary!
$A11>=SelectedPeriod!$F$1)*
(Summary!$A11<=SelectedPeriod!
$H$1), MID(Summary!
$I11,10,3)*1,0)+IF(ISNUMBER(((FIND("so-",Summary!
$J11))*(FIND("SIM",Summary!$J11))*(FIND("Stdnt",
Summary!
$J11)))*(FIND(SelectedPeriod!$C$9,Summary!
$J11))*(FIND(SelectedPeriod!$D$9,Summary!
$J11))*(FIND(SelectedPeriod!$E$9,Summary!
$J11))*(FIND(SelectedPeriod!$F$9,Summary!
$J11))*(FIND(SelectedPeriod!$G$9,Summary!
$J11))*(FIND(SelectedPeriod!$H$9,Summary!$J11)))*
(Summary!
$A11>=SelectedPeriod!$F$1)*
(Summary!$A11<=SelectedPeriod!
$H$1), MID(Summary!
$J11,10,3)*1,0)+IF(ISNUMBER(((FIND("so-",Summary!
$K11))*(FIND("SIM",Summary!$K11)*(FIND("Stdnt",
Summary!
$K11))*(FIND(SelectedPeriod!$C$9,Summary!
$K11))*(FIND(SelectedPeriod!$D$9,Summary!
$K11))*(FIND(SelectedPeriod!$E$9,Summary!
$K11))*(FIND(SelectedPeriod!$F$9,Summary!
$K11))*(FIND(SelectedPeriod!$G$9,Summary!
$K11))*(FIND(SelectedPeriod!$H$9,Summary!$K11)))*(Summary!
$A11>=SelectedPeriod!$F$1)*
(Summary!$A11<=SelectedPeriod!
$H$1), MID(Summary!$K11,10,3)*1,0))
CELL FG5 for so-Total represents number of hours for all rooms C-G+H-K scheduled for sophomore for "Stdnt" in SIM for any/all criteria scheduled on or within selected date period; sum cells FE & FF
=SUM(FE5:FF5)
CELL FG739 for Totals for CELLS FE & FF; sum column FG for total hours for all rooms scheduled for sophomore for "Stdnt" in SIM for any/all criteria scheduled on or within selected date period
=SUM(FG5:FG738)
Although the invention has been described with particularity above, with reference to a first embodiment and to particulars and specifics, the invention is only to be limited insofar as is set forth in the accompanying claims:

The invention claimed is:

1. A computer containing a system for automated processing for scheduling, managing and reporting usage of two or more training facilities by two or more grade levels "xl" of instruction, wherein xl is a level variable indicating grade level, comprising:
a processor, the processor being configured to perform the steps of:
entering on a spreadsheet on said computer single-cell, multiple-criteria data with on-screen instructions, followed by single-cell student level classification, retrieval and totaling on a Tally Sheet using the formula =IF(ISNUMBER(FIND("xl-",Summary!$J10))*(FIND("SIM-",Summary!$J10)),MID(Summary!$J10,4,3),0), and a formula (CW5=FALSE,VALUE(0));
obtaining automatically summed totals by room, student level, and simulation classification, on a Summary Sheet utilizing formulas =Tally!$C178&"Hrs: "&Tally!$J178, and =SUM(Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175);
obtaining automatically summed totals by student level, and simulation classification on individualized student level sheets utilizing formula =SUM(Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175); and
copying the structure of the Summary Sheet to the student level sheets by formula, =(Summary!A10), so that when the Summary sheet is updated all related sheets are updated,
followed by rendering said Summary Sheet as output data in customized cells as outputs to a user, and further wherein said user manually applies at least one color to at least one cell.

2. A computer containing a system for automated processing for scheduling, managing and reporting usage of two or more training facilities by two or more grade levels "xl" of instruction, wherein xl is a level variable indicating grade level, with two or more classifications of instruction defining a student experience and hours including user defined multi-criteria queries, comprising:
a processor, the processor being configured to perform the steps of:
entering data into a Summary spreadsheet on said at least one computer using single-cell, multiple-criteria data entry, and manual color coding by student level (utilizing paint brush) with color coding manually assigned as pale yellow—freshman; blue sophomore; orange—junior; purple—senior; pink—second degree; grey—graduate level and with codes selected from the group consisting of a student experience by grade level, and a student simulation or non-simulation experience by grade level, or any classification defined by the data user;
implementing reporting using formulas selected from the group consisting of:
for Tally Sheet formula =IF(ISNUMBER(FIND("xl-",Summary!$J10)),MID(Summary!$J10,4,3),0), and formula =IF(U5=FALSE,VALUE(0),VALUE(U5));

for Tally SIM formula =IF(ISNUMBER((FIND("xl-",Summary!$C158))*(FIND("SIM",Summary!$C158))),MID(Summary!$C158,10,3),0), and formula =IF(C107=FALSE,VALUE(0),VALUE(C107));

for Tally Stdnt formula =IF(ISNUMBER((FIND("xl-",Summary!$C158))*(FIND("Stdnt",Summary!$C158))),MID(Summary!$C158,10,3),0), and formula =IF(C152=FALSE,VALUE(0),VALUE(C152));

for Tally Stdnt SIM formula =IF(ISNUMBER((FIND("xl-",Summary!$C11))*(FIND("SIM",Summary!$C11))*(FIND("Stdnt",Summary!$C11))),MID(Summary!$C11,10,3),0), and =IF(C5=FALSE,VALUE(0),VALUE(C5)); Tally Open Query formula =IF(ISNUMBER((FIND(Summary!$C$9,Summary!$C11))*(FIND(Summary!$D$9,Summary!$C11))*(FIND(Summary!$E$9,Summary!$C11))*(FIND(Summary!$F$9,Summary!$C11))*(FIND(Summary!$G$9,Summary!$C11))*(FIND(Summary!$H$9,Summary!$C11))),MID(Summary!$C11,10,3),0), and formula =IF(C5=FALSE,VALUE(0),VALUE(C5)); and generating the output of the spreadsheet to a user by generating:
  A) automatically summed totals by room, student level, simulation and non-simulation classification, a student experience by student level, and a student simulation experience by level utilizing formulas =Tally!$C178&"Hrs: "&Tally!$J178, and =SUM(Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175); and
  B) automatically summed totals by student level, simulation and non-simulation classification, a student experience by student level, and a student simulation experience by level utilizing the formula =SUM(Tally!K5:K175,Tally!Y5:Y175,Tally!AM5:AM175,Tally!BA5:BA175,Tally!BO5:BO175,Tally!CC5:CC175,Tally!CQ5:CQ175,Tally!DE5:DE175,Tally!DS5:DS175);

copying the structure of the Summary Sheet to the student level sheets by formula, =(Summary!A10), wherein as the Summary sheet is updated all related sheets are updated.

* * * * *